US011176570B1

(12) United States Patent
DeSoto et al.

(10) Patent No.: US 11,176,570 B1
(45) Date of Patent: Nov. 16, 2021

(54) SYSTEMS AND METHODS FOR PROVIDING A DIRECT MARKETING CAMPAIGN PLANNING ENVIRONMENT

(71) Applicant: Experian Information Solutions, Inc., Costa Mesa, CA (US)

(72) Inventors: Laura J. DeSoto, Newport Beach, CA (US); Michele M. Pearson, Irvine, CA (US); Kristi Ann Adkinson, Algonquin, IL (US); Venkat R. Achanta, Frisco, TX (US); Felicia Peng, Irvine, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

(21) Appl. No.: 16/907,060

(22) Filed: Jun. 19, 2020

Related U.S. Application Data

(60) Continuation of application No. 16/422,486, filed on May 24, 2019, now Pat. No. 10,692,105, which is a
(Continued)

(51) Int. Cl.
*G06Q 40/00* (2012.01)
*G06Q 30/02* (2012.01)
*G06Q 30/00* (2012.01)

(52) U.S. Cl.
CPC ......... *G06Q 30/0243* (2013.01); *G06Q 30/00* (2013.01); *G06Q 30/02* (2013.01);
(Continued)

(58) Field of Classification Search
USPC ........ 705/36, 37, 38, 39, 40, 26, 14, 44, 30; 719/328; 717/108; 709/226, 227, 246;
(Continued)

(56) References Cited

U.S. PATENT DOCUMENTS 3,316,395 A 4/1967 Lavin et al.
4,305,059 A 12/1981 Benton
(Continued)

FOREIGN PATENT DOCUMENTS

AU 2019250275 5/2020
AU 2020233739 10/2020
(Continued)

OTHER PUBLICATIONS

U.S. Appl. No. 12/022,874, U.S. Pat. No. 8,606,626, Systems and Methods for Providing a Direct Marketing Campaign Planning Environment, filed Jan. 30, 2008.
(Continued)

*Primary Examiner* — Tien C Nguyen
(74) *Attorney, Agent, or Firm* — Knobbe, Martens, Olson & Bear LLP

(57) ABSTRACT

Embodiments of system are disclosed in which selection strategies for a direct marketing campaign that identify consumers from a credit bureau or other consumer database can be planned, tested, and/or refined on a stable subset of the credit database. In some embodiments, once refined, consumer selection criteria may be used to execute the direct marketing campaign on the full consumer/credit database, which is preferably updated approximately twice weekly. In one preferred embodiment, the data for the test database represents a random sampling of approximately 10% of the full database and the sampling is regenerated approximately weekly in order to provide a stable set of data on which campaign developers may test their campaign. For each consumer in the sampling, the environment may allow a client to access and use both attributes calculated by the credit bureau and proprietary attributes and data owned by the client. The system allows for a plurality of clients to use the system substantially simultaneously while protecting the privacy and integrity of the client's proprietary data and results.

20 Claims, 9 Drawing Sheets

Related U.S. Application Data continuation of application No. 15/884,027, filed on Jan. 30, 2018, now Pat. No. 10,311,466, which is a continuation of application No. 15/356,415, filed on Nov. 18, 2016, now Pat. No. 9,916,596, which is a continuation of application No. 14/090,834, filed on Nov. 26, 2013, now Pat. No. 9,508,092, which is a division of application No. 12/022,874, filed on Jan. 30, 2008, now Pat. No. 8,606,626.

(60) Provisional application No. 60/887,521, filed on Jan. 31, 2007.

(52) U.S. Cl.
CPC ..... *G06Q 30/0245* (2013.01); *G06Q 30/0264* (2013.01); *G06Q 30/0269* (2013.01)

(58) Field of Classification Search
USPC ......... 715/753, 700; 726/9, 6, 1, 25; 703/22; 706/46; 707/793; 700/245
See application file for complete search history.

(56) References Cited

U.S. PATENT DOCUMENTS

| | | |
|---|---|---|
| 4,371,739 A | 2/1983 | Lewis et al. |
| 4,398,055 A | 8/1983 | Ijaz et al. |
| 4,578,530 A | 3/1986 | Zeidler |
| 4,617,195 A | 10/1986 | Mental |
| 4,672,149 A | 6/1987 | Yoshikawa et al. |
| 4,736,294 A | 4/1988 | Gill |
| 4,754,544 A | 7/1988 | Hanak |
| 4,774,664 A | 9/1988 | Campbell et al. |
| 4,775,935 A | 10/1988 | Yourick |
| 4,876,592 A | 10/1989 | Von Kohorn |
| 4,895,518 A | 1/1990 | Arnold |
| 4,947,028 A | 8/1990 | Gorog |
| 4,982,346 A | 1/1991 | Girouard et al. |
| 5,025,138 A | 6/1991 | Cuervo |
| 5,025,373 A | 6/1991 | Keyser, Jr. et al. |
| 5,034,807 A | 7/1991 | Von Kohorn |
| 5,060,153 A | 10/1991 | Nakagawa |
| 5,148,365 A | 9/1992 | Dembo |
| 5,201,010 A * | 4/1993 | Deaton .................. G07G 1/145 382/139 |
| 5,220,501 A | 6/1993 | Lawlor et al. |
| 5,259,766 A | 11/1993 | Sack |
| 5,262,941 A | 11/1993 | Saladin |
| 5,274,547 A | 12/1993 | Zoffel et al. |
| 5,283,731 A | 2/1994 | Lalonde et al. |
| 5,297,031 A | 3/1994 | Gutterman et al. |
| 5,305,195 A | 4/1994 | Murphy |
| 5,325,509 A | 6/1994 | Lautzenheiser |
| 5,336,870 A | 8/1994 | Hughes et al. |
| 5,454,030 A | 9/1995 | de Oliveira et al. |
| 5,459,306 A | 10/1995 | Stein et al. |
| 5,468,988 A | 11/1995 | Glatfelter et al. |
| 5,504,675 A | 4/1996 | Cragun et al. |
| 5,515,098 A | 5/1996 | Carles |
| 5,521,813 A | 5/1996 | Fox et al. |
| 5,563,783 A | 10/1996 | Stolfo et al. |
| 5,583,763 A | 12/1996 | Atcheson et al. |
| 5,590,038 A | 12/1996 | Pitroda |
| 5,592,560 A | 1/1997 | Deaton et al. |
| 5,611,052 A | 3/1997 | Dykstra et al. |
| 5,615,408 A | 3/1997 | Johnson |
| 5,621,201 A | 4/1997 | Langhans et al. |
| 5,627,973 A | 5/1997 | Armstrong et al. |
| 5,629,982 A | 5/1997 | Micali |
| 5,630,127 A | 5/1997 | Moore et al. |
| 5,640,577 A | 6/1997 | Scharmer |
| 5,649,114 A | 7/1997 | Deaton et al. |
| 5,659,731 A | 8/1997 | Gustafson |
| 5,661,516 A | 8/1997 | Carles |
| 5,679,176 A | 10/1997 | Tsuzuki et al. |
| 5,689,651 A | 11/1997 | Lozman |
| 5,692,107 A | 11/1997 | Simoudis et al. |
| 5,696,907 A | 12/1997 | Tom |
| 5,704,029 A | 12/1997 | Wright, Jr. |
| 5,724,521 A | 3/1998 | Dedrick |
| 5,732,400 A | 3/1998 | Mandler |
| 5,740,549 A | 4/1998 | Reilly et al. |
| 5,745,654 A | 4/1998 | Titan |
| 5,748,098 A | 5/1998 | Grace |
| 5,771,562 A | 6/1998 | Harvey et al. |
| 5,774,868 A | 6/1998 | Cragun et al. |
| 5,774,883 A | 6/1998 | Andersen |
| 5,793,972 A | 8/1998 | Shane |
| 5,802,142 A | 9/1998 | Browne |
| 5,819,226 A | 10/1998 | Gopinathan et al. |
| 5,822,750 A | 10/1998 | Jou et al. |
| 5,828,833 A * | 10/1998 | Belville .................. H04L 29/06 726/11 |
| 5,835,915 A | 11/1998 | Carr et al. |
| 5,844,218 A | 12/1998 | Kawan et al. |
| 5,848,396 A | 12/1998 | Gerace |
| 5,857,175 A | 1/1999 | Day et al. |
| 5,864,830 A | 2/1999 | Armetta et al. |
| 5,870,721 A | 2/1999 | Norris |
| 5,873,068 A | 2/1999 | Beaumont et al. |
| 5,875,108 A | 2/1999 | Hoffberg et al. |
| 5,875,236 A | 2/1999 | Jankowitz |
| 5,878,403 A | 3/1999 | DeFrancesco |
| 5,881,131 A * | 3/1999 | Farris ..................... H04M 3/42 379/15.03 |
| 5,884,287 A * | 3/1999 | Edesess ................ G06Q 40/06 705/36 R |
| 5,884,289 A | 3/1999 | Anderson et al. |
| 5,893,090 A * | 4/1999 | Friedman ........... G06F 16/2462 |
| 5,912,839 A | 6/1999 | Ovshinsky et al. |
| 5,924,082 A | 7/1999 | Silverman et al. |
| 5,926,800 A | 7/1999 | Baronowski et al. |
| 5,930,764 A | 7/1999 | Melchione et al. |
| 5,930,774 A | 7/1999 | Chennault |
| 5,930,776 A * | 7/1999 | Dykstra .................. G06Q 40/02 705/38 |
| 5,933,813 A | 8/1999 | Teicher et al. |
| 5,940,812 A | 8/1999 | Tengel et al. |
| 5,944,790 A | 8/1999 | Levy |
| 5,950,172 A | 9/1999 | Klingman |
| 5,953,707 A | 9/1999 | Huang et al. |
| 5,956,693 A | 9/1999 | Geerlings |
| 5,966,695 A | 10/1999 | Melchione et al. |
| 5,974,396 A | 10/1999 | Anderson et al. |
| 5,991,735 A | 11/1999 | Gerace |
| 5,995,947 A | 11/1999 | Fraser et al. |
| 6,014,688 A | 1/2000 | Venkatraman et al. |
| 6,021,362 A | 2/2000 | Maggard et al. |
| 6,026,368 A | 2/2000 | Brown et al. |
| 6,029,139 A | 2/2000 | Cunningham et al. |
| 6,029,149 A | 2/2000 | Dykstra et al. |
| 6,029,154 A | 2/2000 | Pettitt |
| 6,038,551 A | 3/2000 | Barlow et al. |
| 6,044,357 A | 3/2000 | Garg |
| 6,058,375 A | 5/2000 | Park |
| 6,061,658 A | 5/2000 | Chou et al. |
| 6,061,691 A | 5/2000 | Fox |
| 6,064,973 A | 5/2000 | Smith et al. |
| 6,064,987 A | 5/2000 | Walker |
| 6,070,141 A | 5/2000 | Houvener |
| 6,070,142 A | 5/2000 | McDonough et al. |
| 6,070,147 A | 5/2000 | Harms et al. |
| 6,073,140 A | 6/2000 | Morgan et al. |
| 6,088,686 A | 7/2000 | Walker et al. |
| 6,094,643 A | 7/2000 | Anderson et al. |
| 6,101,486 A | 8/2000 | Roberts et al. |
| 6,105,007 A | 8/2000 | Norris |
| 6,115,690 A | 9/2000 | Wong |
| 6,115,693 A | 9/2000 | McDonough et al. |
| 6,119,103 A | 9/2000 | Basch et al. |
| 6,128,599 A | 10/2000 | Walker |
| 6,128,603 A | 10/2000 | Dent |
| 6,134,548 A | 10/2000 | Gottsman et al. |

(56) References Cited

U.S. PATENT DOCUMENTS

| | | | |
|---|---|---|---|
| 6,144,948 A | 11/2000 | Walker et al. | |
| 6,178,442 B1 | 1/2001 | Yamazaki | |
| 6,198,217 B1 | 3/2001 | Suzuki et al. | |
| 6,202,053 B1 | 3/2001 | Christiansen et al. | |
| 6,208,979 B1 | 3/2001 | Sinclair | |
| 6,223,171 B1 | 4/2001 | Chaudhuri et al. | |
| 6,226,408 B1 | 5/2001 | Sirosh | |
| 6,233,566 B1 | 5/2001 | Levine et al. | |
| 6,236,977 B1 | 5/2001 | Verba et al. | |
| 6,239,352 B1 | 5/2001 | Luch | |
| 6,249,770 B1 | 6/2001 | Erwin et al. | |
| 6,254,000 B1 | 7/2001 | Degen et al. | |
| 6,263,334 B1 * | 7/2001 | Fayyad | G06K 9/6226 707/737 |
| 6,263,337 B1 * | 7/2001 | Fayyad | G06K 9/6223 |
| 6,266,649 B1 | 7/2001 | Linden et al. | |
| 6,269,325 B1 | 7/2001 | Lee et al. | |
| 6,278,055 B1 | 8/2001 | Forrest et al. | |
| 6,285,983 B1 | 9/2001 | Jenkins | |
| 6,285,987 B1 | 9/2001 | Roth et al. | |
| 6,289,252 B1 | 9/2001 | Wilson et al. | |
| 6,289,318 B1 | 9/2001 | Barber | |
| 6,298,330 B1 | 10/2001 | Gardenswartz et al. | |
| 6,307,958 B1 | 10/2001 | Deaton et al. | |
| 6,311,169 B2 | 10/2001 | Duhon | |
| 6,317,752 B1 | 11/2001 | Lee et al. | |
| 6,321,205 B1 | 11/2001 | Eder | |
| 6,324,524 B1 | 11/2001 | Lent et al. | |
| 6,324,566 B1 | 11/2001 | Himmel et al. | |
| 6,330,546 B1 | 12/2001 | Gopinathan et al. | |
| 6,330,575 B1 | 12/2001 | Moore et al. | |
| 6,334,110 B1 | 12/2001 | Walter et al. | |
| 6,345,300 B1 * | 2/2002 | Bakshi | H04L 63/029 709/203 |
| 6,366,903 B1 | 4/2002 | Agrawal et al. | |
| 6,385,592 B1 | 5/2002 | Angles et al. | |
| 6,385,594 B1 | 5/2002 | Lebda et al. | |
| 6,393,406 B1 * | 5/2002 | Eder | G06Q 10/06 705/7.37 |
| 6,405,173 B1 | 6/2002 | Honarvar | |
| 6,405,181 B2 | 6/2002 | Lent et al. | |
| 6,412,012 B1 | 6/2002 | Bieganski et al. | |
| 6,418,436 B1 | 7/2002 | Degen et al. | |
| 6,424,956 B1 | 7/2002 | Werbos | |
| 6,430,539 B1 | 8/2002 | Lazarus et al. | |
| 6,442,577 B1 | 8/2002 | Britton et al. | |
| 6,456,979 B1 | 9/2002 | Flagg | |
| 6,457,012 B1 | 9/2002 | Jatkowski | |
| 6,460,036 B1 | 10/2002 | Herz | |
| 5,870,721 C1 | 1/2003 | Norris | |
| 6,505,168 B1 | 1/2003 | Rothman et al. | |
| 6,513,018 B1 * | 1/2003 | Culhane | G06Q 40/00 705/35 |
| 6,542,894 B1 | 4/2003 | Lee et al. | |
| 6,549,919 B2 | 4/2003 | Lambert et al. | |
| 6,567,791 B2 | 5/2003 | Lent et al. | |
| 6,597,775 B2 | 7/2003 | Lawyer et al. | |
| 6,601,234 B1 | 7/2003 | Bowman-Amuah | |
| 6,611,816 B2 | 8/2003 | Lebda et al. | |
| 6,615,193 B1 | 9/2003 | Kingdon et al. | |
| 6,615,247 B1 | 9/2003 | Murphy | |
| 6,622,266 B1 | 9/2003 | Goddard et al. | |
| 6,623,529 B1 | 9/2003 | Lakritz | |
| 6,640,215 B1 | 10/2003 | Galperin et al. | |
| 6,654,727 B2 | 11/2003 | Tilton | |
| 6,658,393 B1 | 12/2003 | Basch et al. | |
| 6,665,715 B1 | 12/2003 | Houri | |
| 6,687,713 B2 | 2/2004 | Mattson et al. | |
| 6,708,166 B1 * | 3/2004 | Dysart | G06F 16/951 707/765 |
| 6,714,918 B2 | 3/2004 | Hillmer et al. | |
| 6,735,572 B2 | 5/2004 | Landesmann | |
| 6,748,426 B1 | 6/2004 | Shaffer et al. | |
| 6,757,740 B1 | 6/2004 | Parekh et al. | |
| 6,782,390 B2 | 8/2004 | Lee et al. | |
| 6,804,346 B1 | 10/2004 | Mewhinney | |
| 6,810,356 B1 | 10/2004 | Garcia-Franco et al. | |
| 6,823,319 B1 | 11/2004 | Lynch et al. | |
| 6,836,764 B1 | 12/2004 | Hucal | |
| 6,839,682 B1 | 1/2005 | Blume et al. | |
| 6,839,690 B1 | 1/2005 | Foth et al. | |
| 6,850,606 B2 | 2/2005 | Lawyer et al. | |
| 6,859,785 B2 | 2/2005 | Case | |
| 6,865,566 B2 | 3/2005 | Serrano-Morales et al. | |
| 6,873,979 B2 | 3/2005 | Fishman et al. | |
| 6,901,406 B2 | 5/2005 | Nabe et al. | |
| 6,910,624 B1 | 6/2005 | Natsuno | |
| 6,925,441 B1 | 8/2005 | Jones, III et al. | |
| 6,925,442 B1 | 8/2005 | Shapira et al. | |
| 6,959,281 B1 | 10/2005 | Freeling et al. | |
| 6,965,889 B2 | 11/2005 | Serrano-Morales et al. | |
| 6,968,328 B1 | 11/2005 | Kintzer et al. | |
| 6,983,478 B1 | 1/2006 | Grauch et al. | |
| 6,985,887 B1 | 1/2006 | Sunstein et al. | |
| 6,991,159 B2 | 1/2006 | Zenou | |
| 6,993,493 B1 | 1/2006 | Galperin et al. | |
| 6,993,514 B2 | 1/2006 | Majoor | |
| 7,000,199 B2 | 2/2006 | Steele et al. | |
| 7,003,504 B1 | 2/2006 | Angus et al. | |
| 7,003,792 B1 | 2/2006 | Yuen | |
| 7,028,052 B2 | 4/2006 | Chapman et al. | |
| 7,031,945 B1 | 4/2006 | Donner | |
| 7,033,792 B2 | 4/2006 | Zhong et al. | |
| 7,039,176 B2 | 5/2006 | Borodow et al. | |
| 7,050,986 B1 | 5/2006 | Vance et al. | |
| 7,050,989 B1 | 5/2006 | Hurt et al. | |
| 7,054,828 B2 | 5/2006 | Heching et al. | |
| 7,072,853 B2 | 7/2006 | Shkedi | |
| 7,072,963 B2 | 7/2006 | Anderson et al. | |
| 7,076,462 B1 | 7/2006 | Nelson et al. | |
| 7,076,475 B2 | 7/2006 | Honarvar et al. | |
| 7,082,435 B1 | 7/2006 | Guzman et al. | |
| 7,085,734 B2 | 8/2006 | Grant et al. | |
| 7,117,172 B1 | 10/2006 | Black | |
| 7,130,853 B2 | 10/2006 | Roller et al. | |
| 7,133,935 B2 | 11/2006 | Hedy | |
| 7,136,448 B1 | 11/2006 | Venkataperumal et al. | |
| 7,143,063 B2 | 11/2006 | Lent | |
| 7,150,030 B1 | 12/2006 | Eldering et al. | |
| 7,152,018 B2 | 12/2006 | Wicks | |
| 7,152,053 B2 | 12/2006 | Serrano-Morales et al. | |
| 7,152,237 B2 | 12/2006 | Flickinger et al. | |
| 7,165,036 B2 | 1/2007 | Kruk et al. | |
| 7,165,037 B2 | 1/2007 | Lazarus et al. | |
| 7,185,353 B2 | 2/2007 | Schlack | |
| 7,191,150 B1 | 3/2007 | Shao et al. | |
| 7,200,602 B2 | 4/2007 | Jonas | |
| 7,212,995 B2 | 5/2007 | Schulkins | |
| 7,234,156 B2 | 6/2007 | French et al. | |
| 7,240,059 B2 | 7/2007 | Bayliss et al. | |
| 7,249,048 B1 | 7/2007 | O'Flaherty | |
| 7,249,114 B2 | 7/2007 | Burchetta et al. | |
| 7,263,506 B2 | 8/2007 | Lee et al. | |
| 7,275,083 B1 | 9/2007 | Seibel et al. | |
| 7,277,875 B2 | 10/2007 | Serrano-Morales et al. | |
| 7,283,974 B2 | 10/2007 | Katz et al. | |
| 7,296,734 B2 | 11/2007 | Pliha | |
| 7,313,618 B2 * | 12/2007 | Braemer | H04L 63/0209 709/225 |
| 7,314,166 B2 | 1/2008 | Anderson et al. | |
| 7,314,167 B1 | 1/2008 | Kiliccote | |
| 7,324,962 B1 | 1/2008 | Valliani et al. | |
| 7,328,169 B2 | 2/2008 | Temares et al. | |
| 7,337,133 B1 | 2/2008 | Bezos et al. | |
| 7,343,149 B2 | 3/2008 | Benco | |
| 7,346,551 B2 | 3/2008 | Pe Jimenez et al. | |
| 7,346,573 B1 | 3/2008 | Cobrinik et al. | |
| 7,356,503 B1 | 4/2008 | Johnson et al. | |
| 7,360,251 B2 | 4/2008 | Spalink et al. | |
| 7,366,694 B2 | 4/2008 | Lazerson | |
| 7,373,324 B1 | 5/2008 | Engin et al. | |
| 7,376,603 B1 | 5/2008 | Mayr et al. | |
| 7,376,618 B1 | 5/2008 | Anderson et al. | |

(56) References Cited

U.S. PATENT DOCUMENTS

| | | |
|---|---|---|
| 7,376,714 B1 | 5/2008 | Gerken |
| 7,379,880 B1 | 5/2008 | Pathria et al. |
| 7,383,215 B1 | 6/2008 | Navarro et al. |
| 7,386,528 B2 | 6/2008 | Maloche et al. |
| 7,386,786 B2 | 6/2008 | Davis et al. |
| 7,392,203 B2 | 6/2008 | Edison et al. |
| 7,392,216 B1 | 6/2008 | Palmgren et al. |
| 7,403,942 B1 | 7/2008 | Bayliss |
| 7,409,362 B2 | 8/2008 | Calabria |
| 7,418,431 B1 | 8/2008 | Nies et al. |
| 7,424,439 B1 | 9/2008 | Fayyad et al. |
| 7,428,509 B2 | 9/2008 | Klebanoff |
| 7,428,519 B2 | 9/2008 | Minsky et al. |
| 7,428,526 B2 | 9/2008 | Miller et al. |
| 7,433,855 B2 | 10/2008 | Gavan et al. |
| 7,444,302 B2 | 10/2008 | Hu et al. |
| 7,451,095 B1 | 11/2008 | Bradley et al. |
| 7,458,508 B1 | 12/2008 | Shao et al. |
| 7,467,401 B2 | 12/2008 | Cicchitto |
| 7,472,088 B2 | 12/2008 | Taylor et al. |
| 7,499,868 B2 | 3/2009 | Galperin et al. |
| 7,505,938 B2 | 3/2009 | Lang et al. |
| 7,509,117 B2 | 3/2009 | Yum |
| 7,512,221 B2 | 3/2009 | Toms |
| 7,516,149 B2 | 4/2009 | Motwani et al. |
| 7,529,698 B2 | 5/2009 | Joao |
| 7,536,346 B2 | 5/2009 | Aliffi et al. |
| 7,536,348 B2 | 5/2009 | Shao et al. |
| 7,542,993 B2 | 6/2009 | Satterfield et al. |
| 7,546,266 B2 | 6/2009 | Beirne et al. |
| 7,546,619 B2 | 6/2009 | Anderson et al. |
| 7,548,886 B2 | 6/2009 | Kirkland et al. |
| 7,552,089 B2 | 6/2009 | Bruer et al. |
| 7,556,192 B2 | 7/2009 | Wokaty, Jr. |
| 7,562,184 B2 | 7/2009 | Henmi et al. |
| 7,571,139 B1 | 8/2009 | Giordano et al. |
| 7,575,157 B2 | 8/2009 | Barnhardt et al. |
| 7,580,856 B1 | 8/2009 | Pliha |
| 7,580,884 B2 | 8/2009 | Cook |
| 7,581,112 B2 | 8/2009 | Brown et al. |
| 7,584,126 B1 | 9/2009 | White |
| 7,584,146 B1 | 9/2009 | Duhon |
| 7,590,589 B2 | 9/2009 | Hoffberg |
| 7,593,893 B1 | 9/2009 | Ladd et al. |
| 7,596,716 B2 | 9/2009 | Frost et al. |
| 7,610,216 B1 | 10/2009 | May et al. |
| 7,610,243 B2 | 10/2009 | Haggerty et al. |
| 7,610,257 B1 | 10/2009 | Abrahams |
| 7,610,261 B2 | 10/2009 | Maloche et al. |
| 7,613,671 B2 | 11/2009 | Serrano-Morales et al. |
| 7,620,592 B2 | 11/2009 | O'Mara et al. |
| 7,620,596 B2 | 11/2009 | Knudson et al. |
| 7,623,844 B2 | 11/2009 | Herrmann et al. |
| 7,624,068 B1 | 11/2009 | Heasley et al. |
| 7,653,592 B1 | 1/2010 | Flaxman et al. |
| 7,657,471 B1 | 2/2010 | Sankaran et al. |
| 7,657,540 B1 | 2/2010 | Bayliss |
| 7,668,769 B2 | 2/2010 | Baker et al. |
| 7,668,840 B2 | 2/2010 | Bayliss et al. |
| 7,672,865 B2 | 3/2010 | Kumar et al. |
| 7,676,418 B1 | 3/2010 | Chung et al. |
| 7,676,751 B2 | 3/2010 | Allen et al. |
| 7,676,756 B2 | 3/2010 | Vedula et al. |
| 7,686,214 B1 | 3/2010 | Shao et al. |
| 7,689,494 B2 | 3/2010 | Torre et al. |
| 7,689,504 B2 | 3/2010 | Warren et al. |
| 7,689,505 B2 | 3/2010 | Kasower |
| 7,689,506 B2 | 3/2010 | Fei et al. |
| 7,690,032 B1 | 3/2010 | Peirce |
| 7,698,236 B2 | 4/2010 | Cox et al. |
| 7,702,550 B2 | 4/2010 | Perg et al. |
| 7,702,576 B2 | 4/2010 | Fahner et al. |
| 7,707,059 B2 | 4/2010 | Reed et al. |
| 7,707,102 B2 | 4/2010 | Rothstein |
| 7,708,190 B2 | 5/2010 | Brandt et al. |
| 7,711,635 B2 | 5/2010 | Steele et al. |
| 7,720,846 B1 | 5/2010 | Bayliss |
| 7,725,300 B2 | 5/2010 | Pinto et al. |
| 7,730,509 B2 | 6/2010 | Boulet et al. |
| 7,734,522 B2 | 6/2010 | Johnson et al. |
| 7,734,523 B1 | 6/2010 | Cui et al. |
| 7,734,539 B2 | 6/2010 | Ghosh et al. |
| 7,739,223 B2 | 6/2010 | Vaschillo et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,752,236 B2 | 7/2010 | Williams et al. |
| 7,761,384 B2 | 7/2010 | Madhogarhia |
| 7,774,272 B2 | 8/2010 | Fahner et al. |
| 7,778,885 B1 | 8/2010 | Semprevivo et al. |
| 7,783,515 B1 | 8/2010 | Kumar et al. |
| 7,783,562 B1 | 8/2010 | Ellis |
| 7,788,147 B2 | 8/2010 | Haggerty et al. |
| 7,788,152 B2 | 8/2010 | Haggerty et al. |
| 7,792,732 B2 | 9/2010 | Haggerty et al. |
| 7,792,864 B1 | 9/2010 | Rice et al. |
| 7,793,835 B1 | 9/2010 | Coggeshall et al. |
| 7,801,811 B1 | 9/2010 | Merrell et al. |
| 7,801,828 B2 | 9/2010 | Candella et al. |
| 7,802,104 B2 | 9/2010 | Dickinson |
| 7,805,345 B2 | 9/2010 | Abrahams et al. |
| 7,805,362 B1 | 9/2010 | Merrell et al. |
| 7,813,981 B2 | 10/2010 | Fahner et al. |
| 7,814,004 B2 | 10/2010 | Haggerty et al. |
| 7,818,231 B2 | 10/2010 | Rajan |
| 7,822,665 B2 | 10/2010 | Haggerty et al. |
| 7,827,115 B2 | 11/2010 | Weller et al. |
| 7,831,526 B1 | 11/2010 | Crawford et al. |
| 7,835,932 B2 | 11/2010 | Minsky et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,844,534 B2 | 11/2010 | Haggerty et al. |
| 7,848,987 B2 | 12/2010 | Haig |
| 7,853,518 B2 | 12/2010 | Cagan |
| 7,853,541 B1 | 12/2010 | Kapadia et al. |
| 7,853,998 B2 | 12/2010 | Blaisdell et al. |
| 7,856,397 B2 | 12/2010 | Whipple et al. |
| 7,856,494 B2 | 12/2010 | Kulkarni |
| 7,860,782 B2 | 12/2010 | Cash et al. |
| 7,870,078 B2 | 1/2011 | Clark et al. |
| 7,877,304 B1 | 1/2011 | Coulter |
| 7,877,320 B1 | 1/2011 | Downey |
| 7,890,420 B2 | 2/2011 | Haggerty et al. |
| 7,908,242 B1 | 3/2011 | Achanta |
| 7,912,770 B2 | 3/2011 | Haggerty et al. |
| 7,912,842 B1 | 3/2011 | Bayliss et al. |
| 7,912,865 B2 | 3/2011 | Akerman et al. |
| 7,925,549 B2 | 4/2011 | Looney et al. |
| 7,925,582 B1 | 4/2011 | Kornegay et al. |
| 7,930,196 B2 | 4/2011 | Fung et al. |
| 7,930,285 B2 | 4/2011 | Abraham et al. |
| 7,937,335 B2 | 5/2011 | Crawford et al. |
| 7,941,363 B2 | 5/2011 | Tanaka et al. |
| 7,949,597 B2 | 5/2011 | Zadoorian et al. |
| 7,953,695 B2 | 5/2011 | Roller et al. |
| 7,958,126 B2 | 6/2011 | Schachter |
| 7,962,404 B1 | 6/2011 | Metzger, II et al. |
| 7,966,255 B2 | 6/2011 | Wong et al. |
| 7,970,676 B2 | 6/2011 | Feinstein |
| 7,970,698 B2 | 6/2011 | Gupta et al. |
| 7,983,976 B2 | 7/2011 | Nafeh et al. |
| 7,991,666 B2 | 8/2011 | Haggerty et al. |
| 7,991,677 B2 | 8/2011 | Haggerty et al. |
| 7,991,689 B1 | 8/2011 | Brunzell et al. |
| 7,996,521 B2 | 8/2011 | Chamberlain et al. |
| 8,005,759 B2 | 8/2011 | Hirtenstein et al. |
| 8,006,261 B1 | 8/2011 | Haberman et al. |
| 8,015,045 B2 | 9/2011 | Galperin et al. |
| 8,019,828 B2 | 9/2011 | Cash et al. |
| 8,019,843 B2 | 9/2011 | Cash et al. |
| 8,024,245 B2 | 9/2011 | Haggerty et al. |
| 8,024,263 B2 | 9/2011 | Zarikian et al. |
| 8,024,264 B2 | 9/2011 | Chaudhuri et al. |

(56) References Cited

U.S. PATENT DOCUMENTS

| | | |
|---|---|---|
| 8,024,778 B2 | 9/2011 | Cash et al. |
| 8,025,220 B2 | 9/2011 | Zoldi et al. |
| 8,027,871 B2 | 9/2011 | Wiliams et al. |
| 8,027,894 B2 | 9/2011 | Feinstein et al. |
| 8,036,979 B1 | 10/2011 | Torrez et al. |
| 8,046,271 B2 | 10/2011 | Jimenez et al. |
| 8,060,424 B2 | 11/2011 | Kasower |
| 8,065,234 B2 | 11/2011 | Liao et al. |
| 8,073,752 B2 | 12/2011 | Haggerty et al. |
| 8,073,768 B2 | 12/2011 | Haggerty et al. |
| 8,073,785 B1 | 12/2011 | Candella et al. |
| 8,078,524 B2 | 12/2011 | Crawford et al. |
| 8,082,202 B2 | 12/2011 | Weiss |
| 8,086,509 B2 | 12/2011 | Haggerty et al. |
| 8,086,524 B1 | 12/2011 | Craig et al. |
| 8,086,525 B2 | 12/2011 | Atwood et al. |
| 8,090,734 B2 | 1/2012 | Maloche et al. |
| 8,099,356 B2 | 1/2012 | Feinstein et al. |
| 8,099,376 B2 | 1/2012 | Serrano-Morales et al. |
| 8,103,530 B2 | 1/2012 | Quiring et al. |
| 8,108,301 B2 | 1/2012 | Gupta et al. |
| 8,121,918 B2 | 2/2012 | Haggerty et al. |
| 8,126,805 B2 | 2/2012 | Sulkowski et al. |
| 8,127,982 B1 | 3/2012 | Casey et al. |
| 8,131,614 B2 | 3/2012 | Haggerty et al. |
| 8,131,639 B2 | 3/2012 | Haggerty et al. |
| 8,135,607 B2 | 3/2012 | Wiliams et al. |
| 8,145,754 B2 | 3/2012 | Chamberlain et al. |
| 8,150,744 B2 | 4/2012 | Zoldi et al. |
| 8,160,960 B1 | 4/2012 | Fei et al. |
| 8,161,104 B2 | 4/2012 | Tomkow |
| 8,170,938 B2 | 5/2012 | Haggerty et al. |
| 8,175,945 B2 | 5/2012 | Haggerty et al. |
| 8,180,654 B2 | 5/2012 | Berkman et al. |
| 8,185,408 B2 | 5/2012 | Baldwin, Jr. et al. |
| RE43,474 E | 6/2012 | Majoor |
| 8,200,595 B1 | 6/2012 | De Zilwa et al. |
| 8,200,609 B2 | 6/2012 | Crawford et al. |
| 8,200,693 B2 | 6/2012 | Steele et al. |
| 8,204,774 B2 | 6/2012 | Chwast et al. |
| 8,209,250 B2 | 6/2012 | Bradway et al. |
| 8,214,238 B1 | 7/2012 | Fairfield et al. |
| 8,214,262 B1 | 7/2012 | Semprevivo et al. |
| 8,234,209 B2 | 7/2012 | Zadoorian et al. |
| 8,237,716 B2 | 8/2012 | Kolipaka et al. |
| 8,255,423 B2 | 8/2012 | Ralph et al. |
| 8,266,090 B2 | 9/2012 | Crawford et al. |
| 8,271,313 B2 | 9/2012 | Williams et al. |
| 8,271,378 B2 | 9/2012 | Chaudhuri et al. |
| 8,271,935 B2 | 9/2012 | Lewis |
| 8,280,805 B1 | 10/2012 | Abrahams et al. |
| 8,280,836 B2 | 10/2012 | Kumar |
| 8,285,577 B1 | 10/2012 | Galperin et al. |
| 8,285,656 B1 | 10/2012 | Chang et al. |
| 8,290,840 B2 | 10/2012 | Kasower |
| 8,296,205 B2 | 10/2012 | Zoldi |
| 8,296,229 B1 | 10/2012 | Yellin et al. |
| 8,301,574 B2 | 10/2012 | Kilger et al. |
| 8,312,389 B2 | 11/2012 | Crawford et al. |
| 8,315,942 B2 | 11/2012 | Haggerty et al. |
| 8,315,943 B2 | 11/2012 | Torrez et al. |
| 8,326,671 B2 | 12/2012 | Haggerty et al. |
| 8,326,672 B2 | 12/2012 | Haggerty et al. |
| 8,326,760 B2 | 12/2012 | Ma et al. |
| 8,352,343 B2 | 1/2013 | Haggerty et al. |
| 8,364,518 B1 | 1/2013 | Blake et al. |
| 8,386,377 B1 | 2/2013 | Xiong et al. |
| 8,392,334 B2 | 3/2013 | Hirtenstein et al. |
| 8,401,889 B2 | 3/2013 | Chwast et al. |
| 8,401,946 B2 | 3/2013 | Zoldi et al. |
| 8,401,950 B2 | 3/2013 | Lyons et al. |
| 8,417,587 B2 | 4/2013 | Jimenez et al. |
| 8,418,254 B2 | 4/2013 | Britti et al. |
| 8,423,488 B2 | 4/2013 | Surpi |
| 8,458,074 B2 | 6/2013 | Showalter |
| 8,463,595 B1 | 6/2013 | Rehling et al. |
| 8,468,198 B2 | 6/2013 | Tomkow |
| 8,478,673 B2 | 7/2013 | Haggerty et al. |
| 8,504,470 B1 | 8/2013 | Chirehdast |
| 8,510,184 B2 | 8/2013 | Imrev et al. |
| 8,510,189 B2 | 8/2013 | Imrey et al. |
| 8,515,862 B2 | 8/2013 | Zhang et al. |
| 8,527,596 B2 | 9/2013 | Long et al. |
| 8,533,322 B2 | 9/2013 | Chamberlain et al. |
| 8,560,434 B2 | 10/2013 | Morris et al. |
| 8,560,666 B2 | 10/2013 | Low |
| 8,595,101 B1 | 11/2013 | Daukas et al. |
| 8,595,219 B1 | 11/2013 | Thompson |
| 8,600,854 B2 | 12/2013 | Mayr et al. |
| 8,600,870 B2 | 12/2013 | Milana |
| 8,606,626 B1 | 12/2013 | DeSoto et al. |
| 8,606,666 B1 | 12/2013 | Courbage et al. |
| 8,626,563 B2 | 1/2014 | Williams et al. |
| 8,626,646 B2 | 1/2014 | Torrez et al. |
| 8,630,929 B2 | 1/2014 | Haggerty et al. |
| 8,639,920 B2 | 1/2014 | Stack et al. |
| 8,660,943 B1 | 2/2014 | Chirehdast |
| 8,682,762 B2 | 3/2014 | Fahner |
| 8,694,390 B2 | 4/2014 | Imrey et al. |
| 8,700,597 B2 | 4/2014 | Gupta et al. |
| 8,706,545 B2 | 4/2014 | Narayanaswamy et al. |
| 8,706,596 B2 | 4/2014 | Cohen et al. |
| 8,706,615 B2 | 4/2014 | Merkle |
| 8,730,241 B2 | 5/2014 | Chhaparwal et al. |
| 8,732,004 B1 | 5/2014 | Ramos et al. |
| 8,738,515 B2 | 5/2014 | Chaudhuri et al. |
| 8,751,378 B2 | 6/2014 | Dornhelm et al. |
| 8,751,461 B2 | 6/2014 | Abraham et al. |
| 8,768,826 B2 | 7/2014 | Imrey et al. |
| 8,775,291 B1 | 7/2014 | Mellman et al. |
| 8,775,299 B2 | 7/2014 | Achanta et al. |
| 8,781,953 B2 | 7/2014 | Kasower |
| 8,781,975 B2 | 7/2014 | Bennett et al. |
| 8,825,544 B2 | 9/2014 | Imrey et al. |
| 8,984,022 B1 | 3/2015 | Crawford et al. |
| 9,043,930 B2 | 5/2015 | Britti et al. |
| 9,058,340 B1 | 6/2015 | Chamberlain et al. |
| 9,063,226 B2 | 6/2015 | Zheng et al. |
| 9,087,335 B2 | 7/2015 | Rane et al. |
| 9,123,056 B2 | 9/2015 | Singh et al. |
| 9,292,581 B2 | 3/2016 | Thompson |
| 9,292,860 B2 | 3/2016 | Singh et al. |
| 9,378,500 B2 | 6/2016 | Jimenez et al. |
| 9,483,236 B2 | 11/2016 | Yershov et al. |
| 9,483,727 B2 | 11/2016 | Zhao et al. |
| 9,489,497 B2 | 11/2016 | MaGill et al. |
| 9,508,092 B1 | 11/2016 | De Soto et al. |
| 9,509,711 B1 | 11/2016 | Keanini |
| 9,563,916 B1 | 2/2017 | Torrez et al. |
| 9,619,579 B1 | 4/2017 | Courbage et al. |
| 9,632,847 B2 | 4/2017 | Raghavan et al. |
| 9,652,802 B1 | 5/2017 | Kasower |
| 9,660,869 B2 | 5/2017 | Ripley et al. |
| 9,690,575 B2 | 6/2017 | Prismon et al. |
| 9,710,663 B2 | 7/2017 | Britti et al. |
| 9,721,267 B2 | 8/2017 | Fahner et al. |
| 9,779,187 B2 | 10/2017 | Gao et al. |
| 9,870,589 B1 | 1/2018 | Arnold et al. |
| 9,916,596 B1 | 3/2018 | DeSoto et al. |
| 9,916,621 B1 | 3/2018 | Wasser et al. |
| 9,990,270 B2 | 6/2018 | Ballal |
| 10,051,088 B2 | 8/2018 | Spence |
| 10,078,868 B1 | 9/2018 | Courbage et al. |
| 10,083,263 B2 | 9/2018 | Gao et al. |
| 10,121,194 B1 | 11/2018 | Torrez et al. |
| 10,133,562 B2 | 11/2018 | Yershov et al. |
| 10,133,980 B2 | 11/2018 | Turner et al. |
| 10,162,630 B2 | 12/2018 | Bouley et al. |
| 10,178,111 B1 | 1/2019 | Wilson et al. |
| 10,242,019 B1 | 3/2019 | Shan et al. |
| 10,262,362 B1 | 4/2019 | Hu et al. |
| 10,311,466 B1 | 6/2019 | DeSoto et al. |
| 10,366,342 B2 | 7/2019 | Zhao et al. |
| 10,380,508 B2 | 8/2019 | Prismon et al. |

(56) References Cited

U.S. PATENT DOCUMENTS

| | | |
|---|---|---|
| 10,402,901 B2 | 9/2019 | Courbage et al. |
| 10,445,152 B1 | 10/2019 | Zhang et al. |
| 10,474,566 B2 | 11/2019 | Indurthivenkata et al. |
| 10,515,412 B2 | 12/2019 | Rocklitz |
| 10,521,735 B2 | 12/2019 | Ballal |
| 10,535,009 B2 | 1/2020 | Turner et al. |
| 10,558,913 B1 | 2/2020 | Turner et al. |
| 10,565,178 B1 | 2/2020 | Rajagopal |
| 10,620,944 B2 | 4/2020 | Prismon et al. |
| 10,643,154 B2 | 5/2020 | Litherland et al. |
| 10,650,449 B2 | 5/2020 | Courbage et al. |
| 10,671,812 B2 | 6/2020 | Bondugula et al. |
| 10,692,105 B1 | 6/2020 | DeSoto et al. |
| 10,713,140 B2 | 7/2020 | Gupta et al. |
| 10,713,596 B2 | 7/2020 | Cozine et al. |
| 10,726,440 B1 | 7/2020 | Bradford |
| 10,789,422 B2 | 9/2020 | Banaszak et al. |
| 10,810,463 B2 | 10/2020 | Min et al. |
| 10,860,549 B2 | 12/2020 | Samara et al. |
| 10,878,341 B2 | 12/2020 | Sadoddin et al. |
| 10,885,055 B2 | 1/2021 | Basant et al. |
| 10,891,691 B2 | 1/2021 | Courbage et al. |
| 10,956,152 B2 | 3/2021 | Bouley et al. |
| 10,963,961 B1 | 3/2021 | Torrez et al. |
| 2001/0011245 A1* | 8/2001 | Duhon ............... G06Q 20/4037 705/38 |
| 2001/0013011 A1 | 8/2001 | Day et al. |
| 2001/0014868 A1 | 8/2001 | Herz et al. |
| 2001/0016833 A1 | 8/2001 | Everling et al. |
| 2001/0027413 A1 | 10/2001 | Bhutta |
| 2001/0039523 A1 | 11/2001 | Iwamoto |
| 2002/0019804 A1 | 2/2002 | Sutton |
| 2002/0023051 A1 | 2/2002 | Kunzle et al. |
| 2002/0023143 A1* | 2/2002 | Stephenson ........... H04L 63/061 709/218 |
| 2002/0035511 A1 | 3/2002 | Haji et al. |
| 2002/0046096 A1 | 4/2002 | Srinivasan et al. |
| 2002/0046099 A1 | 4/2002 | Frengut et al. |
| 2002/0049626 A1 | 4/2002 | Mathis et al. |
| 2002/0049701 A1 | 4/2002 | Nabe et al. |
| 2002/0049738 A1* | 4/2002 | Epstein ................. G06F 16/951 |
| 2002/0049968 A1 | 4/2002 | Wilson et al. |
| 2002/0052836 A1 | 5/2002 | Galperin et al. |
| 2002/0055869 A1 | 5/2002 | Hegg |
| 2002/0055906 A1 | 5/2002 | Katz et al. |
| 2002/0069122 A1 | 6/2002 | Yun et al. |
| 2002/0077964 A1 | 6/2002 | Brody et al. |
| 2002/0082892 A1 | 6/2002 | Raffel et al. |
| 2002/0087460 A1 | 7/2002 | Hornung |
| 2002/0095360 A1 | 7/2002 | Joao |
| 2002/0099641 A1 | 7/2002 | Mills et al. |
| 2002/0099649 A1 | 7/2002 | Lee et al. |
| 2002/0099824 A1 | 7/2002 | Bender et al. |
| 2002/0111845 A1 | 8/2002 | Chong |
| 2002/0123904 A1 | 9/2002 | Amengual et al. |
| 2002/0123928 A1 | 9/2002 | Eldering et al. |
| 2002/0128960 A1 | 9/2002 | Lambiotte et al. |
| 2002/0128962 A1 | 9/2002 | Kasower |
| 2002/0129368 A1 | 9/2002 | Schlack et al. |
| 2002/0133404 A1 | 9/2002 | Pedersen |
| 2002/0133444 A1 | 9/2002 | Sankaran et al. |
| 2002/0138331 A1 | 9/2002 | Hosea et al. |
| 2002/0138333 A1 | 9/2002 | DeCotiis et al. |
| 2002/0138334 A1 | 9/2002 | DeCotiis et al. |
| 2002/0138417 A1 | 9/2002 | Lawrence |
| 2002/0143661 A1 | 10/2002 | Tumulty et al. |
| 2002/0147623 A1 | 10/2002 | Rifaat |
| 2002/0147669 A1 | 10/2002 | Taylor et al. |
| 2002/0147695 A1 | 10/2002 | Khedkar et al. |
| 2002/0161664 A1 | 10/2002 | Shaya et al. |
| 2002/0161711 A1 | 10/2002 | Sartor et al. |
| 2002/0165757 A1 | 11/2002 | Lisser |
| 2002/0169747 A1 | 11/2002 | Chapman et al. |
| 2002/0184255 A1* | 12/2002 | Edd ...................... G06F 16/958 715/205 |
| 2002/0188544 A1 | 12/2002 | Wizon et al. |
| 2002/0194099 A1 | 12/2002 | Weiss |
| 2002/0194103 A1 | 12/2002 | Nabe |
| 2002/0194140 A1 | 12/2002 | Makuck |
| 2002/0198824 A1* | 12/2002 | Cook ..................... G06Q 40/025 705/38 |
| 2003/0000568 A1 | 1/2003 | Gonsiorawski |
| 2003/0002639 A1 | 1/2003 | Huie |
| 2003/0004787 A1 | 1/2003 | Tripp et al. |
| 2003/0004855 A1 | 1/2003 | Dutta et al. |
| 2003/0004865 A1 | 1/2003 | Kinoshita |
| 2003/0009368 A1 | 1/2003 | Kitts |
| 2003/0009393 A1 | 1/2003 | Norris et al. |
| 2003/0009418 A1 | 1/2003 | Green et al. |
| 2003/0009426 A1 | 1/2003 | Ruiz-Sanchez |
| 2003/0018549 A1* | 1/2003 | Fei ........................ G06Q 30/06 705/30 |
| 2003/0018769 A1 | 1/2003 | Foulger et al. |
| 2003/0023489 A1 | 1/2003 | McGuire et al. |
| 2003/0033242 A1 | 2/2003 | Lynch et al. |
| 2003/0033261 A1 | 2/2003 | Knegendorf |
| 2003/0036996 A1 | 2/2003 | Lazerson |
| 2003/0041031 A1 | 2/2003 | Hedy |
| 2003/0041050 A1 | 2/2003 | Smith et al. |
| 2003/0046222 A1 | 3/2003 | Bard et al. |
| 2003/0046223 A1* | 3/2003 | Crawford ............... G06Q 40/00 705/38 |
| 2003/0061132 A1 | 3/2003 | Yu et al. |
| 2003/0061163 A1 | 3/2003 | Durfield |
| 2003/0065563 A1 | 4/2003 | Elliott et al. |
| 2003/0078877 A1 | 4/2003 | Beirne et al. |
| 2003/0093311 A1 | 5/2003 | Knowlson |
| 2003/0093366 A1 | 5/2003 | Halper et al. |
| 2003/0097320 A1 | 5/2003 | Gordon |
| 2003/0105696 A1 | 6/2003 | Kalotay et al. |
| 2003/0110111 A1 | 6/2003 | Nalebuff et al. |
| 2003/0110293 A1 | 6/2003 | Friedman et al. |
| 2003/0113727 A1 | 6/2003 | Girn et al. |
| 2003/0115080 A1 | 6/2003 | Kasravi et al. |
| 2003/0115133 A1 | 6/2003 | Bian |
| 2003/0120591 A1 | 6/2003 | Birkhead et al. |
| 2003/0135451 A1 | 7/2003 | O'Brien et al. |
| 2003/0139986 A1 | 7/2003 | Roberts |
| 2003/0144950 A1 | 7/2003 | O'Brien et al. |
| 2003/0149610 A1 | 8/2003 | Rowan et al. |
| 2003/0158751 A1 | 8/2003 | Suresh et al. |
| 2003/0164497 A1 | 9/2003 | Carcia et al. |
| 2003/0167218 A1 | 9/2003 | Field et al. |
| 2003/0167226 A1 | 9/2003 | Britton et al. |
| 2003/0182214 A1 | 9/2003 | Taylor |
| 2003/0195830 A1 | 10/2003 | Merkoulovitch et al. |
| 2003/0195859 A1 | 10/2003 | Lawrence |
| 2003/0205845 A1 | 11/2003 | Pichler et al. |
| 2003/0208428 A1 | 11/2003 | Raynes et al. |
| 2003/0212618 A1 | 11/2003 | Keyes et al. |
| 2003/0216965 A1 | 11/2003 | Libman |
| 2003/0217003 A1 | 11/2003 | Weinflash et al. |
| 2003/0225656 A1 | 12/2003 | Aberman et al. |
| 2003/0225692 A1 | 12/2003 | Bosch et al. |
| 2003/0233278 A1 | 12/2003 | Marshall |
| 2003/0233323 A1 | 12/2003 | Bilski et al. |
| 2003/0233370 A1 | 12/2003 | Barabas et al. |
| 2003/0233655 A1 | 12/2003 | Gutta et al. |
| 2003/0236738 A1 | 12/2003 | Lange et al. |
| 2004/0002916 A1 | 1/2004 | Timmerman et al. |
| 2004/0006536 A1 | 1/2004 | Kawashima et al. |
| 2004/0010443 A1 | 1/2004 | May et al. |
| 2004/0019518 A1 | 1/2004 | Abraham et al. |
| 2004/0023637 A1 | 2/2004 | Johnson et al. |
| 2004/0024692 A1 | 2/2004 | Turbeville et al. |
| 2004/0029311 A1 | 2/2004 | Snyder et al. |
| 2004/0030649 A1 | 2/2004 | Nelson et al. |
| 2004/0030667 A1 | 2/2004 | Xu et al. |
| 2004/0033375 A1 | 2/2004 | Mori |
| 2004/0034570 A1 | 2/2004 | Davis et al. |
| 2004/0039681 A1 | 2/2004 | Cullen et al. |
| 2004/0039686 A1 | 2/2004 | Klebanoff |
| 2004/0039688 A1 | 2/2004 | Sulkowski et al. |
| 2004/0044615 A1 | 3/2004 | Xue et al. |

(56) References Cited

U.S. PATENT DOCUMENTS

| | | |
|---|---|---|
| 2004/0044617 A1 | 3/2004 | Lu |
| 2004/0046497 A1 | 3/2004 | Shaepkens et al. |
| 2004/0049452 A1 | 3/2004 | Blagg |
| 2004/0054619 A1 | 3/2004 | Watson et al. |
| 2004/0059653 A1 | 3/2004 | Verkuylen et al. |
| 2004/0062213 A1 | 4/2004 | Koss |
| 2004/0078248 A1 | 4/2004 | Altschuler |
| 2004/0078809 A1 | 4/2004 | Drazin |
| 2004/0088221 A1 | 5/2004 | Katz et al. |
| 2004/0093278 A1 | 5/2004 | Burchetta et al. |
| 2004/0098625 A1 | 5/2004 | Lagadec et al. |
| 2004/0102197 A1 | 5/2004 | Dietz |
| 2004/0103147 A1 | 5/2004 | Flesher et al. |
| 2004/0107123 A1 | 6/2004 | Haffner et al. |
| 2004/0107125 A1 | 6/2004 | Guheen et al. |
| 2004/0111305 A1 | 6/2004 | Gavan et al. |
| 2004/0111358 A1 | 6/2004 | Lange et al. |
| 2004/0111363 A1 | 6/2004 | Trench et al. |
| 2004/0117235 A1 | 6/2004 | Shacham |
| 2004/0122730 A1 | 6/2004 | Tucciarone et al. |
| 2004/0122735 A1 | 6/2004 | Meshkin |
| 2004/0128193 A1 | 7/2004 | Brice et al. |
| 2004/0128227 A1 | 7/2004 | Whipple et al. |
| 2004/0128230 A1 | 7/2004 | Oppenheimer et al. |
| 2004/0128232 A1 | 7/2004 | Descloux |
| 2004/0128236 A1 | 7/2004 | Brown et al. |
| 2004/0139025 A1 | 7/2004 | Coleman |
| 2004/0139035 A1 | 7/2004 | Wang |
| 2004/0143526 A1 | 7/2004 | Monasterio et al. |
| 2004/0143546 A1 | 7/2004 | Wood et al. |
| 2004/0153330 A1 | 8/2004 | Miller et al. |
| 2004/0153448 A1 | 8/2004 | Cheng et al. |
| 2004/0158520 A1 | 8/2004 | Noh |
| 2004/0163101 A1 | 8/2004 | Swix |
| 2004/0167793 A1 | 8/2004 | Masuoka et al. |
| 2004/0176995 A1 | 9/2004 | Fusz |
| 2004/0177030 A1 | 9/2004 | Shoham |
| 2004/0177046 A1 | 9/2004 | Ogram |
| 2004/0193535 A1 | 9/2004 | Barazesh |
| 2004/0199456 A1 | 10/2004 | Flint et al. |
| 2004/0199458 A1 | 10/2004 | Ho |
| 2004/0199462 A1 | 10/2004 | Starrs |
| 2004/0199584 A1 | 10/2004 | Kirshenbaum et al. |
| 2004/0205157 A1 | 10/2004 | Bibelnieks et al. |
| 2004/0212299 A1 | 10/2004 | Ishikawa et al. |
| 2004/0220896 A1* | 11/2004 | Finlay ............... G06F 16/24537 |
| 2004/0225586 A1 | 11/2004 | Woods et al. |
| 2004/0225594 A1 | 11/2004 | Nolan, III et al. |
| 2004/0230448 A1 | 11/2004 | Schaich |
| 2004/0230459 A1 | 11/2004 | Dordick et al. |
| 2004/0230527 A1 | 11/2004 | Hansen et al. |
| 2004/0230820 A1 | 11/2004 | Hui Hsu et al. |
| 2004/0243450 A1 | 12/2004 | Bernard, Jr. et al. |
| 2004/0243518 A1 | 12/2004 | Clifton et al. |
| 2004/0261116 A1 | 12/2004 | Mckeown et al. |
| 2005/0015330 A1 | 1/2005 | Beery et al. |
| 2005/0021397 A1 | 1/2005 | Cui et al. |
| 2005/0021476 A1 | 1/2005 | Candella et al. |
| 2005/0027632 A1 | 2/2005 | Zeitoun et al. |
| 2005/0027983 A1 | 2/2005 | Klawon |
| 2005/0033734 A1 | 2/2005 | Chess et al. |
| 2005/0038726 A1 | 2/2005 | Salomon et al. |
| 2005/0050027 A1 | 3/2005 | Yeh et al. |
| 2005/0058262 A1 | 3/2005 | Timmins et al. |
| 2005/0065874 A1 | 3/2005 | Lefner et al. |
| 2005/0086261 A1 | 4/2005 | Mammone |
| 2005/0086579 A1 | 4/2005 | Leitner et al. |
| 2005/0091164 A1 | 4/2005 | Varble |
| 2005/0097039 A1 | 5/2005 | Kulcsar et al. |
| 2005/0102206 A1 | 5/2005 | Savasoglu et al. |
| 2005/0102225 A1 | 5/2005 | Oppenheimer et al. |
| 2005/0102226 A1 | 5/2005 | Oppenheimer et al. |
| 2005/0125350 A1 | 6/2005 | Tidwell et al. |
| 2005/0130704 A1 | 6/2005 | McParland et al. |
| 2005/0137963 A1 | 6/2005 | Ricketts et al. |
| 2005/0144067 A1 | 6/2005 | Farahat et al. |
| 2005/0144641 A1 | 6/2005 | Lewis |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0159996 A1 | 7/2005 | Lazaraus et al. |
| 2005/0177489 A1 | 8/2005 | Neff et al. |
| 2005/0189414 A1 | 9/2005 | Fano et al. |
| 2005/0192008 A1* | 9/2005 | Desai ..................... G06F 21/604<br>455/435.2 |
| 2005/0197953 A1 | 9/2005 | Broadbent et al. |
| 2005/0197954 A1 | 9/2005 | Maitland et al. |
| 2005/0201272 A1 | 9/2005 | Wang et al. |
| 2005/0209922 A1 | 9/2005 | Hofmeister |
| 2005/0222900 A1 | 10/2005 | Fuloria et al. |
| 2005/0222906 A1 | 10/2005 | Chen |
| 2005/0228692 A1 | 10/2005 | Hodgon |
| 2005/0251820 A1 | 11/2005 | Stefanik et al. |
| 2005/0256809 A1 | 11/2005 | Sadri |
| 2005/0262014 A1 | 11/2005 | Fickes |
| 2005/0262158 A1* | 11/2005 | Sauermann ........... G06F 16/284 |
| 2005/0273442 A1 | 12/2005 | Bennett et al. |
| 2005/0278246 A1 | 12/2005 | Friedman et al. |
| 2005/0278542 A1 | 12/2005 | Pierson et al. |
| 2005/0278743 A1 | 12/2005 | Flickinger et al. |
| 2005/0279824 A1 | 12/2005 | Anderson et al. |
| 2005/0288954 A1 | 12/2005 | McCarthy et al. |
| 2005/0288998 A1 | 12/2005 | Verma et al. |
| 2005/0289003 A1 | 12/2005 | Thompson et al. |
| 2006/0004731 A1 | 1/2006 | Seibel et al. |
| 2006/0004753 A1 | 1/2006 | Coifman et al. |
| 2006/0010055 A1 | 1/2006 | Morita et al. |
| 2006/0014129 A1 | 1/2006 | Coleman et al. |
| 2006/0031158 A1 | 2/2006 | Orman |
| 2006/0031747 A1 | 2/2006 | Wada et al. |
| 2006/0032909 A1 | 2/2006 | Seegar |
| 2006/0041443 A1 | 2/2006 | Horvath |
| 2006/0041464 A1 | 2/2006 | Powers et al. |
| 2006/0041840 A1 | 2/2006 | Blair |
| 2006/0059073 A1 | 3/2006 | Walzak |
| 2006/0059110 A1 | 3/2006 | Madhok et al. |
| 2006/0074986 A1 | 4/2006 | Mallalieu et al. |
| 2006/0080126 A1 | 4/2006 | Greer et al. |
| 2006/0080230 A1 | 4/2006 | Freiberg |
| 2006/0080233 A1 | 4/2006 | Mendelovich et al. |
| 2006/0080251 A1 | 4/2006 | Fried et al. |
| 2006/0080263 A1 | 4/2006 | Willis et al. |
| 2006/0089842 A1 | 4/2006 | Medawar |
| 2006/0095363 A1 | 5/2006 | May |
| 2006/0095923 A1 | 5/2006 | Novack et al. |
| 2006/0100954 A1 | 5/2006 | Schoen |
| 2006/0122921 A1 | 6/2006 | Comerford et al. |
| 2006/0129428 A1 | 6/2006 | Wennberg |
| 2006/0129481 A1 | 6/2006 | Bhatt et al. |
| 2006/0131390 A1 | 6/2006 | Kim |
| 2006/0136330 A1* | 6/2006 | DeRoy ................... G06Q 40/02<br>705/38 |
| 2006/0149674 A1* | 7/2006 | Cook ..................... G06Q 40/02<br>705/44 |
| 2006/0155624 A1 | 7/2006 | Schwartz |
| 2006/0155639 A1 | 7/2006 | Lynch et al. |
| 2006/0161435 A1 | 7/2006 | Atef et al. |
| 2006/0173726 A1 | 8/2006 | Hall et al. |
| 2006/0173772 A1 | 8/2006 | Hayes et al. |
| 2006/0173776 A1 | 8/2006 | Shalley et al. |
| 2006/0178189 A1 | 8/2006 | Walker et al. |
| 2006/0178957 A1 | 8/2006 | LeClaire |
| 2006/0178971 A1 | 8/2006 | Owen et al. |
| 2006/0178983 A1 | 8/2006 | Nice et al. |
| 2006/0195390 A1 | 8/2006 | Rusk et al. |
| 2006/0202012 A1 | 9/2006 | Grano et al. |
| 2006/0204051 A1 | 9/2006 | Holland, IV |
| 2006/0206379 A1 | 9/2006 | Rosenberg |
| 2006/0206416 A1 | 9/2006 | Farias |
| 2006/0212350 A1 | 9/2006 | Ellis et al. |
| 2006/0212353 A1 | 9/2006 | Roslov et al. |
| 2006/0218069 A1 | 9/2006 | Aberman et al. |
| 2006/0218079 A1 | 9/2006 | Goldblatt et al. |
| 2006/0224696 A1 | 10/2006 | King et al. |

(56) References Cited

U.S. PATENT DOCUMENTS

| | | |
|---|---|---|
| 2006/0229943 A1 | 10/2006 | Mathias et al. |
| 2006/0229961 A1 | 10/2006 | Lyftogt et al. |
| 2006/0229996 A1* | 10/2006 | Keithley ............... G06Q 30/06 705/75 |
| 2006/0239512 A1 | 10/2006 | Petrillo |
| 2006/0241923 A1 | 10/2006 | Xu et al. |
| 2006/0242046 A1 | 10/2006 | Haggerty et al. |
| 2006/0242047 A1 | 10/2006 | Haggerty et al. |
| 2006/0242048 A1 | 10/2006 | Haggerty et al. |
| 2006/0242050 A1 | 10/2006 | Haggerty et al. |
| 2006/0253323 A1 | 11/2006 | Phan et al. |
| 2006/0253328 A1 | 11/2006 | Kohli et al. |
| 2006/0253358 A1 | 11/2006 | Delgrosso et al. |
| 2006/0259364 A1 | 11/2006 | Strock et al. |
| 2006/0262929 A1 | 11/2006 | Vatanen et al. |
| 2006/0265243 A1 | 11/2006 | Racho et al. |
| 2006/0265323 A1 | 11/2006 | Winter et al. |
| 2006/0267999 A1 | 11/2006 | Cash et al. |
| 2006/0271456 A1 | 11/2006 | Romain et al. |
| 2006/0271457 A1 | 11/2006 | Romain et al. |
| 2006/0271552 A1 | 11/2006 | McChesney et al. |
| 2006/0277102 A1 | 12/2006 | Agliozzo |
| 2006/0277141 A1 | 12/2006 | Palmer |
| 2006/0282328 A1 | 12/2006 | Gerace et al. |
| 2006/0282359 A1 | 12/2006 | Nobili et al. |
| 2006/0287915 A1 | 12/2006 | Boulet et al. |
| 2006/0287919 A1 | 12/2006 | Rubens et al. |
| 2006/0293921 A1 | 12/2006 | McCarthy et al. |
| 2006/0293932 A1 | 12/2006 | Cash et al. |
| 2006/0293954 A1 | 12/2006 | Anderson et al. |
| 2006/0293955 A1 | 12/2006 | Wilson et al. |
| 2006/0293979 A1 | 12/2006 | Cash et al. |
| 2006/0294199 A1 | 12/2006 | Bertholf |
| 2007/0005508 A1 | 1/2007 | Chiang |
| 2007/0011020 A1 | 1/2007 | Martin |
| 2007/0011026 A1 | 1/2007 | Higgins et al. |
| 2007/0011039 A1 | 1/2007 | Oddo |
| 2007/0011083 A1 | 1/2007 | Bird et al. |
| 2007/0016500 A1 | 1/2007 | Chatterji et al. |
| 2007/0016501 A1 | 1/2007 | Chatterji et al. |
| 2007/0016518 A1 | 1/2007 | Atkinson et al. |
| 2007/0016522 A1 | 1/2007 | Wang |
| 2007/0022032 A1 | 1/2007 | Anderson et al. |
| 2007/0022141 A1 | 1/2007 | Singleton et al. |
| 2007/0027778 A1 | 2/2007 | Schellhammer et al. |
| 2007/0027791 A1 | 2/2007 | Young et al. |
| 2007/0030282 A1 | 2/2007 | Cash et al. |
| 2007/0033227 A1 | 2/2007 | Gaito et al. |
| 2007/0038483 A1 | 2/2007 | Wood |
| 2007/0038516 A1 | 2/2007 | Apple et al. |
| 2007/0043654 A1 | 2/2007 | Libman |
| 2007/0055598 A1 | 3/2007 | Arnott et al. |
| 2007/0055599 A1 | 3/2007 | Arnott |
| 2007/0061195 A1 | 3/2007 | Liu et al. |
| 2007/0061243 A1 | 3/2007 | Ramer et al. |
| 2007/0067207 A1 | 3/2007 | Haggerty et al. |
| 2007/0067208 A1 | 3/2007 | Haggerty et al. |
| 2007/0067209 A1 | 3/2007 | Haggerty et al. |
| 2007/0067285 A1 | 3/2007 | Blume et al. |
| 2007/0067297 A1 | 3/2007 | Kublickis |
| 2007/0067437 A1* | 3/2007 | Sindambiwe ......... G06F 16/957 709/224 |
| 2007/0072190 A1 | 3/2007 | Aggarwal |
| 2007/0078741 A1 | 4/2007 | Haggerty et al. |
| 2007/0078835 A1 | 4/2007 | Donnelli |
| 2007/0078985 A1 | 4/2007 | Shao et al. |
| 2007/0083460 A1 | 4/2007 | Bachenheimer |
| 2007/0093234 A1 | 4/2007 | Willis et al. |
| 2007/0094137 A1 | 4/2007 | Phillips et al. |
| 2007/0106582 A1 | 5/2007 | Baker et al. |
| 2007/0112667 A1 | 5/2007 | Rucker |
| 2007/0118393 A1 | 5/2007 | Rosen et al. |
| 2007/0130026 A1 | 6/2007 | O'Pray et al. |
| 2007/0156515 A1 | 7/2007 | Hasselback et al. |
| 2007/0156718 A1 | 7/2007 | Hossfeld et al. |
| 2007/0157110 A1 | 7/2007 | Gandhi et al. |
| 2007/0168246 A1 | 7/2007 | Haggerty et al. |
| 2007/0168267 A1 | 7/2007 | Zimmerman et al. |
| 2007/0169189 A1 | 7/2007 | Crespo et al. |
| 2007/0174122 A1 | 7/2007 | Howard et al. |
| 2007/0192165 A1 | 8/2007 | Haggerty et al. |
| 2007/0192248 A1 | 8/2007 | West |
| 2007/0192409 A1 | 8/2007 | Kleinstern et al. |
| 2007/0205266 A1 | 9/2007 | Carr et al. |
| 2007/0208619 A1 | 9/2007 | Branam et al. |
| 2007/0208653 A1 | 9/2007 | Murphy |
| 2007/0214076 A1 | 9/2007 | Robida et al. |
| 2007/0220611 A1 | 9/2007 | Socolow et al. |
| 2007/0226093 A1 | 9/2007 | Chan et al. |
| 2007/0226114 A1 | 9/2007 | Haggerty et al. |
| 2007/0226130 A1 | 9/2007 | Haggerty et al. |
| 2007/0233857 A1 | 10/2007 | Cheng et al. |
| 2007/0244732 A1 | 10/2007 | Chatterji et al. |
| 2007/0244807 A1 | 10/2007 | Andringa et al. |
| 2007/0271178 A1 | 11/2007 | Davis et al. |
| 2007/0271582 A1 | 11/2007 | Ellis et al. |
| 2007/0282684 A1 | 12/2007 | Prosser et al. |
| 2007/0282730 A1 | 12/2007 | Carpenter et al. |
| 2007/0282736 A1 | 12/2007 | Conlin et al. |
| 2007/0288271 A1 | 12/2007 | Klinkhammer |
| 2007/0288355 A1 | 12/2007 | Roland et al. |
| 2007/0288559 A1 | 12/2007 | Parsadayan |
| 2007/0288950 A1 | 12/2007 | Downey et al. |
| 2007/0288953 A1 | 12/2007 | Sheeman et al. |
| 2007/0294126 A1 | 12/2007 | Maggio |
| 2007/0294163 A1 | 12/2007 | Harmon et al. |
| 2007/0299759 A1 | 12/2007 | Kelly |
| 2007/0299771 A1 | 12/2007 | Brody |
| 2008/0004957 A1 | 1/2008 | Hildreth et al. |
| 2008/0005313 A1 | 1/2008 | Flake et al. |
| 2008/0010206 A1 | 1/2008 | Coleman |
| 2008/0010687 A1 | 1/2008 | Gonen et al. |
| 2008/0015887 A1 | 1/2008 | Drabek et al. |
| 2008/0015938 A1 | 1/2008 | Haddad et al. |
| 2008/0016099 A1 | 1/2008 | Ikeda |
| 2008/0021802 A1 | 1/2008 | Pendleton |
| 2008/0021804 A1 | 1/2008 | Deckoff |
| 2008/0028067 A1 | 1/2008 | Berkhin et al. |
| 2008/0033852 A1 | 2/2008 | Megdal et al. |
| 2008/0040475 A1 | 2/2008 | Bosworth et al. |
| 2008/0059317 A1 | 3/2008 | Chandran et al. |
| 2008/0059449 A1 | 3/2008 | Webster et al. |
| 2008/0065774 A1 | 3/2008 | Keeler |
| 2008/0066188 A1 | 3/2008 | Kwak |
| 2008/0071882 A1 | 3/2008 | Hering et al. |
| 2008/0077526 A1 | 3/2008 | Arumugam |
| 2008/0086368 A1 | 4/2008 | Bauman et al. |
| 2008/0091463 A1 | 4/2008 | Shakamuri |
| 2008/0091535 A1 | 4/2008 | Heiser et al. |
| 2008/0094230 A1 | 4/2008 | Mock et al. |
| 2008/0097768 A1 | 4/2008 | Godshalk |
| 2008/0097928 A1* | 4/2008 | Paulson ............ G06Q 30/0251 705/80 |
| 2008/0103800 A1 | 5/2008 | Domenikos et al. |
| 2008/0103972 A1 | 5/2008 | Lanc |
| 2008/0120155 A1 | 5/2008 | Pliha |
| 2008/0120569 A1 | 5/2008 | Mann et al. |
| 2008/0126233 A1 | 5/2008 | Hogan |
| 2008/0126476 A1 | 5/2008 | Nicholas et al. |
| 2008/0133322 A1 | 6/2008 | Kalia et al. |
| 2008/0133325 A1 | 6/2008 | De et al. |
| 2008/0133531 A1 | 6/2008 | Baskerville et al. |
| 2008/0134042 A1 | 6/2008 | Jankovich |
| 2008/0140476 A1 | 6/2008 | Anand et al. |
| 2008/0140507 A1 | 6/2008 | Hamlisch et al. |
| 2008/0140549 A1 | 6/2008 | Eder |
| 2008/0140694 A1 | 6/2008 | Mangla |
| 2008/0147454 A1 | 6/2008 | Walker et al. |
| 2008/0167883 A1 | 7/2008 | Thavildar Khazaneh |
| 2008/0167936 A1 | 7/2008 | Kapoor |
| 2008/0175360 A1 | 7/2008 | Schwarz et al. |
| 2008/0177836 A1 | 7/2008 | Bennett |
| 2008/0183564 A1 | 7/2008 | Tien et al. |
| 2008/0184289 A1 | 7/2008 | Cristofalo et al. |

(56) References Cited

U.S. PATENT DOCUMENTS

| | | |
|---|---|---|
| 2008/0195425 A1 | 8/2008 | Haggerty et al. |
| 2008/0195600 A1 | 8/2008 | Deakter |
| 2008/0208548 A1 | 8/2008 | Metzger et al. |
| 2008/0208631 A1 | 8/2008 | Morita et al. |
| 2008/0208788 A1 | 8/2008 | Merugu et al. |
| 2008/0215470 A1 | 9/2008 | Sengupta et al. |
| 2008/0221934 A1 | 9/2008 | Megdal et al. |
| 2008/0221947 A1 | 9/2008 | Megdal et al. |
| 2008/0221970 A1 | 9/2008 | Megdal et al. |
| 2008/0221971 A1 | 9/2008 | Megdal et al. |
| 2008/0221972 A1 | 9/2008 | Megdal et al. |
| 2008/0221973 A1 | 9/2008 | Megdal et al. |
| 2008/0221990 A1 | 9/2008 | Megdal et al. |
| 2008/0222016 A1 | 9/2008 | Megdal et al. |
| 2008/0222027 A1 | 9/2008 | Megdal et al. |
| 2008/0228538 A1 | 9/2008 | Megdal et al. |
| 2008/0228539 A1 | 9/2008 | Megdal et al. |
| 2008/0228540 A1 | 9/2008 | Megdal et al. |
| 2008/0228541 A1 | 9/2008 | Megdal et al. |
| 2008/0228556 A1 | 9/2008 | Megdal et al. |
| 2008/0228606 A1 | 9/2008 | Megdal et al. |
| 2008/0228635 A1 | 9/2008 | Megdal et al. |
| 2008/0243680 A1 | 10/2008 | Megdal et al. |
| 2008/0244008 A1 | 10/2008 | Wilkinson et al. |
| 2008/0255897 A1 | 10/2008 | Megdal et al. |
| 2008/0255992 A1 | 10/2008 | Lin |
| 2008/0276271 A1 | 11/2008 | Anderson et al. |
| 2008/0281737 A1 | 11/2008 | Fajardo |
| 2008/0288382 A1 | 11/2008 | Smith et al. |
| 2008/0294540 A1 | 11/2008 | Celka et al. |
| 2008/0294546 A1 | 11/2008 | Flannery |
| 2008/0301016 A1* | 12/2008 | Durvasula ............. G06Q 40/02 705/35 |
| 2008/0301727 A1 | 12/2008 | Cristofalo et al. |
| 2009/0006185 A1 | 1/2009 | Stinson |
| 2009/0006475 A1 | 1/2009 | Udezue et al. |
| 2009/0012889 A1 | 1/2009 | Finch |
| 2009/0018996 A1 | 1/2009 | Hunt et al. |
| 2009/0024505 A1 | 1/2009 | Patel et al. |
| 2009/0037247 A1 | 2/2009 | Quinn |
| 2009/0037323 A1 | 2/2009 | Feinstein et al. |
| 2009/0043637 A1 | 2/2009 | Eder |
| 2009/0044246 A1 | 2/2009 | Sheehan et al. |
| 2009/0044279 A1 | 2/2009 | Crawford et al. |
| 2009/0048957 A1 | 2/2009 | Celano |
| 2009/0076883 A1 | 3/2009 | Kilger et al. |
| 2009/0089190 A1 | 4/2009 | Girulat |
| 2009/0089205 A1 | 4/2009 | Bayne |
| 2009/0094640 A1 | 4/2009 | Anderson et al. |
| 2009/0106150 A1 | 4/2009 | Pelegero et al. |
| 2009/0112650 A1 | 4/2009 | Iwane |
| 2009/0119169 A1 | 5/2009 | Chandratillake et al. |
| 2009/0119199 A1 | 5/2009 | Salahi |
| 2009/0125369 A1 | 5/2009 | Kloostra et al. |
| 2009/0132347 A1 | 5/2009 | Anderson et al. |
| 2009/0132559 A1 | 5/2009 | Chamberlain et al. |
| 2009/0133058 A1 | 5/2009 | Kouritzin et al. |
| 2009/0144102 A1 | 6/2009 | Lopez |
| 2009/0144160 A1 | 6/2009 | Haggerty et al. |
| 2009/0144201 A1 | 6/2009 | Gierkink et al. |
| 2009/0177480 A1 | 7/2009 | Chen et al. |
| 2009/0182653 A1 | 7/2009 | Zimiles |
| 2009/0182872 A1 | 7/2009 | Hong |
| 2009/0199264 A1 | 8/2009 | Lang |
| 2009/0210886 A1 | 8/2009 | Bhojwani et al. |
| 2009/0216591 A1 | 8/2009 | Buerger et al. |
| 2009/0222308 A1 | 9/2009 | Zoldi et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0228918 A1 | 9/2009 | Rolff et al. |
| 2009/0234775 A1 | 9/2009 | Whitney et al. |
| 2009/0240609 A1 | 9/2009 | Cho et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0254476 A1 | 10/2009 | Sharma et al. |
| 2009/0276368 A1 | 11/2009 | Martin et al. |
| 2009/0288109 A1 | 11/2009 | Downey et al. |
| 2009/0313163 A1 | 12/2009 | Wang et al. |
| 2009/0319648 A1 | 12/2009 | Dutta et al. |
| 2009/0327120 A1 | 12/2009 | Eze et al. |
| 2010/0009320 A1 | 1/2010 | Wilkelis |
| 2010/0010935 A1 | 1/2010 | Shelton |
| 2010/0017300 A1 | 1/2010 | Bramlage et al. |
| 2010/0030649 A1 | 2/2010 | Ubelhor |
| 2010/0037255 A1 | 2/2010 | Sheehan et al. |
| 2010/0043055 A1 | 2/2010 | Baumgart |
| 2010/0082384 A1 | 4/2010 | Bohrer et al. |
| 2010/0094758 A1 | 4/2010 | Chamberlain et al. |
| 2010/0094768 A1 | 4/2010 | Miltonberger |
| 2010/0100945 A1 | 4/2010 | Ozzie et al. |
| 2010/0107225 A1 | 4/2010 | Spencer et al. |
| 2010/0114744 A1 | 5/2010 | Gonen |
| 2010/0121767 A1 | 5/2010 | Coulter et al. |
| 2010/0130172 A1 | 5/2010 | Vendrow et al. |
| 2010/0138290 A1 | 6/2010 | Zschocke et al. |
| 2010/0145836 A1 | 6/2010 | Baker et al. |
| 2010/0169264 A1 | 7/2010 | O'Sullivan |
| 2010/0205662 A1 | 8/2010 | Ibrahim et al. |
| 2010/0211445 A1 | 8/2010 | Bodington |
| 2010/0217837 A1 | 8/2010 | Ansari et al. |
| 2010/0223168 A1 | 9/2010 | Haggerty et al. |
| 2010/0228657 A1 | 9/2010 | Kagarlis |
| 2010/0229245 A1 | 9/2010 | Singhal |
| 2010/0248681 A1 | 9/2010 | Phills |
| 2010/0250364 A1 | 9/2010 | Song et al. |
| 2010/0250434 A1 | 9/2010 | Megdal et al. |
| 2010/0250469 A1 | 9/2010 | Megdal et al. |
| 2010/0268660 A1 | 10/2010 | Ekdahl |
| 2010/0274739 A1 | 10/2010 | Haggerty et al. |
| 2010/0293114 A1 | 11/2010 | Khan et al. |
| 2010/0312717 A1 | 12/2010 | Haggerty et al. |
| 2010/0312769 A1 | 12/2010 | Bailey et al. |
| 2011/0004498 A1 | 1/2011 | Readshaw |
| 2011/0016042 A1 | 1/2011 | Cho et al. |
| 2011/0023115 A1 | 1/2011 | Wright |
| 2011/0029388 A1 | 2/2011 | Kendall et al. |
| 2011/0035333 A1 | 2/2011 | Haggerty et al. |
| 2011/0047071 A1 | 2/2011 | Choudhuri et al. |
| 2011/0060905 A1 | 3/2011 | Stack et al. |
| 2011/0066495 A1 | 3/2011 | Ayloo et al. |
| 2011/0078073 A1 | 3/2011 | Annappindi et al. |
| 2011/0093383 A1 | 4/2011 | Haggerty et al. |
| 2011/0112958 A1 | 5/2011 | Haggerty et al. |
| 2011/0126275 A1 | 5/2011 | Anderson et al. |
| 2011/0131131 A1 | 6/2011 | Griffin et al. |
| 2011/0137789 A1 | 6/2011 | Kortina et al. |
| 2011/0161323 A1 | 6/2011 | Hagiwara |
| 2011/0164746 A1 | 7/2011 | Nice et al. |
| 2011/0173116 A1 | 7/2011 | Yan et al. |
| 2011/0178899 A1 | 7/2011 | Huszar |
| 2011/0178922 A1 | 7/2011 | Imrey et al. |
| 2011/0184851 A1 | 7/2011 | Megdal et al. |
| 2011/0211445 A1 | 9/2011 | Chen |
| 2011/0213641 A1 | 9/2011 | Metzger, II et al. |
| 2011/0218826 A1 | 9/2011 | Birtel et al. |
| 2011/0219421 A1 | 9/2011 | Ullman et al. |
| 2011/0238566 A1 | 9/2011 | Santos |
| 2011/0258050 A1 | 10/2011 | Chan et al. |
| 2011/0258142 A1 | 10/2011 | Haggerty et al. |
| 2011/0264581 A1 | 10/2011 | Clyne |
| 2011/0270618 A1 | 11/2011 | Banerjee et al. |
| 2011/0270779 A1 | 11/2011 | Showalter |
| 2011/0282779 A1 | 11/2011 | Megdal et al. |

(56) References Cited

U.S. PATENT DOCUMENTS

| | | |
|---|---|---|
| 2011/0307397 A1 | 12/2011 | Benmbarek |
| 2012/0005070 A1 | 1/2012 | McFall et al. |
| 2012/0011056 A1 | 1/2012 | Ward et al. |
| 2012/0029956 A1 | 2/2012 | Ghosh et al. |
| 2012/0035980 A1 | 2/2012 | Haggerty et al. |
| 2012/0047219 A1 | 2/2012 | Feng et al. |
| 2012/0054592 A1 | 3/2012 | Jaffe et al. |
| 2012/0066065 A1 | 3/2012 | Switzer |
| 2012/0066106 A1 | 3/2012 | Papadimitriou |
| 2012/0084230 A1 | 4/2012 | Megdal et al. |
| 2012/0089605 A1 | 4/2012 | Bangalore et al. |
| 2012/0101938 A1 | 4/2012 | Kasower |
| 2012/0101939 A1 | 4/2012 | Kasower |
| 2012/0106801 A1 | 5/2012 | Jackson |
| 2012/0116807 A1 | 5/2012 | Hane et al. |
| 2012/0123968 A1 | 5/2012 | Megdal et al. |
| 2012/0124498 A1 | 5/2012 | Santoro et al. |
| 2012/0136763 A1 | 5/2012 | Megdal et al. |
| 2012/0143637 A1 | 6/2012 | Paradis et al. |
| 2012/0173339 A1 | 7/2012 | Flynt et al. |
| 2012/0179536 A1 | 7/2012 | Kalb et al. |
| 2012/0191479 A1 | 7/2012 | Gupta et al. |
| 2012/0265661 A1 | 10/2012 | Megdal et al. |
| 2012/0290660 A1 | 11/2012 | Rao et al. |
| 2012/0296724 A1 | 11/2012 | Faro et al. |
| 2013/0085902 A1 | 4/2013 | Chew |
| 2013/0103571 A1 | 4/2013 | Chung et al. |
| 2013/0132151 A1 | 5/2013 | Stibel et al. |
| 2013/0159168 A1 | 6/2013 | Evans |
| 2013/0173359 A1 | 7/2013 | Megdal et al. |
| 2013/0218638 A1 | 8/2013 | Kilger et al. |
| 2013/0238413 A1 | 9/2013 | Carlson et al. |
| 2013/0268324 A1 | 10/2013 | Megdal et al. |
| 2013/0275331 A1 | 10/2013 | Megdal et al. |
| 2013/0293363 A1 | 11/2013 | Plymouth |
| 2014/0006523 A1 | 1/2014 | Hofman et al. |
| 2014/0012633 A1 | 1/2014 | Megdal et al. |
| 2014/0019331 A1 | 1/2014 | Megdal et al. |
| 2014/0025815 A1 | 1/2014 | Low |
| 2014/0032265 A1 | 1/2014 | Paprocki et al. |
| 2014/0032384 A1 | 1/2014 | Megdal et al. |
| 2014/0096249 A1 | 4/2014 | Dupont et al. |
| 2014/0156501 A1 | 6/2014 | Howe |
| 2014/0164112 A1 | 6/2014 | Kala |
| 2014/0244353 A1 | 8/2014 | Winters |
| 2014/0316969 A1 | 10/2014 | Imrey |
| 2014/0365357 A1 | 12/2014 | Bohrer et al. |
| 2015/0051948 A1 | 2/2015 | Aizono et al. |
| 2015/0066772 A1 | 3/2015 | Griffin et al. |
| 2015/0286747 A1 | 10/2015 | Anastasakos et al. |
| 2015/0332414 A1 | 11/2015 | Unser |
| 2015/0363328 A1 | 12/2015 | Candelaria |
| 2016/0086190 A1 | 3/2016 | Bohrer et al. |
| 2016/0171542 A1 | 6/2016 | Fanous et al. |
| 2016/0210224 A1 | 7/2016 | Cohen et al. |
| 2016/0246581 A1 | 8/2016 | Jimenez et al. |
| 2017/0200222 A1 | 7/2017 | Barber et al. |
| 2017/0278182 A1 | 9/2017 | Kasower |
| 2018/0025273 A1 | 1/2018 | Jordan et al. |
| 2018/0189871 A1 | 7/2018 | Lennert |
| 2019/0012736 A1 | 1/2019 | Courbage et al. |
| 2019/0042947 A1 | 2/2019 | Turner et al. |
| 2019/0318255 A1 | 10/2019 | Ripley et al. |
| 2019/0340526 A1 | 11/2019 | Turner et al. |
| 2019/0347092 A1 | 11/2019 | Bouley et al. |
| 2019/0354613 A1 | 11/2019 | Zoldi et al. |
| 2019/0354853 A1 | 11/2019 | Zoldi et al. |
| 2020/0026642 A1 | 1/2020 | Indurthivenkata et al. |
| 2020/0034419 A1 | 1/2020 | Bondugula et al. |
| 2020/0042887 A1 | 2/2020 | Marcé et al. |
| 2020/0043091 A1 | 2/2020 | Courbage et al. |
| 2020/0082302 A1 | 3/2020 | Zoldi et al. |
| 2020/0090080 A1 | 3/2020 | Ballal |
| 2020/0097591 A1 | 3/2020 | Basant et al. |
| 2020/0097881 A1 | 3/2020 | Krone et al. |
| 2020/0098041 A1 | 3/2020 | Lawrence et al. |
| 2020/0104734 A1 | 4/2020 | Turner et al. |
| 2020/0134387 A1 | 4/2020 | Liu et al. |
| 2020/0134439 A1 | 4/2020 | Turner et al. |
| 2020/0134474 A1 | 4/2020 | Marcé et al. |
| 2020/0134500 A1 | 4/2020 | Marcé et al. |
| 2020/0159989 A1 | 5/2020 | Banaszak et al. |
| 2020/0202425 A1 | 6/2020 | Taylor-Shoff et al. |
| 2020/0218629 A1 | 7/2020 | Chen et al. |
| 2020/0242216 A1 | 7/2020 | Zoldi et al. |
| 2020/0250185 A1 | 8/2020 | Anderson et al. |
| 2020/0250556 A1 | 8/2020 | Nourian et al. |
| 2020/0250716 A1 | 8/2020 | Laura |
| 2020/0265059 A1 | 8/2020 | Patel et al. |
| 2020/0265513 A1 | 8/2020 | Drotos et al. |
| 2020/0272853 A1 | 8/2020 | Zoldi et al. |
| 2020/0293557 A1 | 9/2020 | Farrell et al. |
| 2020/0293912 A1 | 9/2020 | Williams et al. |
| 2020/0342556 A1 | 10/2020 | Zoldi et al. |
| 2020/0371756 A1 | 11/2020 | Oburu et al. |
| 2020/0387832 A1 | 12/2020 | Jordan et al. |
| 2020/0394357 A1 | 12/2020 | Banaszak et al. |
| 2020/0401894 A1 | 12/2020 | Turner et al. |
| 2020/0410362 A1 | 12/2020 | Turner et al. |
| 2021/0011909 A1 | 1/2021 | Kunjur |
| 2021/0012418 A1 | 1/2021 | Feinstein et al. |
| 2021/0042647 A1 | 2/2021 | Turner et al. |
| 2021/0049137 A1 | 2/2021 | Samara et al. |
| 2021/0049428 A1 | 2/2021 | Huang et al. |
| 2021/0049503 A1 | 2/2021 | Nourian et al. |
| 2021/0049565 A1 | 2/2021 | Anderson et al. |

FOREIGN PATENT DOCUMENTS

| | | |
|---|---|---|
| AU | 2021200434 | 2/2021 |
| CA | 3 059 314 | 3/2020 |
| CN | 1290373 | 4/2001 |
| CN | 1290372 | 5/2001 |
| DE | 91 08 341 | 10/1991 |
| EP | 0 350 907 | 1/1990 |
| EP | 0 468 440 | 1/1992 |
| EP | 0 554 083 | 8/1993 |
| EP | 0 566 736 | 8/1993 |
| EP | 0 749 081 | 12/1996 |
| EP | 0 869 652 | 10/1998 |
| EP | 0 913 789 | 5/1999 |
| EP | 1 028 401 | 8/2000 |
| EP | 1 122 664 | 8/2001 |
| EP | 3 572 985 | 11/2019 |
| EP | 3 573 009 | 11/2019 |
| EP | 3 690 762 | 8/2020 |
| EP | 3 699 827 | 8/2020 |
| EP | 3 719 710 | 10/2020 |
| GB | 2 392 748 | 3/2004 |
| GB | 2 579 139 | 6/2020 |
| JP | 10-293732 | 11/1998 |
| JP | 2001-282957 | 10/2001 |
| JP | 2002-163449 | 6/2002 |
| JP | 2003-016261 | 1/2003 |
| JP | 2003-316950 | 11/2003 |
| TW | I256569 | 6/2006 |
| WO | WO 94/006103 | 3/1994 |
| WO | WO 97/023838 | 7/1997 |
| WO | WO 98/049643 | 11/1998 |
| WO | WO 99/004350 | 1/1999 |
| WO | WO 99/008218 | 2/1999 |
| WO | WO 99/022328 | 5/1999 |
| WO | WO 99/033012 | 7/1999 |
| WO | WO 99/046710 | 9/1999 |
| WO | WO 00/055789 | 9/2000 |
| WO | WO 00/055790 | 9/2000 |
| WO | WO 01/010090 | 2/2001 |
| WO | WO 01/011522 | 2/2001 |
| WO | WO 01/016896 | 3/2001 |
| WO | WO 01/025896 | 4/2001 |
| WO | WO 01/039090 | 5/2001 |
| WO | WO 01/039589 | 6/2001 |
| WO | WO 01/041083 | 6/2001 |
| WO | WO 01/057720 | 8/2001 |

(56) References Cited

FOREIGN PATENT DOCUMENTS

| | | |
|---|---|---|
| WO | WO 01/075754 | 10/2001 |
| WO | WO 01/080053 | 10/2001 |
| WO | WO 01/084281 | 11/2001 |
| WO | WO 02/001462 | 1/2002 |
| WO | WO 02/027610 | 4/2002 |
| WO | WO 03/071388 | 8/2003 |
| WO | WO 03/101123 | 12/2003 |
| WO | WO 2004/046882 | 6/2004 |
| WO | WO 2004/061563 | 7/2004 |
| WO | WO 2004/114160 | 12/2004 |
| WO | WO 2005/001627 | 1/2005 |
| WO | WO 2005/059781 | 6/2005 |
| WO | WO 2007/149941 | 12/2007 |
| WO | WO 2008/022289 | 2/2008 |
| WO | WO 2008/054403 | 5/2008 |
| WO | WO 2008/127288 | 10/2008 |
| WO | WO 2008/148819 | 12/2008 |
| WO | WO 2009/076555 | 6/2009 |
| WO | WO 2009/117518 | 9/2009 |
| WO | WO 2009/132114 | 10/2009 |
| WO | WO 2010/062537 | 6/2010 |
| WO | WO 2010/132492 | 11/2010 |
| WO | WO 2014/018900 | 1/2014 |
| WO | WO 2015/162681 | 10/2015 |
| WO | WO 2016/160539 | 10/2016 |
| WO | WO 2016/164680 | 10/2016 |
| WO | WO 2018/057701 | 3/2018 |
| WO | WO 2018/084867 | 5/2018 |
| WO | WO 2018/128866 | 7/2018 |
| WO | WO 2019/035809 | 2/2019 |
| WO | WO 2019/067497 | 4/2019 |
| WO | WO 2019/088972 | 5/2019 |
| WO | WO 2019/089990 | 5/2019 |
| WO | WO 2019/094910 | 5/2019 |
| WO | WO 2019/104088 | 5/2019 |
| WO | WO 2019/104089 | 5/2019 |
| WO | WO 2019/217876 | 11/2019 |
| WO | WO 2020/055904 | 3/2020 |
| WO | WO 2020/142417 | 7/2020 |
| WO | WO 2020/219839 | 10/2020 |
| WO | WO 2021/034932 | 2/2021 |
| WO | WO 2021/050346 | 3/2021 |

OTHER PUBLICATIONS

U.S. Appl. No. 14/090,834, U.S. Pat. No. 9,508,092, Systems and Methods for Providing a Direct Marketing Campaign Planning Environment, filed Nov. 26, 2013.
U.S. Appl. No. 15/356,415, U.S. Pat. No. 9,916,596, Systems and Methods for Providing a Direct Marketing Campaign Planning Environment, filed Nov. 18, 2016.
U.S. Appl. No. 15/884,027, U.S. Pat. No. 10,311,466, Systems and Methods for Providing a Direct Marketing Campaign Planning Environment, filed Jan. 30, 2018.
U.S. Appl. No. 16/422,486, U.S. Pat. No. 10,692,105, Systems and Methods for Providing a Direct Marketing Campaign Planning Environment, filed May 24, 2019.
U.S. Appl. No. 12/220,320, filed Jul. 23, 2008, Brunzell et al.
U.S. Appl. No. 12/705,489, filed Feb. 12, 2010, Bargoli et al.
U.S. Appl. No. 12/705,511, filed Feb. 12, 2010, Bargoli et al.
"A Google Health update," Google Official Blog, Sep. 15, 2010 in 4 pages, http://googleblog.blogspot.com/2010/09/google-health-update.html.
"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159.
"Accenture Newsroom: Accenture Completes Acquisition of Media Audits: Acquisition Expands Company's Marketing Sciences and Data Services Capabilities," accenture.com, Dec. 12, 2005, 2 pages, http://accenture.tekgroup.com/article_display.cfm?article_id=428.

Akl, Selim G., "Digital Signatures: A Tutorial Survey," Computer, Feb. 1983, pp. 15-24.
"Atlas On Demand, Concurrent, and Everstream Strike Video-On-Demand Advertising Alliance", www.atlassolutions.com, Jul. 13, 2006, 3 pages.
"Arbitron 2006 Black Consumers," Arbitron Inc., lvtsg.com, Jul. 8, 2006, 2 pages, http://www.lvtsg.com/news/publish/Factoids/article_3648.shtml.
"Atlas On Demand and C-COR Join Forces to Offer Advertising Management Solution for On Demand TV: Global Provider of On Demand Systems Partners with Atlas to Develop and Market Comprehensive VOD Advertising Solution," www.atlassolutions.com, Jul. 25, 2005, 3 pages.
"Atlas On Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Bar" Jun. 22, 2006—3 pages, http://www.atlassolutions.com/news_20060622.aspx.
Adzilla, Press Release, "Zillacasting Technology Approved and Patent Pending," http://www.adzilla.com/newsroom/pdf/patent_051605.pdf, May 16, 2005, pp. 2.
AISG's National Underwriting Database, A-Plus, is Now the Largest in the Industry, Business Wire, Aug. 7, 1997.
AFX New Limited—AFX International Focus, "Nielsen moving to measure off-TV viewing," Jun. 14, 2006, 1 page.
Announcing TrueProfiler, http://web.archive.org/web/20021201123646/http://www.truecredit.com/index.asp, dated Dec. 1, 2002, 2 pages.
Applied Geographic Solutions, "What is MOSAIC™", as captured Feb. 15, 2004 from http://web.archive.org/web/20040215224329/http://www.appliedgeographic.com/mosaic.html in 2 pages.
"AT&T Expected to Turn Up Heat in Card Wars", American Banker, May 27, 1993, vol. 158, No. 101, pp. 3.
Bachman, Katy, "Arbitron, VNU Launch Apollo Project," mediaweek.com Jan. 17, 2006, 3 pages, http://www.mediaweek.com/mw/search/article_display.jsp?schema=&vnu_content_id=1001847353.
"Balance Transfers Offer Opportunities", Risk Credit Risk Management Report, Jan. 29, 1996, vol. 6, No. 2, pp. 2.
"Bank of America Direct Web-Based Network Adds Core Functionality to Meet Day-To-Day Treasury Needs", Business Wire, Oct. 25, 1999. pp. 2.
Bitran et al., "Mailing Decisions in Catalog Sales Industry", Management Science (JSTOR), vol. 42, No. 9, pp. 1364-1381, Sep. 1996.
Brown et al., "ALCOD IDSS:Assisting the Australian Stock Market Surveillance Team's Review Process," Applied Artificial Intelligence Journal, Dec. 1, 1996, pp. 625-641.
Bult et al., "Optimal Selection for Direct Mail," Marketing Science, 1995, vol. 14, No. 4, pp. 378-394.
Burr Ph.D., et al., "Utility Payments as Alternative Credit Data: A Reality Check", Asset Builders of America, Inc., Oct. 5, 2006, pp. 1-18, Washington, D.C.
"Cable Solution Now, The Industry Standard for Information Management: Strata's TIM.net Crosses Important Threshold Dominant Solution for All Top 20 TV Markets," stratag.com, Apr. 28, 2006, 1 page, http://stratag.com/news/cablepress042806.html.
Caliendo, et al., "Some Practical Guidance for the Implementation of Propensity Score Matching", IZA:Discussion Paper Series, No. 1588, Germany, May 2005, pp. 32.
Cantor, R. and Packer, F., "The Credit Rating Industry," FRBNY Quarterly Review, Summer-Fall, 1994, pp. 1-24.
Card Marketing, Use the Latest CRM Tools and Techniques, www.CardForum.com, vol. 5 No. 10, Dec. 2001.
ChannelWave.com, PRM Central—About PRM, http://web.archive.org/web/20000510214859/http://www.channelwave.com as printed on Jun. 21, 2006, May 2000 Archive.
"Chase Gets Positive," Bank Technology News, May 6, 2000, vol. 14, No. 5, p. 33.
Chatterjee et al., "Expenditure Patterns and Aggregate Consumer Behavior, Some Experiments with Australian and New Zealand Data", The Economic Record, vol. 70, No. 210, Sep. 1994, pp. 278-291.

(56) References Cited

OTHER PUBLICATIONS

Chen, et al., "Modeling Credit Card 'Share of Wallet': Solving the Incomplete Information Problem", New York University: Kauffman Management Center, http://www.rhsmith.umd.edu/marketing/pdfs_docs/seminarsspr05/abstract%20-%20chen.pdf , Spring 2005, 48 pages.
"Claritas Forms Life Insurance Consortium with Worldwide Financial Services Association: Initiative with LIMRA International is First of its Kind to Provide Actual Sales Information at Small Geographic Areas," Feb. 9, 2006, 3 pages, http://www.claritas.com/claritas/Default/jsp?ci=5&si=1&pn=limra.
"Claritas Introduces PRIZM NE Consumer Electronic Monitor Profiles: New Information Product Provides Insight Into the Public's Purchasing Behaviors of Consumer Electronics," May 30, 2006, 3 pages.
"Cole Taylor Bank Chooses Integrated E-Banking/E-Payments/Reconciliation Solution From Fundtech", Business Wire, Oct. 21, 1999, pp. 2.
Corepoint Health, "The Continuity of Care Document—Changing the Landscape of Healthcare Information Exchange," Jan. 2009, pp. 9.
CreditAnalyst, Digital Matrix Systems, as printed out Mar. 4, 2008, pp. 2.
CreditXpert, http://www.creditxpert.com/Products/individuals.asp printed Oct. 12, 2012 in 1 page.
Click Z, "ISPs Collect User Data for Behavioral Ad Targeting," dated Jan. 3, 2008, printed from http://www.clickz.com/showPage.html?page=clickz Apr. 16, 2008.
cnet news.com, "Target me with your ads, please," dated Dec. 5, 2007, printed from http://www.news.com/2102-1024_3-6221241.html?tag+st.util.print Mar. 18, 2008.
ComScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.
Cowie, Norman, "Warning Bells & 'The Bust-Out'", Business Credit, Jul. 1, 2000, pp. 5.
Creamer, Matthew; Consulting in marketing; Accenture, Others Playing Role in Firms' Processes, Crain's Chicago Business, Jun. 12, 2006, 2 pages.
Credit Card Management, "Neural Nets Shoot for Jackpot," Dec. 1995, pp. 1-6.
Credit Risk Management Report, Potomac, Mar. 9, 1998, vol. 8, No. 4.
CreditXpert Inc., CreditXpert 3-Bureau Comparison™, 2002, pp. 5, http://web.archive.org/web/20030608171018/http://creditxpert.com/CreditXpert%203-Bureau%20Comparison(TM)%20sample.pdf.
CreditXpert Inc., CreditXpert Credit Score & Analysis™, Jan. 11, 2000, pp. 6, http://web.archive.org/web/20030611070058/http://www.creditxpert.com/CreditXpert%20Score%20&%20Analysis%20and%20Credit%20Wizard%20sample.pdf.
CreditXpert Inc., CreditXpert Essentials™, Advisor View—Experian on Jul. 7, 2003, http://www.creditxpert.com/cx_ess_app.pdf.
CreditXpert Inc., CreditXpert Essentials™, Advisor View—TransUnion on Oct. 10, 1999, pp. 6, http://web.archive.org/web/20041211052543/http://creditxpert.com/cx_ess_app.pdf.
CreditXpert Inc., CreditXpert Essentials™, Applicant View—TransUnion on Oct. 10, 1999, pp. 6, http://www.creditxpert.com/cx_ess_app.pdf.
CreditXpert Inc., CreditXpert What-If Simulator™, 2002, pp. 8, http://web.archive.org/web/20030630132914/http://creditxpert.com/CreditXpert%20What-If%20Simulator(TM)%20sample.pdf.
Dataman Group, "Summarized Credit Statistics," Aug. 22, 2001, http://web.archive.org/web/20010822113446/http://www.datamangroup.com/summarized_credit.asp.
David, Alexander, "Controlling Information Premia by Repackaging Asset-Backed Securities," The Journal of Risk and Insurance, Dec. 1997, 26 pages.
Davies, Donald W., "Applying the RSA Digital Signature to Electronic Mail," Computer, Feb. 1983, pp. 55-62.
Dé, Andy, "Will mHealth Apps and Devices Empower ePatients for Wellness and Disease Management? A Case Study," Jan. 10, 2011 in 6 pages, http://www.healthsciencestrategy.com/2011/04/will-mhealth-apps-and-devices-empower-epatients-for-wellness-and-disease-management-a-case-study-2/.
DeGruchy, et al., "Geodemographic Profiling Benefits Stop-Smoking Service;" The British Journal of Healthcare Computing & Information Management; Feb. 2007; 24, 7; pp. 29-31.
Delany et al., "Firm Mines Offline Data to Target Online", http://web.archive.org/web/20071117140456/http://www.commercialalert.org/news/archive/2007/10/firm-mines-offline-data-to-target-online-ads, Commercial Alert, Oct. 17, 2007, pp. 3.
demographicsnow.com, sample reports, "Age Rank Report", Jul. 17, 2006, 3 pages.
demographicsnow.com, sample reports, "Consumer Expenditure Summary Report", Jul. 17, 2006, 3 pages.
demographicsnow.com, sample reports, "Income Comparison Report", Jul. 17, 2006, 4 pages.
Dillon et al., "Good Science", Marketing Research: A Magazine of Management & Applications TM, Winter 1997, vol. 9, No. 4; pp. 11.
Dymi, Amilda, Need for Leads Spurs Some Upgrades, Origination News—Special Report, May 1, 2008, vol. vol. 17, Issue No. 8, pp. p. 24, Atlanta, Copyright 2008 SourceMedia, Inc.
EFunds Corporation, "Data & Decisioning: Debit Report" printed Apr. 1, 2007, http://www.efunds.com/web/industry-solutions/financial-services/frm-debit-report/htm in 1 page.
Egol, Len; "What's New in Database Marketing Software," Direct, Aug. 1994, vol. 6, No. 8, pp. 39.
"Epsilon Leads Discussion on Paradigm Shift in TV Advertising," epsilon.com, Jun. 24, 2004, 2 pages, http://www.epsilon.com/who-pr_tvad040624.html.
Equifax; "White Paper: Driving Safe Growth in a Fluid Economy", http://www.equifax.com/assets/USCIS/efx_safeGrowth_wp.pdf, Oct. 2012 in 14 pages.
Equifax; "True In-Market Propensity Scores™", http://www.equifax.com/assets/USCIS/efx-00174-11-13_efx_tips.pdf, Nov. 2013 in 1 page.
Ettorre, "Paul Kahn on Exceptional Marketing," Management Review, vol. 83, No. 11, Nov. 1994, pp. 48-51.
"Equifax and FICO Serve Consumers", Mortgage Servicing News, Mar. 2001, vol. 5, No. 3, p. 19.
Experian Announces Plus Score; Experian Press Release dated Oct. 16, 2003; Experian Global Press Office.
Experian and AGS Select SRC to Deliver Complete Marketing Solutions; Partnership First to Marketplace with Census2000 Data. PR Newswire. New York: Mar. 21, 2001. p. 1.
"Experian Helps Verify the Identity of Patients and Provide Secure Enrollment to Healthcare Portals by Integrating with Major Electronic Medical Records Platform," http://press.experian.com/United-States/Press-Release/experian-helps-verify-the-identity-of-patients-and-provide-secure-enrollment-to-healthcare.aspx?&p=1, Dec. 19, 2013, pp. 2.
"Experian Launches Portfolio Monitor—Owner NoticesSM", News Release, Feb. 2003, Costa Mesa, CA.
Experian—Scorex Announces New Credit Simulation Tool, PR Newswire, Costa Mesa, CA, Jun. 13, 2005.
Experian; "Case study: SC Telco Federal Credit Union", http://annualcreditreport.experian.com/assets/consumer-information/case-studies/sc-telco-case-study.pdf, Jun. 2011 in 2 pages.
Experian; "In the Market ModelsSM", http://www.experian.com/assets/consumer-information/product-sheets/in-the-market-models.pdf, Sep. 2013 in 2 pages.
Experian Information Solutions, Inc., Credit Trends: Access Credit Trending Information Instantly, http://kewaneecreditbureau.com/Credit.Trends.pdf, Aug. 2000, pp. 4.
Fair Isaac Announces Integrated, End-to-End Collection and Recovery Solution, Business Wire, New York, Sep. 2, 2004, p. 1.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.

(56) References Cited

OTHER PUBLICATIONS

Fanelli, Marc, "Building a Holistic Customer View", MultiChannel Merchant, Jun. 26, 2006, pp. 2.
Fickenscher, Lisa, "Merchant American Express Seeks to Mine its Data on Cardholder Spending Patterns," American Banker, vol. 162, Issue 56, Mar. 24, 1997, pp. 1-2.
"FinExtra, Basepoint Analytics Introduces Predictive Technology for Mortgage Fraud", Oct. 5, 2005, pp. 3.
Fisher, Joseph, "Access to Fair Credit Reports: Current Practices and Proposed Legislation," American Business Law Journal, Fall 1981, vol. 19, No. 3, p. 319.
Frontporch, "Ad Networks—Partner with Front Porch!," www.frontporch.com printed Apr. 2008 in 2 pages.
Frontporch, "New Free Revenue for Broadband ISPs!", http://www.frontporch.com/html/bt/FPBroadbandISPs.pdf printed May 28, 2008 in 2 pages.
"FTC Testifies: Identity Theft on the Rise", FTC News Release, Mar. 7, 2000, pp. 3.
GAO-03-661, Best Practices: Improved Knowledge of DOD Service Contracts Could Reveal Significant Savings, GAO, Jun. 2003.
Gao et al., "Exploring Temporal Effects for Location Recommendation on Location-Based Social Networks", RecSys'13, Oct. 12-16, 2013, Hong Kong, China, pp. 93-100.
Gilje, Shelby, "Keeping Tabs on Businesses That Keep Tabs on Us", NewsRoom, The Seattle Times, Section: Scene, Apr. 19, 1995, pp. 4.
Glenn, Brandon, "Multi-provider patient portals get big boost with ONC ruling", Feb. 25, 2013, http://medicaleconomics.modernmedicine.com/medical-economics/news/user-defined-tags/meaningful-use/multi-provider-patient-portals-get-big-boost in 2 pages.
Gonul, et al., "Optimal Mailing of Catalogs: A New Methodology Using Estimable Structural Dynamic Programming Models", 14 pages, Management Science, vol. 44, No. 9, Sep. 1998.
Halliday, Jean, "Ford Recruits Accenture for Marketing Plan," Automotive News Feb. 13, 2006, 2 pages, Crain Communications.
Haughton et al., "Direct Marketing Modeling with CART and CHAID", Journal of Direct Marketing, Fall 1997, vol. 11, No. 4, pp. 42-52.
Healow.com, Various screenshots from page titled "Health and Online Wellness," https://healow.com/apps/jsp/webview/index.jsp printed Aug. 19, 2013 in 4 pages.
Healthspek.com, "How Good Are We?" http://healthspek.com/how-good-are-we/ printed Jan. 21, 2014 in 2 pages.
"Healthspek Users Can Now Import Their Doctors' Records into Their Personal Health Record," PRWeb, Nashville, TN, Jan. 14, 2014, pp. 1 http://www.prweb.com/releases/2014/01/prweb11485346.htm.
HealthVault, "Share Health Information," https://account.healthvault.com/sharerecord.aspx, printed Feb. 20, 2013 in 2 pages.
HealthVault, "What Can you do with HealthVault?" https://www.healthvault.com/us/en/overview, http://www.eweek.com/mobile/diversinet-launches-mobihealth-wallet-for-patient-data-sharing/, printed Feb. 20, 2013 in 2 pages.
Helm, Burt, "Nielsen's New Ratings Yardstick," businessweek.com, Jun. 20, 2006, 3 pages, http://www.businessweek.com/technology/content/jun2006/tc20060620_054223.htm.
Hill, Kerry, "Identity Theft Your Social Security Number Provides Avenue for Thieves", NewsRoom, Wisconsin State Journal, Sep. 13, 1998, pp. 4.
Hinman, Donald P., "The Perfect Storm: Response Metrics and Digital TV," chiefmarketer.com, May 17, 2006, 2 pages, http://www.chiefmarketer.com/crm_loop/roi/perfect-storm-051706/index.html.
Horowitz, Brian T., "Diversinet Launches MobiHealth Wallet for Patient Data Sharing," eWeek, Dec. 4, 2012, http://www.eweek.com/mobile/diversinet-launches-mobihealth-wallet-for-patient-data-sharing/.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Ideon, Credit-Card Registry that Bellyflopped this Year, Is Drawing some Bottom-Fishers, The Wall Street Journal, Aug. 21, 1995, pp. C2.
igiHealth.com, "Orbit® PHR: Personal Health Record (PHR)," http://www.igihealth.com/consumers/orbit_phr.html, printed Jan. 21, 2014 in 2 pages.
"Impac Funding Introduces Enhanced Website for Static Pool Tracking of MBS Transactions," Waltham, MA; Webpage printed out from http://www.lewtan.com/press/1208044_Impac-Lewtan.htm on Mar. 20, 2008.
"Industry News, New Technology Identifies Mortgage Fraud: Basepoint Analytics Launches FraudMark", Inman News, American Land Title Association, Oct. 5, 2005, pp. 1.
Information Resources, Inc. and Navic Networks Form Joint Relationship to Support Next Generation of Technology for Advertising Testing, IRI Expands BehaviorScan® Solution to Meet Digital and On-demand Needs, Feb. 27, 2006, http://us.infores.com/page/news/pr/pr_archive?mode=single&pr_id=117, printed Oct. 4, 2007 in 2 pages.
InsightsOne.com, "Healthcare," http://insightsone.com/healthcare-predictive-analytics/ printed Mar. 6, 2014 in 5 pages.
Instant Access to Credit Reports Now Available Online with DMS' CreditBrowser-based system also Simplifies Credit Decisioning and Offers a Central Point of Control, Business Wire, Dallas, May 23, 2000, p. 0264.
"Intelligent Miner Applications Guide", IBM Corp., Apr. 2, 1999, Chapters 4-7, pp. 33-132.
Internal Revenue Service Data Book 2000, Issued Aug. 2001, Revised May 2003.
"IRI and Acxiom Introduce More Efficient and Actionable Approach to Consumer Segmentation and Targeted Marketing," eu-marketingportal.de, Jan. 26, 2006, 2 pages, http://www.eu-marketingportal.de.
Jacob et al., A Case Study of Checking Account Inquiries and Closures in Chicago, The Center for Financial Services Innovation, Nov. 2006.
Jost, Allen; Neural Networks, Credit World, Mar./Apr. 1993, vol. 81, No. 4, pp. 26-33.
"JPMorgan Worldwide Securities Services to Acquire Paloma's Middle and Back Office Operations," Webpage printed from http://www.jpmorgan.com on Apr. 1, 2009.
Lamons, Bob, "Be Smart: Offer Inquiry Qualification Services," Marketing News, ABI/Inform Global, Nov. 6, 1995, vol. 29, No. 23, pp. 13.
Lee, W.A.; "Experian, on Deal Hunt, Nets Identity Theft Insurer", American Banker: The Financial Services Daily, Jun. 4, 2003, New York, NY, 1 page.
LifeLock, http://web.archive.org/web/20110724011010/http://www.lifelock.com/? as archived Jul. 24, 2011 in 1 page.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock, Various Pages, www.lifelock.com/, 2007.
Longo, Tracey, "Managing Money: Your Family Finances", Kiplinger's Personal Finance Magazine, Jun. 1, 1995, vol. 49, No. 6, pp. 4.
McManus et al.; "Street Wiser," American Demographics; ABI/Inform Global; Jul./Aug. 2003; 25, 6; pp. 32-35.
McNamara, Paul, "Start-up's pitch: The Envelope, please," Network World, Apr. 28, 1997, vol. 14, No. 17, p. 33.
MergePower, Inc., "Attribute Pro", http://web.archive.org/web/20060520135324/http://www.mergepower.com/attribute_pro.html, dated May 20, 2006 in 1 page.
MergePower, Inc., "Attribute Pro", http://web.archive.org/web/20080708204709/http:/www.mergepower.com/APInfo.aspx, dated Jul. 8, 2008 in 2 pages.
MergePower, Inc., "Attribute Pro®—Credit Bureau Attributes", http://web.archive.org/web/20120307000028/http:/www.mergepower.com/APInfo.aspx, dated Mar. 7, 2012 in 2 pages.

(56) References Cited

OTHER PUBLICATIONS

MergePower, Inc., "MergePower, Inc", http://web.archive.org/web/20060513003556/http:/www.mergepower.com/, dated May 13, 2006 in 1 page.

MergePower, Inc., "MergePower, Inc", http://web.archive.org/web/20070208144622/http:/www.mergepower.com/, dated Feb. 8, 2007 in 1 page.

MergePower, Inc., "MergePower, Inc", http://web.archive.org/web/20070914144019/http:/www.mergepower.com/, dated Sep. 14, 2007 in 1 page.

MergePower, Inc., "MergePower, Inc", http://web.archive.org/web/20110828073054/http:/www.mergepower.com/, dated Aug. 28, 2011 in 2 pages.

"Mediamark Research Inc. Releases Findings From Mobile Marketing Consumer Study; Outback Steakhouse and Royal Caribbean Cruise Lines Among Brands Participating in Mobile Marketing Research," www.thefreelibrary.com, May 9, 2006, 4 pages.

MERit Credit Engine™, Diagram, http://creditengine.net/diagram.htm, copyright 1997, pp. 1.

Merugu, et al.; "A New Multi-View Regression Method with an Application to Customer Wallet Estimation," The 12th International Conference on Knowledge Discovery and Data Mining, Aug. 20-23, 2006, Philadelphia, PA.

Morrissey, Brian, "Aim High: Ad Targeting Moves to the Next Level", Adweek, dated Jan. 21, 2008 as downloaded from http://www.adweek.com/aw/magazine/article_display.isp?vnu on Apr. 16, 2008.

Muus, et al., "A Decision Theoretic Framework for Profit Maximization in Direct Marketing", Sep. 1996, pp. 20.

NebuAd, "Venture Capital: What's New—The Latest on Technology Deals From Dow Jones VentureWire", Press Release, http://www.nebuad.com/company/media_coverage/media_10_22_07.php, Oct. 22, 2007, pp. 2.

"New FICO score extends lenders' reach to credit-underserved millions", Viewpoints: News, Ideas and Solutions from Fair Isaac, Sep./Oct. 2004 as downloaded from http://www.fairisaac.com/NR/exeres/F178D009-B47A-444F-BD11-8B4D7D8B3532,frame . . . in 6 pages.

"New Privista Product Provides Early Warning System to Combat Identity Theft", PR Newswire, Oct. 24, 2000, PR Newswire Association, Inc., New York.

Occasional CF Newsletter; http://www.halhelms.com/index.cfm?fuseaction=newsletters.oct1999; Oct. 1999.

Office of Integrated Analysis and Forecasting, DOE/EIA-M065(2004), Model Documentation Report: Macroeconomic Activity Module (MAM) of the National Energy Modeling System, EIA, Washington DC, Feb. 2004.

Otter, et al., "Direct Mail Selection by Joint Modeling of the Probability and Quantity of Response", Jun. 1997, pp. 14.

Pagano, et al., "Information Sharing in Credit Markets," Dec. 1993, The Journal of Finance, vol. 48, No. 5, pp. 1693-1718.

"Parse", Definition from PC Magazine Encyclopedia, http://www/pcmag.com/encyclopedia_term_0,2542,t=parse&i=48862,00.asp as downloaded Mar. 5, 2012.

Partnoy, Frank, Rethinking Regulation of Credit Rating Agencies: An Institutional Investor Perspective, Council of Institutional Investors, Apr. 2009, pp. 21.

Perlich et al., "High Quantile Modeling for Customer Wallet Estimation with Other Applications," The 13th International Conference on Knowledge Discovery and Data Mining, Aug. 12-15, 2007, San Jose, CA.

Phorm, "BT PLC TalkTalk and Virgin Media Inc. confirm exclusive agreements with Phorm", Press Release, http://www.phorm.com/about/launch_agreement.php, Feb. 14, 2008, pp. 2.

Phorm, "The Open Internet Exchange, 'Introducing the OIX'", http://www.phorm.com/oix/ printed May 29, 2008 in 1 page.

Polatoglu et al., "Theory and Methodology, Probability Distributions of Cost, Revenue and Profit over a Warranty Cycle", European Journal of Operational Research, Jul. 1998, vol. 108, Issue 1, pp. 170-183.

"PostX to Present at Internet Showcase", PR Newswire, Apr. 28, 1997, pp. 2.

PostX, "PostX® Envelope and ActiveView", http://web.archive.org/web/19970714203719/http://www.postx.com/priducts_fm.html, Jul. 14, 1997 (retrieved Nov. 7, 2013) in 2 pages.

Powerforms: Declarative Client-Side for Field Validation, ISSN 1386-145x, Dec. 2000.

Predictive Behavioral Targeting http://www.predictive-behavioral-targeting.com/index.php.Main_Page as printed Mar. 28, 2008 in 4 pages.

"PremierGuide Announces Release 3.0 of Local Search Platform", Business Wire, Mar. 4, 2004, Palo Alto, CA, p. 5574.

PrivacyGuard, http://web.archive.org/web/20110728114049/http://www.privacyguard.com/ as archived Jul. 28, 2011 in 1 page.

RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007.

Reinartz et al., "On the Profitability of Long-Life Customers in a Noncontractual Setting: An Empirical Investigation and Implications for Marketing" Journal of Marketing, Oct. 2000, vol. 64, pp. 17-35.

Reinbach, Andrew, "MCIF Aids Banks in CRA Compliance", Bank Systems & Technology, Aug. 1995, vol. 32, No. 8, p. 27.

Rosset et al., "Wallet Estimation Models", IBM TJ Watson Research Center, 2005, Yorktown Heights, NY, pp. 12.

Saunders, A., "Data Goldmine," Management Today, London: Mar. 1, 2004, 6 pages.

Schmittlein et al., "Customer Base Analysis: An Industrial Purchase Process Application", Marketing Science, vol. 13, No. 1, Winter 1994, pp. 41-67.

"ScoreNet® Network", FairIsaac, web.archive.org/web/20071009014242/http://www.fairisaac.com/NR/rdonlyres/AC4C2F79-4160-4E44-B0CB-5C899004879A/0/ScoreNetnetworkBR.pdf, May 2006, pp. 6.

Shvachko et al., "The Hadoop Distributed File System", 2010 IEEE 26th Symposium on Mass Storage Systems and Technologies (MSST), May 3, 2010, pp. 1-10.

Singletary, Michelle, "Score One for Open Credit Ratings", The Washington Post, Washington DC, Jun. 18, 2000, 3 pages.

Smith, Richard M., "The Web Bug FAQ", Nov. 11, 1999, Version 1.0, pp. 4.

"SRC Announces Free Dashups to Mashups Adding Geographic Business Intelligence at Web Speed to the Enterprise on www.FreeDemographics.com/API," directionsmag.com, Jun. 12, 2006, 3 pages, http://www.directionsmag.com/press.releases/index.php?duty=Show&id=1.

"SRC Delivers Industry's First Drive Time Engine Developed to Follow Actual Road Networks," thomasnet.com, May 21, 2006, 4 pages, http://news.thomasnet.com/companystory/485722.

"STAGG Variables Sum Up Credit Attributes for Automated Decisions", PRWeb, May 11, 2011, pp. 2. http://www.prweb.com/releases/2011/5/prweb8404324.htm.

Stanton, T.H., "Credit Scoring and Loan Scoring as Tools for Improved Management of Federal Credit Programs", Financier, Philadelphia, Summer 1999, vol. 6, 36 pages.

Stein, Benchmarking Default Prediction Models: Pitfalls and Remedies in Model Validation, Moody's KMV, Revised Jun. 13, 2002, Technical Report #020305; New York.

Sumner, Anthony, "Tackling the Issue of Bust-Out Fraud", Retail Banker International, Jul. 24, 2007, pp. 4.

Sweat, Jeff; "Know Your Customers," Information Week, Nov. 30, 1998, pp. 20.

Tao, Lixin, "Shifting Paradigms with the Application Service Provider Model"; Concordia University, IEEE, Oct. 2001, Canada.

Tennant, Don, "How a Health Insurance Provider Uses Big Data to Predict Patient Needs," http://www.itbusinessedge.com/blogs/from-under-the-rug/how-a-health-insurance-provider-uses-big-data-to-predict-patient-needs.html, printed Mar. 6, 2014 in 2 pages.

Thoemmes, Felix, "Propensity Score Matching in SPSS", Center for Educational Science and Psychology, University of Tübingen, Jan. 2012.

(56) References Cited

OTHER PUBLICATIONS

Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
UPI, "Nielsen Media Research goes electronic," Jun. 14, 2006, 1 page.
Van Collie, Shimon, "The Road to Better Credit-Card Marketing," Bank Technology News, Sep. 1995, pp. 4.
Verstraeten, Geert, Ph.D.; Issues in predictive modeling of individual customer behavior: Applications in targeted marketing and consumer credit scoring; Universiteit Gent (Belgium) 2005.
"VOD Integration Now Available in Strata: Buyers / Sellers Benefit from VOD Component on Popular Platform," stratag.com, Feb. 21, 2006, 1 page, http://www.stratag.com/news/mediapress022106.html.
Watts, Craig, "Consumers Now Can Know What Loan Rate Offers to Expect Based on Their FICO Credit Score at MyFICO.com," San Rafael, CA, Mar. 6, 2002, pp. 2, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health," May 21, 2002, pp. 3, http://www.myfico.com/PressRoom/PressReleases/2002_05_21.aspx.
Webber, Richard, "The Relative Power of Geodemographics vis a vis Person and Household Level Demographic Variables as Discriminators of Consumer Behavior," CASA:Working Paper Series, http://www.casa.ucl.ac.uk/working_papers/paper84.pdf, Oct. 2004, pp. 17.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.
Whitney, Daisy; Atlas Positioning to Shoulder VOD Ads; Campaign Management Tools Optimize Inventory, TelevisionWeek, May 23, 2005, 3 pages.
Wyatt, Craig, "Usage Models just for Merchants," Credit Card Management, Sep. 1995, vol. 8, No. 6, pp. 4.
Yuan et al., "Time-Aware Point-of-Interest Recommendation", SIGIR'13, Jul. 28-Aug. 1, 2013, Dublin, Ireland, pp. 363-372.
Yücesan et al., "Distributed Web-Based Simulation Experiments for Optimization", Simulation Practice and Theory 9, 2001, pp. 73-90.
Zimmerman et al., "A Web-Based Platform for Experimental Investigation of Electric Power Auctions," Decision Support Systems, 1999, vol. 24, pp. 193-205.
Declaration of Paul Clark, DSc. for Inter Partes Review of U.S. Pat. No. 8,504,628 (Symantec Corporation, Petitioner), dated Jan. 15, 2014 in 76 pages.
Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al.* v. *Experian Marketing Solutions. Inc.*, No. 2:12-cv-00513-JRG (E.D. Tex.)) Filed Jan. 14, 2014 in 9 pages.
First Amended Complaint in Civil Action No. 2:12-cv-511-JRG (*Rpost Holdings, Inc. and Rpost Communications Limited* V. *Constant Contact, Inc.; et al.*) filed Feb. 11, 2013 in 14 pages.
First Amended Complaint in Civil Action No. 2:12-cv-511-JRG (*Rpost Holdings, Inc. and Rpost Communications Limited* V. *Epsilon Data Management, LLC.*) filed Sep. 13, 2013 in 9 pages.
First Amended Complaint in Civil Action No. 2:12-cv-513-JRG (*Rpost Holdings, Inc. and Rpost Communications Limited* V. *Experian Marketing Solutions, Inc.*) filed Aug. 30, 2013 in 9 pages.
Petition for Covered Business Method Patent Review in U.S. Pat. No. 8,161,104 (*Experian Marketing Solutions, Inc., Epsilon Data Management, LLC, and Constant Contact, Inc.*, v. *Rpost Communications Limited*) dated Jan. 29, 2014 in 90 pages.
Source Code Appendix attached to U.S. Appl. No. 08/845,722 by Venkatraman et al., Exhibit A, Part 1 & 2, pp. 32.
Official Communication in Canadian Patent Application No. 2,381,349, dated May 17, 2013.
Official Communication in Canadian Patent Application No. 2,381,349, dated Jul. 31, 2014.
International Preliminary Examination Report in International Application No. PCT/US00/21453 dated, Jun. 26, 2001.
Application as filed in U.S. Appl. No. 10/452,155, dated May 30, 2003.
Preliminary Amendment in U.S. Appl. No. 10/452,155, dated Sep. 15, 2003.
Office Action in U.S. Appl. No. 10/452,155, dated Jan. 25, 2008.
Examiner Interview Summary in U.S. Appl. No. 10/452,155, dated Jul. 23, 2008.
Office Action in U.S. Appl. No. 10/452,155, dated Oct. 2, 2008.
Examiner Interview Summary in U.S. Appl. No. 10/452,155, dated Jan. 14, 2009.
Examiner Interview Summary in U.S. Appl. No. 10/452,155, dated Jul. 21, 2009.
Notice of Allowance in U.S. Appl. No. 10/452,155, dated Aug. 19, 2009.
International Search Report for Application No. PCT/US2005/041814, dated Aug. 29, 2007.
International Preliminary Report on Patentability and Written Opinion for Application No. PCT/US2005/041814, dated Dec. 27, 2007.
International Search Report and Written Opinion for Application No. PCT/US2007/06070, dated Nov. 10, 2008.
International Search Report and Written Opinion for Application No. PCT/US2008/064594, dated Oct. 30, 2008.
International Preliminary Report and Written Opinion in PCT/US2008/064594, dated Dec. 10, 2009.
International Search Report and Written Opinion for Application No. PCT/US09/37565, dated May 12, 2009.
International Search Report and Written Opinion for Application No. PCT/US2013/052342, dated Nov. 21, 2013.
International Preliminary Report on Patentability for Application No. PCT/US2013/052342, dated Feb. 5, 2015.
International Search Report and Written Opinion for Application No. PCT/US2017/068340, dated Feb. 26, 2018.
International Preliminary Report on Patentability in Application No. PCT/US2017/068340, dated Jul. 18, 2019.
Application as filed in U.S. Appl. No. 09/790,453, dated Feb. 22, 2001.
Office Action in U.S. Appl. No. 09/790,453, dated Jan. 20, 2006.
Office Action in U.S. Appl. No. 09/790,453, dated Jul. 11, 2006.
Office Action in U.S. Appl. No. 09/790,453, dated Dec. 1, 2006.
Office Action in U.S. Appl. No. 09/790,453, dated May 10, 2007.
Office Action in U.S. Appl. No. 09/790,453, dated Mar. 21, 2008.
Application as filed in U.S. Appl. No. 10/183,135, filed Jun. 25, 2002.
Office Action in U.S. Appl. No. 10/183,135, dated Oct. 22, 2007.
Final Office Action in U.S. Appl. No. 10/183,135, dated Apr. 14, 2008.
Office Action in U.S. Appl. No. 10/183,135, dated Aug. 21, 2008.
Office Action in U.S. Appl. No. 10/183,135, dated Feb. 26, 2009.
Office Action in U.S. Appl. No. 10/183,135, dated Aug. 18, 2009.
Office Action in U.S. Appl. No. 10/183,135, dated Feb. 19, 2010.
Final Office Action in U.S. Appl. No. 10/183,135, dated Sep. 22, 2010.
Office Action in U.S. Appl. No. 10/183,135, dated Mar. 25, 2011.
Notice of Allowance in U.S. Appl. No. 10/183,135, dated Aug. 15, 2011.
Application as Filed in U.S. Appl. No. 11/363,984, dated Feb. 27, 2006.
Office Action in in U.S. Appl. No. 11/363,984, dated Dec. 26, 2008.

\* cited by examiner

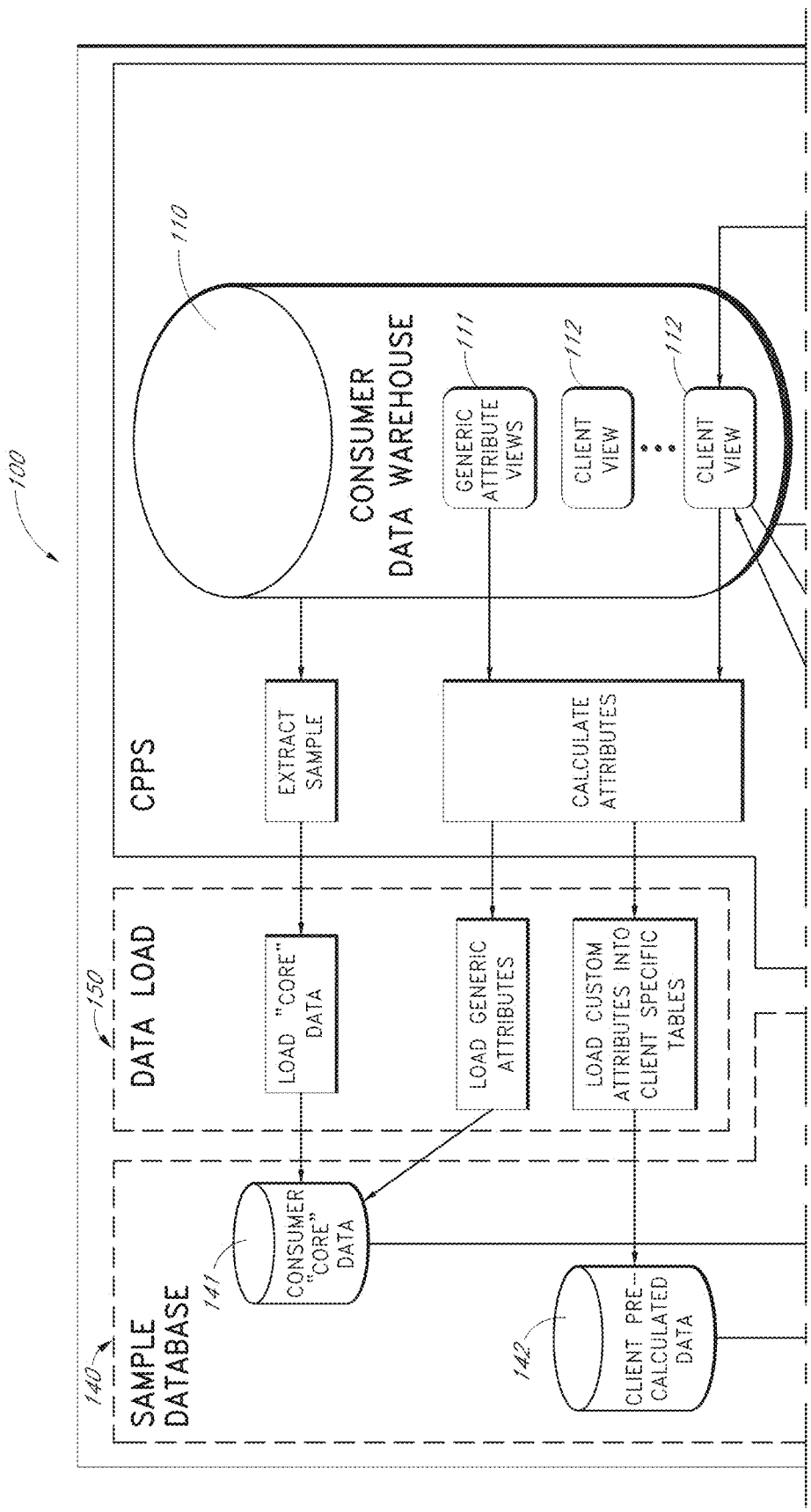
FIG. 1B₁

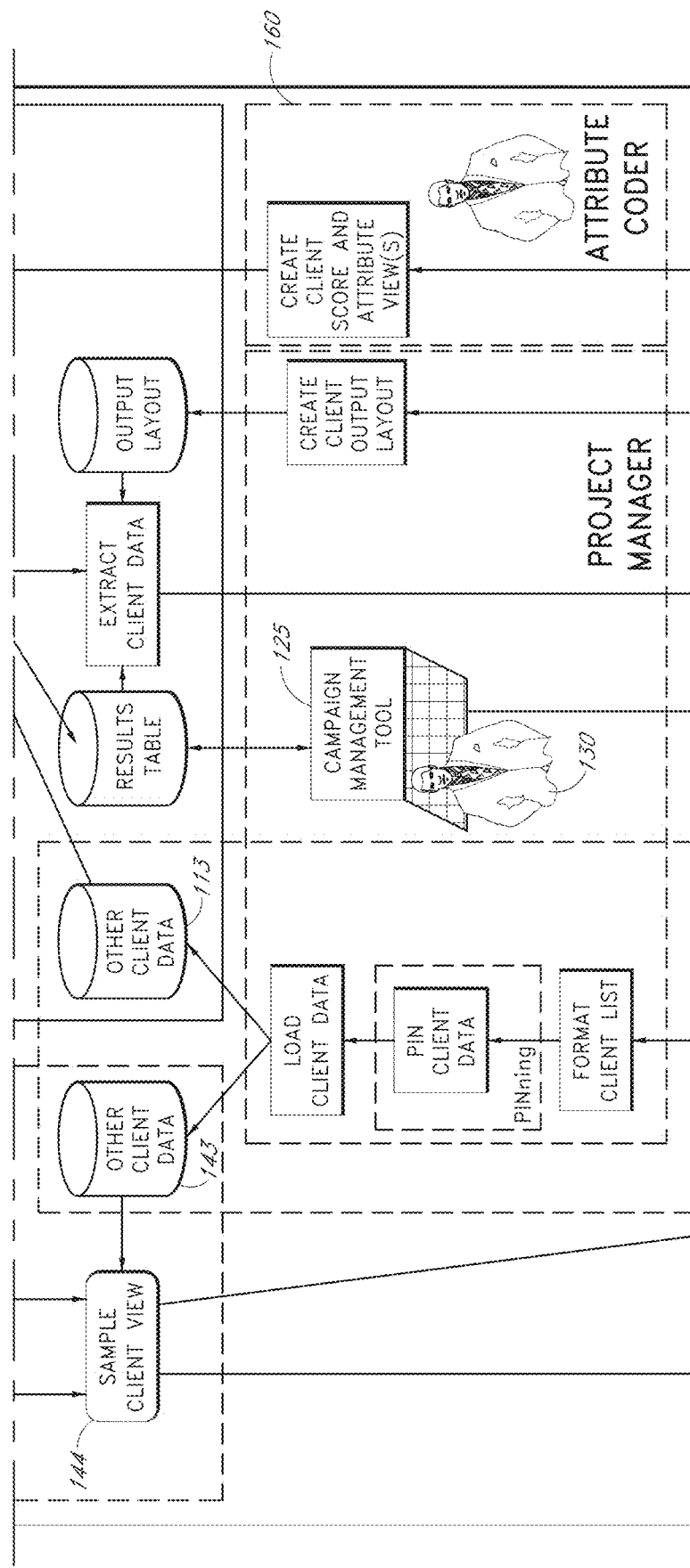
FIG. 1B2

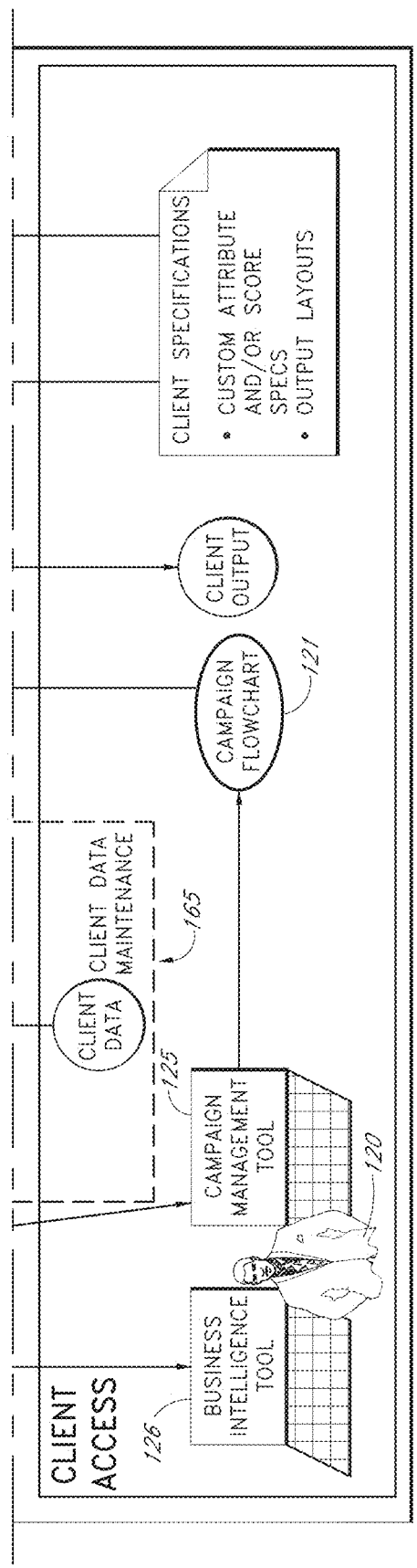
FIG. 1B₃

SYSTEMS AND METHODS FOR PROVIDING A DIRECT MARKETING CAMPAIGN PLANNING ENVIRONMENT

PRIORITY CLAIM

This application is a continuation of U.S. patent application Ser. No. 16/422,486 filed on May 24, 2019, which is a continuation of U.S. patent application Ser. No. 15/884,027 filed on Jan. 30, 2018, issued as U.S. Pat. No. 10,311,466, which is a continuation of U.S. patent application Ser. No. 15/356,415 filed on Nov. 18, 2016, issued as U.S. Pat. No. 9,916,596, which is a continuation of U.S. patent application Ser. No. 14/090,834 filed on Nov. 26, 2013, issued as U.S. Pat. No. 9,508,092, entitled "SYSTEMS AND METHODS FOR PROVIDING A DIRECT MARKETING CAMPAIGN PLANNING ENVIRONMENT," which is a divisional of U.S. patent application Ser. No. 12/022,874 filed on Jan. 30, 2008, issued as U.S. Pat. No. 8,606,626, entitled "SYSTEMS AND METHODS FOR PROVIDING A DIRECT MARKETING CAMPAIGN PLANNING ENVIRONMENT," which claims the benefit of priority under 35 U.S.C. § 119(e) of U.S. Provisional Application No. 60/887,521, filed Jan. 31, 2007, and entitled "SYSTEMS AND METHODS FOR PROVIDING A DIRECT MARKETING CAMPAIGN PLANNING ENVIRONMENT," all of the entire contents of which are hereby incorporated by reference in their entirety herein and should be considered a part of this specification.

BACKGROUND OF THE INVENTION

Field of the Invention

The disclosure relates to database testing environments, and, in particular, to the creation of a sample consumer information database environment for the testing and refining of direct marketing campaigns based on credit-related and/or non-credit-related data.

Description of the Related Art

Various business entities, including credit providers, perform direct marketing campaigns aimed at selected consumers who are identified, at least in part, based on data available from credit bureaus. In order to improve the cost-effectiveness of such campaigns, careful planning of the selection criteria for identifying the consumers to be targeted is desired. Refinement of the selection criteria often takes place by testing a proposed set of criteria on the database of credit bureau consumer information, or on a subset of the database, and analyzing the resulting set of consumers identified using the criteria.

Typically, marketers are trying to identify consumers with a desired set of characteristics. Effective refinement of the selection criteria is dependent, at least in part, upon accuracy and stability of the test database set upon which the testing is run, especially since current legislation regarding the use of consumer credit data for advertising purposes requires in some cases that marketers commit to making a firm offer of credit to consumers who are contacted. In other types of direct marketing campaigns, rather than making a firm offer of credit, the marketers may issue an "invitation to apply" (known as an ITA). Planning and execution for ITA campaigns may be restricted by law from using credit-related data. Marketers for firm offers of credit, ITA's, and other direct marketing campaigns are very interested in maximizing the success of their direct marketing campaigns by careful selection of consumers to be contacted.

SUMMARY

Due to the importance of direct marketing campaigns, it would be beneficial to improve the manner in which business entities, or marketers working on their behalf, can test and refine their direct marketing campaigns. Embodiments of the present invention allow business entities, referred to for purposes of this disclosure as "clients," to directly access, without intervention of an intermediary, a "partial snapshot" of a very up-to-date credit bureau or other consumer database in order to test and refine direct marketing campaign selection criteria for campaigns that they intend to run on the full credit bureau database in order to identify targets for a direct marketing campaign. The snapshot preferably comprises data that has been very recently updated and provides for the inclusion of a client's proprietary data and attribute definitions.

Embodiments of the systems and methods described herein disclose a computer database environment in which selection of consumers to be targeted by a direct marketing campaign can be planned, tested, and refined on a subset of a credit database. The subset of the credit database provides data that is both up-to-date and stable. In some embodiments, once refined, the selection of consumers to target for the direct marketing campaign may be carried out on the full credit database, which is preferably updated approximately twice weekly. In one preferred embodiment, the data for the test database represents a random sampling of approximately 10% of a full credit bureau database, which may include both credit and/or non-credit data. In one preferred embodiment, the full credit database is updated approximately twice weekly, and the 10% snapshot is updated only approximately once weekly. In some embodiments, the snapshot is updated less frequently than the full credit database. This provides a stable test environment in which the client can rely on the ability to use one static set of data for at least one week while the client refines the campaign selection strategies. Thus, changes in performance of various test runs within a given week can be attributed with confidence to associated changes in underlying selection strategy. In other embodiments, the test database comprises a different percentage of the full credit bureau database. Furthermore, the test database may be updated at a different advantageous frequency, such as once every two weeks, once every three weeks, once a month, and/or the like.

An embodiment of a system for planning and executing a direct marketing campaign is described. The system includes: a database of consumer credit information comprising records with information about a plurality of consumers; a copy of a subset of the consumer credit information from the database; and a client testing interface that allows a plurality of clients to access the copy of the subset and to individually run one or more tests of prospect selection criteria using the copy of the subset in order to identify a desired set of prospect selection criteria. The system further comprises a campaign interface that is configured to extract consumer information from the database, based, at least in part, on the desired set of prospect selection criteria for use by at least one of the plurality of clients in a direct marketing campaign.

Other embodiments of the system are described which include at least one of the following characteristics: the database of consumer credit information is updated twice weekly; the subset of the consumer credit information from the database comprises information from 10% of the consumer records in the database; and/or the copy of the subset of the database is updated weekly. In one embodiment of the system, the client testing interface further allows a client to use proprietary data that the client owns and that is associated with the subset of consumer credit information in running the one or more tests of the prospect selection criteria.

Embodiments of method are described for generating and maintaining a test environment for identifying desired prospect selection criteria for a direct marketing campaign. The method includes: identifying a sampling of records from a consumer credit data warehouse; calculating a set of generic attributes associated with the records included in the sample; cleansing the set of generic attributes of unwanted attributes; and loading the cleansed set of generic attributes into a test environment. The method further includes, for each of a plurality of clients: calculating, cleansing, and loading into the test environment client-proprietary attributes and client-proprietary data provided by the client that is associated with the records in the sample; and providing the client with access to the generic attributes and to the client-proprietary attributes and data provided by the client in the test environment. The method further includes determining when a lifespan associated with the test environment is completed, and, when the lifespan associated with the test environment is completed, rebuilding the test environment, based at least in part on a new sampling of records from the consumer credit data warehouse.

Embodiments of a method are described for using a sample database environment to test and use selection criteria for a direct marketing campaign on behalf of a client. The method includes: generating a sample database with a specified lifespan from a database of consumer information about a population of consumers, such that the sample database includes data from a portion of a set of consumer records in the database of consumer information; accepting from a client a proposed set of selection criteria for testing; running a test campaign on the sample database using the proposed set of selection criteria; and providing the test campaign results to the client for analysis. The method further includes: repeating the accepting, the running, and the providing with a modified proposed set of selection criteria received from the client until the client indicates it is satisfied with a set of selection criteria or until the lifespan of the sample database is complete; and using the set of selection criteria that satisfies the client to identify a subset of consumers from the database of consumer information for use in a direct marketing campaign.

Embodiments of a computer-readable medium are described, such that the computer-readable medium has stored thereon executable instructions that, when executed by a processor, cause the processor to perform a method for testing and executing a direct marketing campaign. The method includes: generating a sample database from a database of credit information about a population of consumers; accepting from a client a proposed set of selection criteria for testing; running a test campaign on the sample database using the proposed set of selection criteria; and providing the test campaign results to the client for analysis. The method also includes: repeating the accepting, the running, and the providing with a modified proposed set of selection criteria until the client indicates it is satisfied with a set of selection criteria; and using the set of selection criteria to identify a subset of consumers from database of credit information for use in a direct marketing campaign.

An embodiment of a system for testing a proposed direct marketing campaign is described. The system can include a client testing interface configured to access a sample database of depersonalized credit information including records with information about a plurality of consumers. The client testing interface can further be configured to individually run one or more tests of prospect selection criteria using the sample database.

In some embodiments, a system for testing and executing a direct marketing campaign is provided. The system can include a client testing interface configured to access a sample database of depersonalized credit information including records with information about a plurality of consumers. The client testing interface can further be configured to individually run one or more tests of prospect selection criteria using the sample database. The system can further include a campaign interface for use in executing a direct marketing campaign, configured to request that a set of selection criteria be used to identify information from a consumer data warehouse about a set of consumers.

In some embodiments, a system for testing, analyzing, refining, and executing a direct marketing campaign is provided. The system can include a consumer data warehouse database storing consumer population credit-related data including at least one generic attribute. The system can further include a client view including at least one proprietary attribute. The system can further include a sample database of consumer population credit-related data, including a database of core consumer data and a database of client pre-calculated data. The database of core consumer data can include a portion of the consumer data warehouse database. The system can further include an other client data database storing information from past direct marketing campaigns, including at least one response from a consumer to a past direct marketing campaign. The system can further include an extraction and data load module configured to load the at least one generic attribute into the database of core consumer data and the at least one proprietary attribute into the database of client pre-calculated data.

In some embodiments, a method for building a sample database is provided. The method can include receiving and storing in a first database a selection of proprietary attributes from a client. The method can further include receiving and storing in a second database consumer information from past direct marketing campaigns. The method can further include sampling a third database of depersonalized consumer credit information, including records with information about a plurality of consumers. The method can further include extracting and loading a subset of depersonalized credit information from the third database into a fourth database, including copying a subset of the consumer credit information in the third database to the fourth database. The method can further include extracting and loading the first database into the fourth database including copying the proprietary attributes from the first database to the fourth database. The method can further include associating the second database with the fourth database.

In some embodiments, a method for testing, analyzing, refining, and executing a direct marketing campaign is provided. The method can include storing consumer population credit-related data, including at least one generic attribute in a consumer data warehouse database. The method can further include generating a sample database including a portion of the consumer population credit-related data in the consumer data warehouse database. The method can further include receiving a first request from a client to access the sample database to run one or more tests of prospect selection criteria using the sample database. The method can further include receiving a second request including actual selection criteria from a client to execute a direct marketing campaign. The method can further include in response to receiving the second request, accessing the consumer data warehouse database and segmenting a consumer population based on the actual selection criteria.

The disclosure provided in the following pages describe examples of some embodiments of the invention. The designs, figures, and description are non-limiting examples of some embodiments of the invention. Other embodiments of the campaign planning environment may or may not include the features disclosed herein. Moreover, disclosed advantages and benefits may apply to only some embodiments of the invention, and should not be used to limit the invention.

BRIEF DESCRIPTION OF THE DRAWINGS

A general architecture that implements various features of specific embodiments of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

FIG. 1B is a block diagram that shows how FIGS. $1B_1$, $1B_2$, and $1B_3$ can be combined to form a single high level block diagram depicting one embodiment of a system for planning and executing a direct marketing campaign.

FIGS. $1B_1$, $1B_2$, and $1B_3$ are high level block diagrams depicting embodiments of the campaign planning and executing system 100 that improves campaign testing and refining capabilities.

Figure 2:
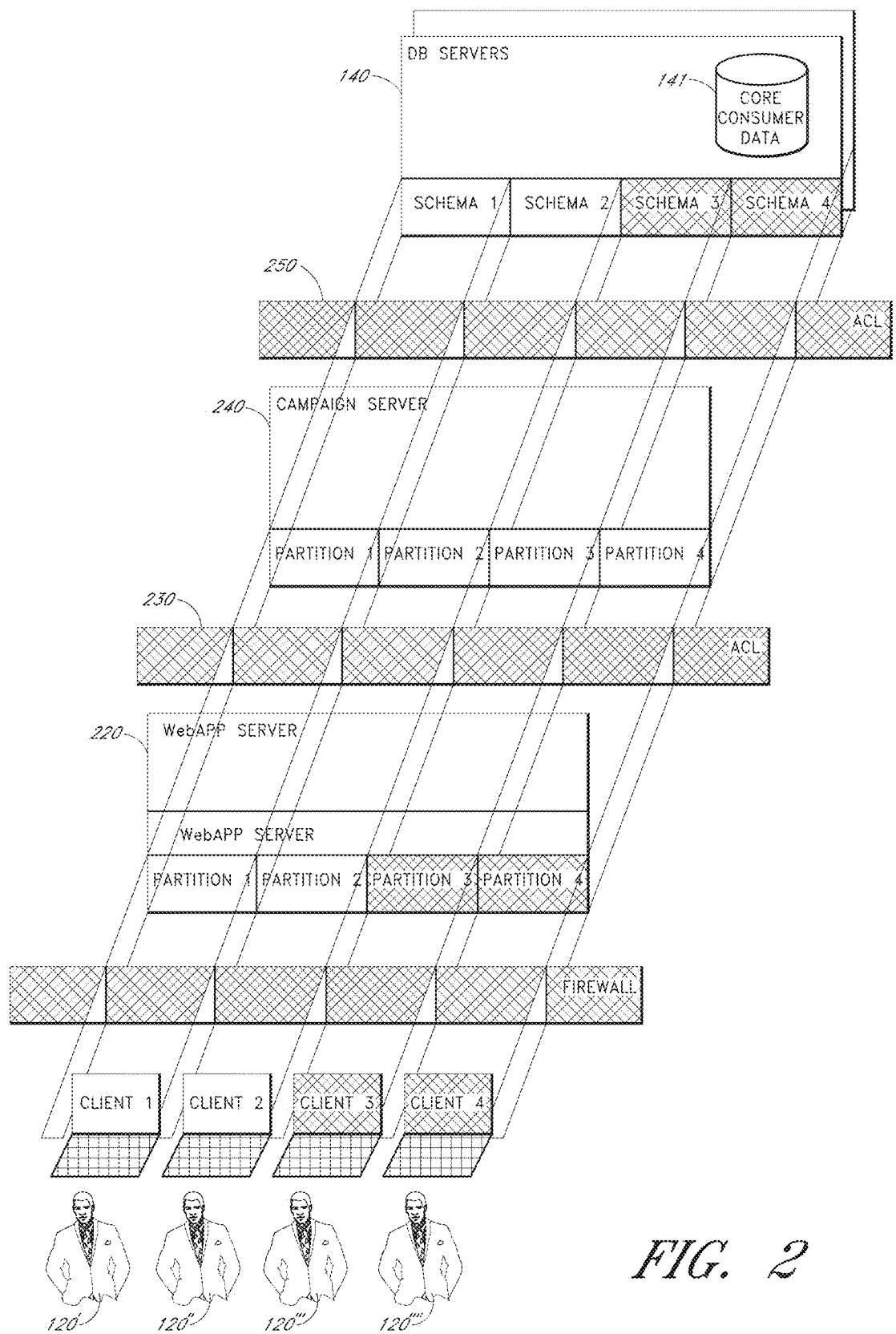

FIG. 2 depicts one embodiment of a partitioning solution that allows a plurality of individual clients to access the same sample database, without corrupting or having access to one another's data.

Figure 3:
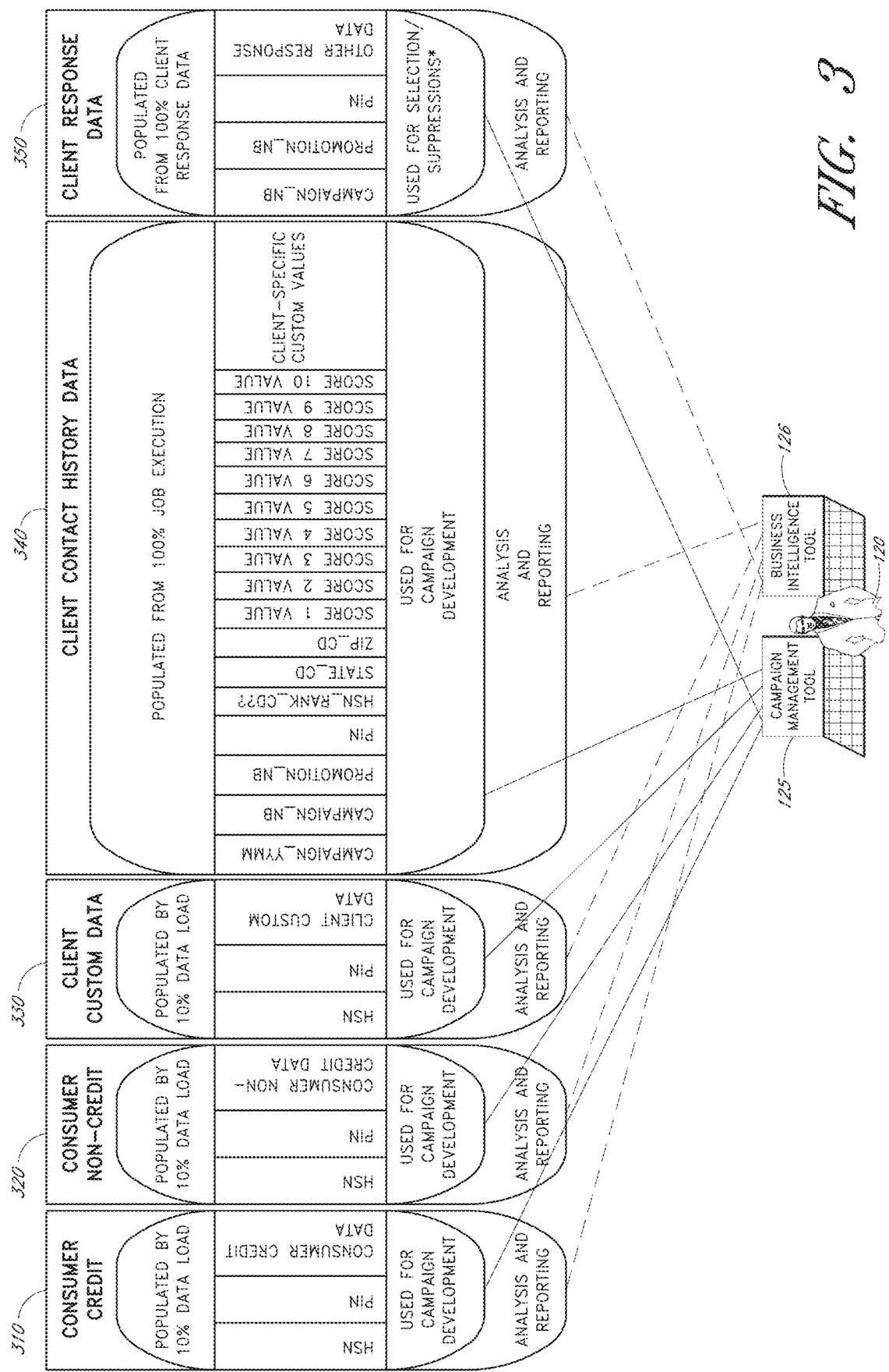

FIG. 3 is a diagram that depicts one embodiment of a selection of data from the credit database to be included in the "snapshot" sample.

Figure 4:
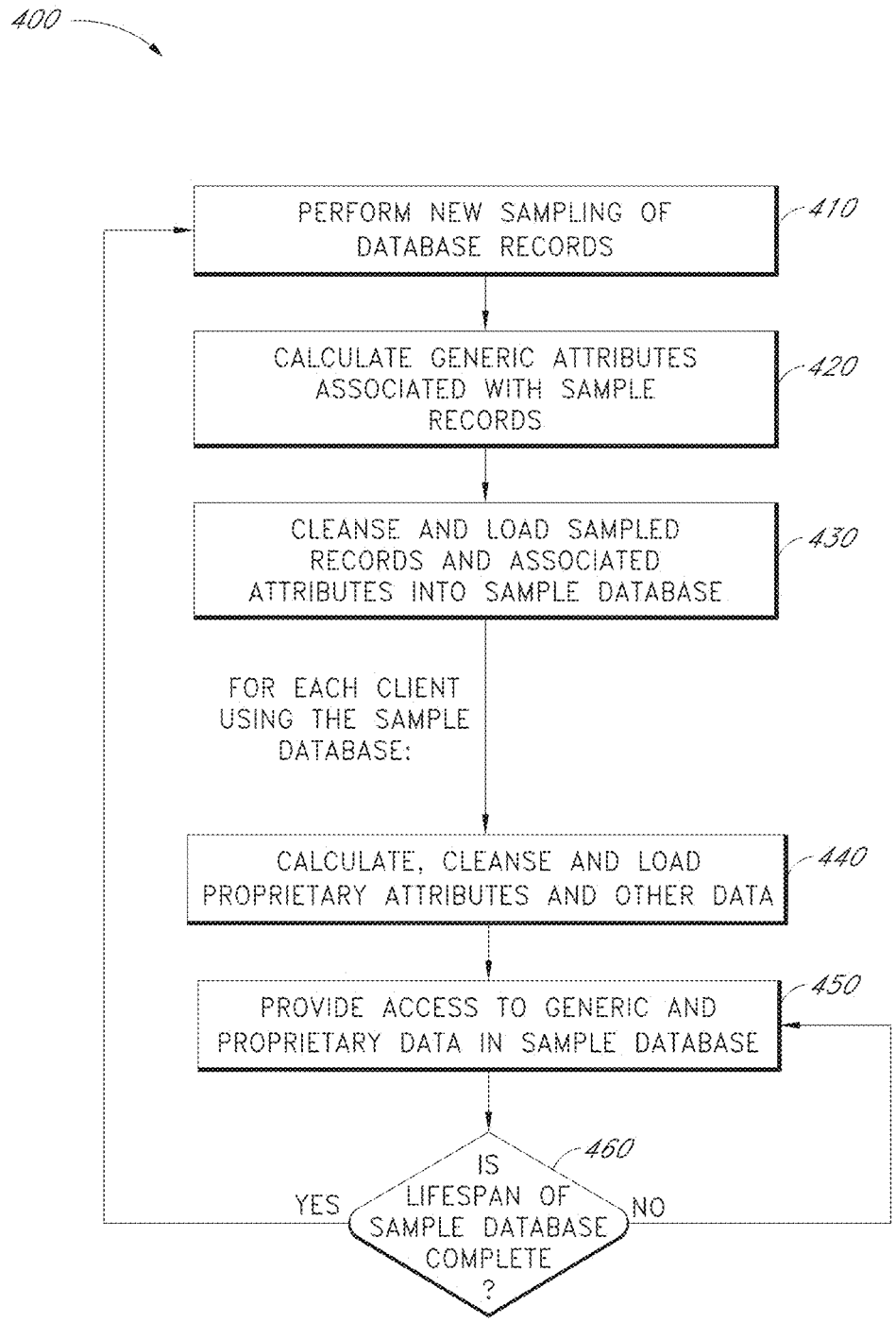

FIG. 4 is a flowchart depicting one embodiment of a process for generating and maintaining a sample database environment.

Figure 5:
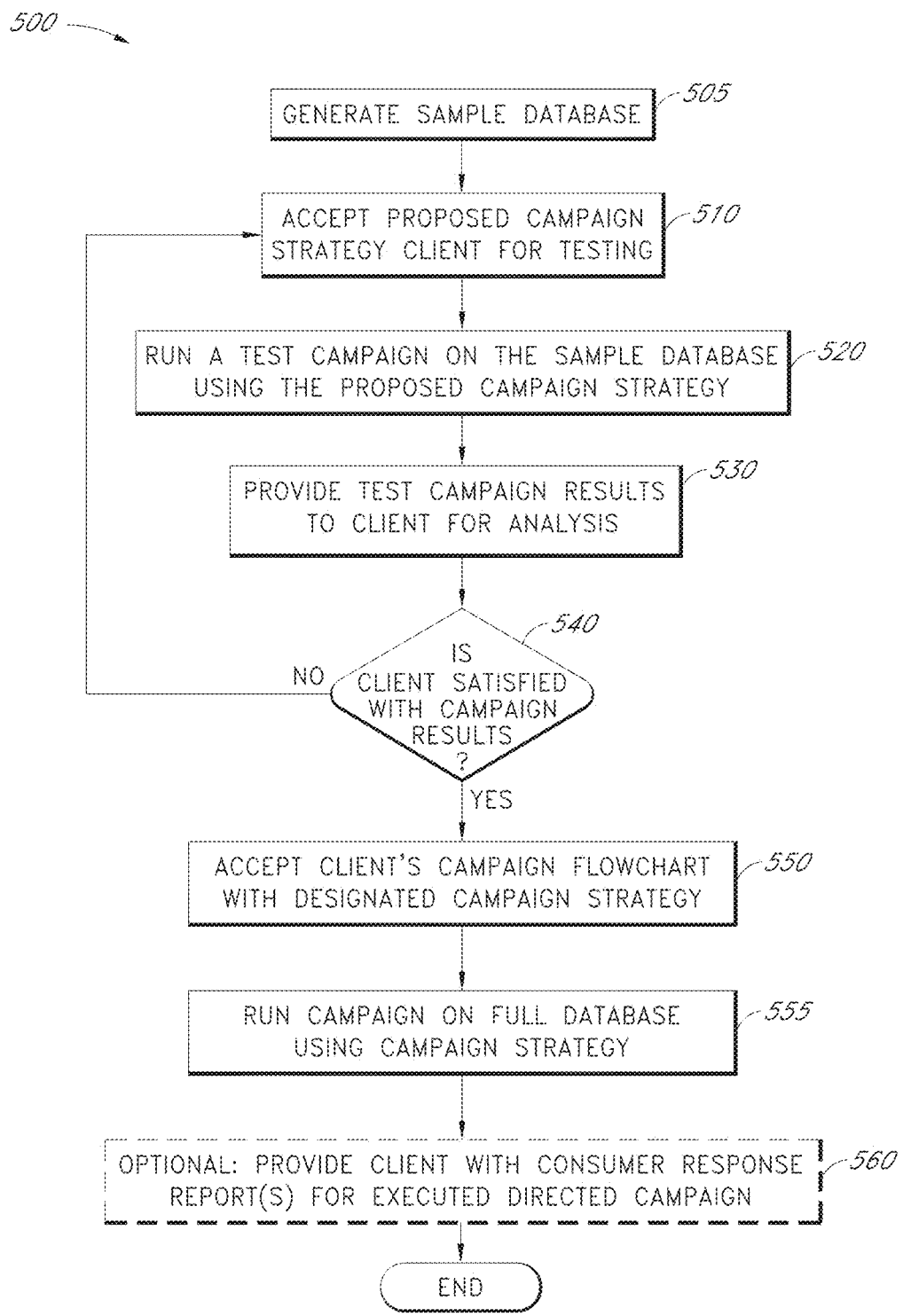

FIG. 5 is a flowchart that depicts one embodiment of a process 500 for using the sample database environment to assist a client 120 to test, analyze, refine, and execute a marketing campaign.

DETAILED DESCRIPTION

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the invention herein described.

I. Overview

The present disclosure relates to test environment for planning strategies for direct marketing campaigns. As used herein, a "strategy" refers to a set of selection criteria, also known as selection rules that may be used to form a query for execution on a database of records regarding prospective recipients of a direct marketing offer. The strategy may thus identify one or more attributes associated with the records that may be combined, often in a very complex query, to identify a desired subset of the records in the database.

One example of a database that may be suitable for identifying prospective recipients of a direct marketing offer can be one or more databases of consumer information available from a credit bureau. Such credit bureau databases may comprise both credit-related and non-credit related data, such as demographic data, data from public records, and the like. In addition to credit bureaus, other business entities may provide access to suitable databases of consumer information, that may comprise credit-related and/or non-credit related data.

One example of a direct marketing campaign offer is a firm offer of credit, for which campaign offer recipients may be identified using both credit-related and non-credit related data about consumers. Another example of a direct marketing campaign offer is an offer that is not a firm offer of credit, known as an "Invitation to Apply" (ITA) offer, which may be based on non-credit-related data alone. The systems and methods described herein are contemplated as also being useful for identifying recipients of other types of direct marketing offers that may be based on any of a variety of other types of data. Although, for ease of description, the systems and methods disclosed herein are frequently described as being performed on a credit bureau database and as providing a database environment in which clients can use credit-related data for planning direct marketing campaigns, it is to be understood that, in various embodiments, the campaigns may be planned using either credit-related data, non-credit-related data, or both. Furthermore, the environment may be provided by a credit bureau or other entity providing access to consumer data.

Previous test environments for planning direct marketing campaigns using credit bureau data frequently included a full custom-built copy, known as a "full snapshot" or "100% snapshot," of the credit database from which consumer names for the final direct marketing campaign are selected. Tasks performed in the 100% snapshot may include some or all of: analysis and campaign development, campaign set-up, audit and reporting on campaign logic, receiving client approval to proceed, and execution of the full direct marketing campaign. Since a credit bureau database may include records for hundreds of millions of consumers, building such a full copy of the database typically involves a significant lag time between initiation of the database snapshot building process and availability of the snapshot of use in testing. Thus, freshness of the data used may be compromised by the time testing begins. This lack of data freshness may be exacerbated when the data in the source database is itself lacking in freshness, due, for example, to infrequent updates.

The lack of data freshness is yet further exacerbated when a direct marketing campaign developer, desiring to test and refine campaign strategies, must submit every new refinement of the campaign selection criteria to a credit bureau representative for running on the credit bureau database and must wait for a credit bureau representative to report on the results. The interjection of a third party into a campaign developer's refinement of a campaign strategy frequently makes the process inordinately cumbersome and time-consuming.

Furthermore, lenders frequently desire to include proprietary data of their own and proprietary attribute definitions for use with the credit bureau data in campaign testing, refining, and finally, execution. The desire to include multiple data sources, including proprietary data for those who can afford the investment, frequently leads to building a proprietary test database for the lender's private use. A proprietary database or snapshot is not only an extremely expensive and time-consuming proposition, both to build initially and to update, but also typically yields a database with data that is out-of-date by the time the database is used for testing and finally executing the campaign strategy.

On the other hand, using a snapshot of a database that is updated very frequently and that cannot be used and stored for re-use during the development of a campaign lessens a campaign developer's confidence that differences in campaign test results obtained from various test runs are the result of changes in the campaign's selection strategies and are not simply, in part or in total, the result of changes between the various snapshots.

Systems and methods are disclosed herein for providing a direct marketing campaign planning environment, such as for marketing campaigns directed to consumers identified using a credit-related database system. Frequently, business entities carrying out a direct marketing campaign first identify a desired set of recipients for one or more marketing offers associated with the campaign, and contact the identified recipients, such as via mail, telephone, email, or the like, with the marketing offer.

For purposes of the present disclosure, a "testing" phase is described in which the business entities may repeatedly test and refine a set of selection criteria for identifying consumers expected to be good prospects for a marketing campaign using a sample database that is a copy of a portion of a large database of consumer records. Once a satisfactory set of selection criteria is obtained, an "execution" phase includes using the selection criteria on the large database of consumer records to identify consumers to be recipients of the direct marketing offer. In some embodiments, contact information for the identified consumers may also be provided. In some embodiments, execution may further comprise using the contact information to contact the identified consumers with the direct marketing offer, and may further include tracking consumer response to the direct marketing campaign.

II. Architecture

Figure 1A:
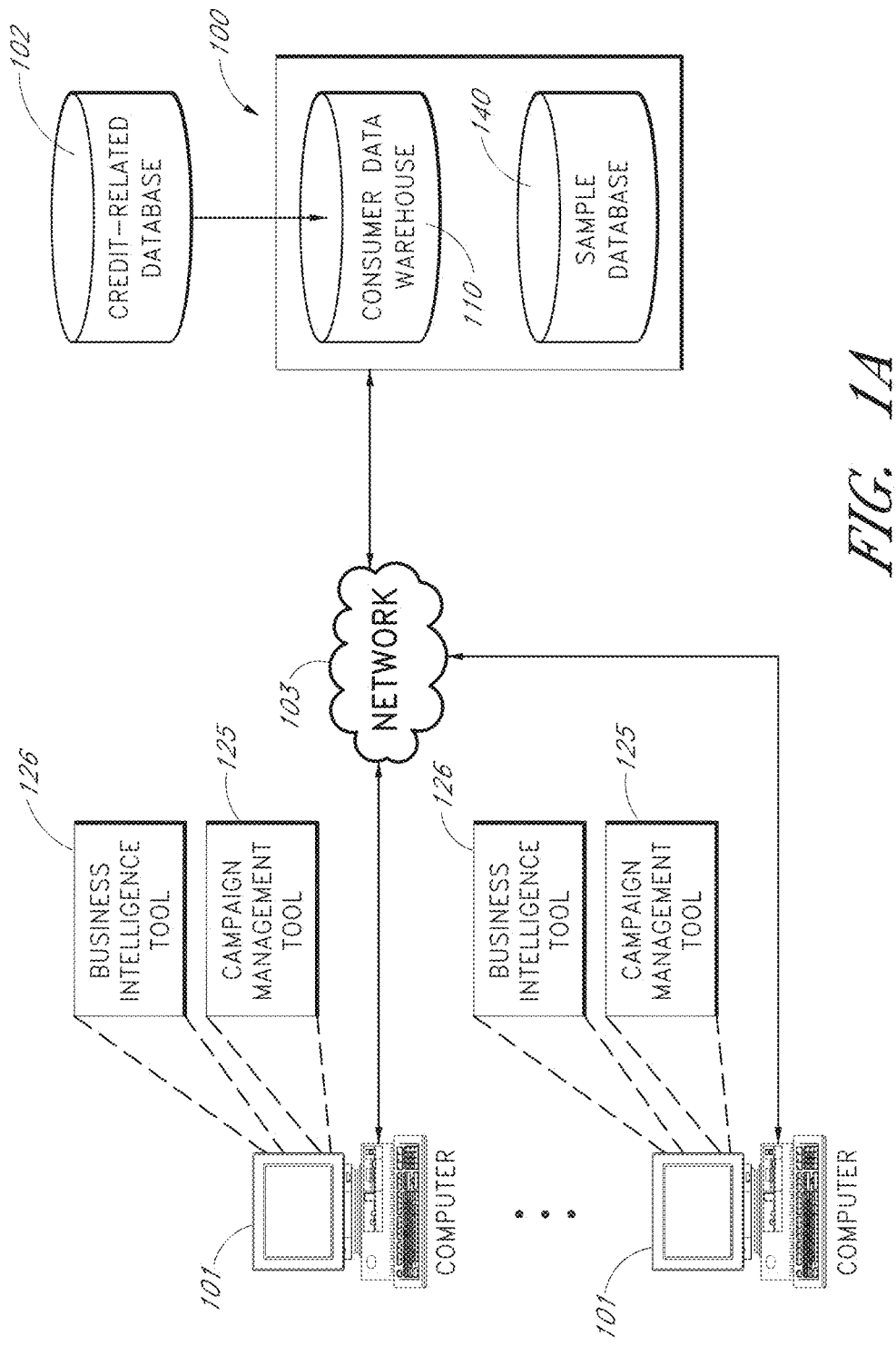
FIG. 1A illustrates one embodiment of a system for planning and executing a direct marketing campaign, including typical client components for accessing the system.

FIG. 1A illustrates one embodiment of a system for planning and executing a direct marketing campaign. As depicted in FIG. 1A, the system 100 may comprise a consumer data warehouse 110, which is communication with a credit-related database 102, and a sample database 140. In preferred embodiments, the system 100 comprises one or more server systems (typically comprising multiple physical computers/machines) and associated content that are accessible to a plurality of client computing devices 101 via a network 103. The system 100 can be implemented using physical computer servers that are geographically co-located or that are geographically remote from one another. The system 100 may in some embodiments, include content that spans one or multiple internet domains.

The credit-related database 102 may be configured to receive, update, and store vast amounts of data. For example, in one embodiment, a credit bureau uses the credit-related database 102 for storing data received from a variety of sources for approximately three hundred million consumers. Such data may include, for example, demographic information, credit-related information, and information available from public records. Some or all of the data may be used, among other purposes, to calculate credit scores for the consumers.

The consumer data warehouse 110 may be configured to store a copy or near-copy of the data in the credit-related database 102. In various embodiments, a copy of data from the credit-related database 102 is periodically extracted and reconfigured for updating the consumer data warehouse 110. For example, data from the credit-related database 102 may be processed by a set of ETL (Extract, Transform Load) servers before being transmitted to the consumer data warehouse 110.

After the data has been transformed by the ETL servers, the data may be loaded to the consumer data warehouse 110, such as by way of a high speed server interconnect switch that handles incoming and outgoing communications with the consumer data warehouse 110. As one example, the high speed interconnect switch may be an IBM SP2 switch. In other embodiments, Gig Ethernet, Infiniband, and other high speed interconnects may be used.

Embodiments of an architecture for the consumer data warehouse 110 may be implemented using a Massively Parallel Processing (MPP) hardware infrastructure. In one embodiment, IBM AIX pSeries servers (8-way p655) may act as the MPP building blocks of the consumer data warehouse 110. In other embodiments, other types of servers may act as the MPP building blocks of the system, for example, Linux servers, other types of UNIX servers, and/or Windows Servers. A similar architecture could also be implemented using Symmetric Multi-Processing (SMP) servers, such as IBM P690 32-way server or HP Superdome servers.

In preferred embodiments, a relational database management system (RDBMS), such as a DB2 EEE8.1 system, manages the data in the consumer data warehouse 110.

The system 100 can also include a sample database 140 that stores a temporary copy of a portion of the data in the consumer data warehouse 110, as will be described in greater detail below. The sample database 140 can serve as an environment in which one or more clients may test, refine, and/or validate a proposed marketing campaign before executing the campaign on the full consumer data warehouse 110.

FIG. 1A further illustrates typical client components for accessing the system, in accordance with some embodiments of the invention. As depicted in this drawing, one or more clients can use a general purpose computer or computing device 101 with access to a network 103 to access the system 100.

For example, one or more of the computing devices 101 may be a personal computer that is IBM, Macintosh, or Linux/Unix compatible. In one embodiment, the client computing device 101 includes a central processing unit (CPU), which may include a conventional microprocessor. The computing device 101 further includes a memory, such as random access memory (RAM) for temporary storage of information and a read only memory (ROM) for permanent storage of information, and a mass storage device, such as a hard drive, diskette, or optical media storage device.

The client computing device 101 may include one or more commonly available input/output (I/O) devices and interfaces, such as a keyboard, mouse, touchpad, and printer. In one embodiment, the I/O devices and interfaces include one or more display device, such as a monitor, that allows the visual presentation of data to a user. More particularly, a display device provides for the presentation of GUIs, application software data, and multimedia presentations, for example. The client computing device 101 may also include one or more multimedia devices, such as speakers, video cards, graphics accelerators, and microphones, for example.

The network 103 may comprise one or more of a LAN, WAN, or the Internet, for example, via a wired, wireless, or combination of wired and wireless, communication link that may be configured to be secured or unsecured.

As further illustrated in FIG. 1A, the computer 101 of the client can run a campaign management tool 125 and business intelligence tool 126. The campaign management tool 125 and business intelligence tool 126 can be configured to perform research and analysis functions associated with testing and refining the proposed direct marketing campaign.

Although the credit-related database 102 and the client computing devices 101 have been depicted in FIG. 1A as being external to the system 100, in other embodiments, one or more of the credit-related database 102 and/or the client computing devices 101 may be provided as part of the system 100, in which cases, communications may take place using one or more internal communications systems. Additionally or alternatively, rather than being a copy of the credit-related database 102, the consumer data warehouse 110 may receive update data, including, but not limited to demographic information, credit-related information, and/or information available from public records, directly from other sources.

In some embodiments, clients 120 may access the consumer data warehouse 110 and/or may run campaigns directly rather than via the project manager 130.

Figure 1B:
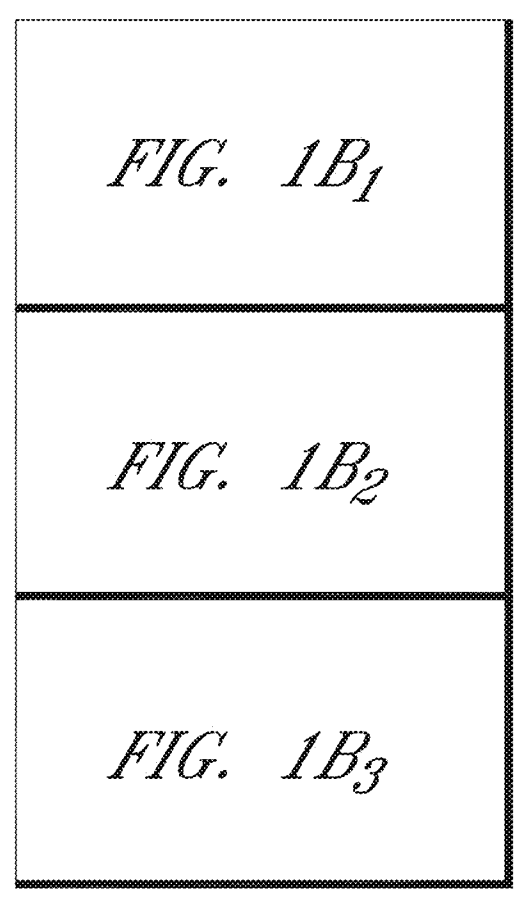

FIGS. $1B_1$, $1B_2$, and $1B_3$ are high level block diagrams depicting embodiments of a campaign testing and executing system 100 that improve campaign testing and refining capabilities. FIG. 1B shows how FIGS. $1B_1$, $1B_2$, and $1B_3$ can be combined to form a single high level block diagram depicting one embodiment of the campaign testing and executing system 100. The campaign testing and executing system 100 may be used, at least in part, by lenders, other providers of credit services or other business entities, and/or marketers working on their behalf (referred to, for purposes of this disclosure, as "clients" 120) who wish to use data available from one or more credit bureaus or other provider of consumer data to help identify consumers who may be interested in the services of the clients.

In various embodiments, the campaign testing and executing system 100 may be implemented using a variety of computer hardware and software resources. For example, computer servers, such as web servers, database servers, campaign management tool servers, and business intelligence tool servers, as well as direct access storage device (DASD) capacity accessible by one or more of the above-described types of servers are used in various embodiments. Furthermore, associated software, such as cluster multiprocessing software, campaign management software, business intelligence software, network communications software, and database management software (such as DB2, Oracle, or Sybase, for example) can also be used.

In the embodiments depicted in FIGS. $1B_1$, $1B_2$, and $1B_3$, a consumer data warehouse 110 includes data about millions of consumers. In particular, data in the consumer data warehouse 110 may be a copy or near-copy of data from the database of credit-related data 102, which is used for calculating consumer credit ratings, among other uses, and which is updated daily or more frequently. The data in the consumer data warehouse 110 may be organized so as to make batch processing of the data more expedient and may be updated from the database of credit-related data 102 that is used for calculating consumer credit ratings on a regular, preferably frequent, basis, so that data in the consumer data warehouse 110 includes up-to-date changes in the consumers' records. In a preferred embodiment, the consumer data warehouse 110 is updated twice weekly.

In the consumer data warehouse 110, the data may be organized generally as records of data for each consumer. Each record may be divided conceptually into attributes associated with each consumer. Examples of demographic, credit, or custom attributes that may be useful to clients 120 wishing to identify potential customers may include, but are not limited to: number of credit cards held by the consumer, total available credit, total current balance, number of late payments within the last year, number of late payments within the last three years, no tradelines, and the like. In addition, some attributed may be derived from other attributes, such as but not limited to derived attributes that are aggregations of other attributes or that are calculated from other attributes. In many embodiments, the consumer data warehouse 110 may include hundreds of attributes for each consumer. Some attributes, and especially attributes useful to a wide variety of clients using the system 100, may be pre-calculated for the consumer records and may be generally available to the clients as a generic attribute view 111 from the consumer data warehouse 110. Clients 120 may also wish to define custom attributes for their own use to help identify consumers of interest. Instructions for calculating these proprietary attributes may be input to the consumer data warehouse 110 by a custom attribute coder 160 on behalf of individual clients 120 for use by the individual clients. The custom attributes may be stored in a plurality of client views 112, which allow each client 120 to access only their own proprietary attributes.

In some embodiments, in addition to the attributes in views 111, 112, clients may provide other data 113 that may be used together with the data in the consumer data warehouse 110 to identify potentially good prospects for a direct marketing campaign. For example, clients 120 may wish to include historical information identifying consumers who have previously been contacted in one or more direct marketing campaigns, response history information about consumers who have been contacted, information identifying consumers who have requested not to be contacted, and/or the like. Other non-campaign related data may also be included with the other data 113.

Generally, when a client 120 wishes to run a direct marketing campaign, a campaign flowchart 121 is generated to describe a plan for identifying desired consumers from the records in the consumer data warehouse 110. The campaign flowchart 121 is typically a complex plan for using a large number of attributes from the generic attribute view 111 and the client view 112, along with other client data 113, to categorize the consumers and to select consumers whose attributes place them in one or more desired categories. The campaign flowchart 121 is provided to a project manager 130 who, among other tasks, accepts the campaign flowchart 121 for extracting the desired information, often in the form of consumer names and contact information, from the consumer data warehouse 110.

In order to help the client 120 design a campaign flowchart 121 that successfully identifies consumers appropriate for a given direct marketing campaign, the campaign testing and executing system 100 advantageously includes a sample database 140 that serves as a temporarily available environment in which a client may test, refine, and validate a proposed campaign flowchart 121. The sample database 140 preferably includes data from a random or semi-random sampling of the records in the consumer data warehouse 110 so that results obtained from test campaigns run on the sample database 140 will be statistically meaningful indicators of the results that would be obtained using the full consumer data warehouse 110. It is desirable for the sample database 140 to include a sufficiently large sampling of the consumer data warehouse 110 records to provide a statistically meaningful sample while being sufficiently small to allow for quick building of the database 140 and quick execution of test campaigns. Preferably, the sample database 140 includes fewer records than the consumer data warehouse 110. In one embodiment, a sample size of 10% of the full consumer data warehouse 110 is preferred. That is, the sample database includes at least a portion of the data from 10% of the consumer records in the full consumer data warehouse 110. In other embodiments, other preferred sizes may be used, including 1% to 70%, or 5% to 25% of the records in the credit-related database 102. Although embodiments of the systems and methods are described herein with reference to a 10% sample database 140, embodiments of the systems and methods are also contemplated as being used with a sample database 140 that represent a different portion of the full consumer data warehouse 110.

As depicted in FIGS. $1B_1$, $1B_2$, and $1B_3$, once a sample (for example, 10% of the data warehouse records) is selected, generic attributes from the generic view 111 and proprietary attributes in the client view 112 that are associated with consumers in the sample go through an extraction and data load process executed by a data load module 150 to build the sample database 140. Generic attributes may be stored in a repository of consumer core data 141 and proprietary attributes from the client view 112 may be stored in a repository of client pre-calculated data 142. In various embodiments, certain portions of the selected records the consumer data warehouse 110 may be omitted from records in the sample database 140. For example, consumer name and contact information may be deleted from the records to be used for campaign testing in order to comply with various governmental regulations regarding proper use of consumer credit information. Instead, anonymous identifier numbers and general location information may be used to identify the individual records and to allow a geographically representative sample to be selected. As will be familiar to a practitioner of skill in the art, other methods of anonymizing consumer records while retaining their usefulness for campaign development may also be used.

As depicted in FIGS. $1B_1$, $1B_2$, and $1B_3$, a copy of some or all of the other client data 113 may be stored in a repository of other client data 143 for use with the sample database 140.

In one embodiment, to test, analyze, and refine a proposed campaign, the client 120 uses a campaign management tool 125 and/or a business intelligence tool 126 to access a sample client view 144 that includes data from the repository of sampled consumer core data 141, the associated repository of client pre-calculated data 142, and the repository of other client data 143. The campaign management tool 125 and the business intelligence tool 126 are software applications that may be accessed and run using a personal computer (PC) or any of a variety of other commonly available computing devices in order to send queries to the sample database 140, to generate reports based at least in part on information obtained from the sample database 140, and to perform other research and analysis functions associated with testing and refining the proposed direct marketing campaign. In preferred embodiments, the client 120 may access the campaign testing and executing system 100 by way of the Internet or other communications network 103.

In preferred embodiments, the campaign management tool 125, or another aspect of the campaign testing and executing system 100, provides the client 120 with a "layman, user-friendly" data dictionary that describes elements available within the sample database 140. The client 120 is preferably also provided with a "look-up" capability for various available categories of attributes, for example mortgage-related attributes, credit-rating related attributes, or the like. In some embodiments, the client 120 may additionally or alternatively create and use proprietary attributes for use in the direct marketing campaign.

Preferably, the campaign management tool 125 allows the client 120 to be able to conduct high-level campaign development functions, such as segmentation of the consumer population, selection of one or more such segments, and/or suppression of one or more segments or one or more individual consumers from the selection results.

Furthermore, the campaign management tool 125 preferably provides the client 120 with a capability to construct queries for testing and executing the campaign through a graphic user interface (GUI). The campaign query interface allows for basic and advanced logic to be defined and used to construct queries in one or more database query languages, such as Standard Query Language (SQL). In a preferred embodiment, the query interface provides the client 120 with a capability to create SQL queries directly, to view either or both of SQL queries created directly by the user and/or queries generated via the query builder interface, and to edit either or both of SQL queries created directly by the user and/or queries generated via the query builder interface.

The query interface of the campaign management tool 125 preferably allows the client 120 to name query definitions, to save query definitions, to reuse query definitions. Additionally, in a preferred embodiment, the query interface provides the client 120 with an ability to record and modify campaign selection rules for future use. In some embodiments, the query interface allows the client 120 to share query definitions with one or more authorized users.

Furthermore, in a preferred embodiment, the query interface allows the client 120 to test a query, to view query results, and to print the query results. For each query result, the query interface may have the capability to provide a sample of the underlying data.

In one embodiment, the campaign management tool 125 includes a query interface that allows the client 120 to select individuals from the marketing database based upon individual or household criteria. The query interface allows the client 120 to add data sources for the purpose of selection for individual campaigns. The query interface further provides the client 120 with an ability to select records based on a "times mailed" calculation derived from the historical campaign response data. The query interface may provide the capability to identify customer segments. The query interface may additionally or alternatively provide the client 120 with a capability to utilize independent queries for each segment and segmentation trees to split the customer universe into subgroups.

In some embodiments, the same campaign management tool 125 and the business intelligence tool 126 software applications that are used for running direct marketing campaigns on the full consumer data warehouse 110 (the 100% environment) may also provide all functionality needed for allowing clients 120 to directly create and test campaigns on the sample database 140 (10% environment). In some embodiments, separate query interfaces for campaign testing and campaign execution may be provided. In some embodiments, the campaign management tool 125 and the business intelligence tool 126 software applications may provide some, but not all, preferred functionality for providing the systems and methods disclosed herein, in which case supplemental software may be added to or used in conjunction with the campaign management tool 125 and/or the business intelligence tool 126 software to provide the missing functionality.

The client 120 may run and re-run the test campaign on the sample database 40 as desired, performing champion/challenger tests, for example, and observing the effects of modifications on the campaign results. In various embodiments, the data in the sample database 140 remains temporarily static until the sample database 140 is re-built, using a new randomly selected sampling of the credit-related database 102 records which may take place at regular intervals, such as for example, once a week. Thus, the client 120 can have confidence that the various campaign test runs being run during a given week are being run on the same data. In other embodiments, the data in the sample database 140 may be updated according to another schedule, such daily, monthly, upon demand by one or more clients, at random intervals, or the like.

In various embodiments, the client 120 can run various types of reports using the campaign management tool 125 and/or the business intelligence tool 126 software in order to aid in analysis of the data and test results. For example, in one embodiment, the client 120 may run one or more campaign analysis reports that allow the client 120 to predict response to the direct marketing campaign within a segment or group of segments of the targeted population. The client 120 may also use reports to refine future marketing strategies. In some embodiments, the client 120 may specify a preferred output layout for the reports.

In some embodiments, the campaign management tool 125 and the business intelligence tool 126 software do not communicate directly with one another and do not directly share metadata or queries, although the client 120 may manually transfer queries, for example, from one to the other. In other embodiments, the campaign management tool 125 and the business intelligence tool 126 software may be configured to have access to shared metadata and queries.

Once the client 120 has had an opportunity to test and/or refine the campaign strategy and is satisfied with the campaign strategy, the client may provide the campaign flowchart 121, which reflects the desired campaign strategy, to the project manager 130 for running on the full data warehouse 1110 environment as currently updated.

As was described above, in preferred embodiments, the consumer data warehouse 110 is updated twice weekly or at another advantageously frequent interval to insure "freshness" of the data. Thus, although the campaign testing may, in some embodiments, have been run on data that was about ten days old, the actual campaign may be run on data that is three days old or newer. In some embodiments, once the client 120 submits the desired campaign strategy in the form of a campaign flowchart 121 to the project manager 130, either directly or via an intermediary, the campaign may be run on the full consumer data warehouse 110 and results returned to the client 120 within as little as three business days or less. In other embodiments, results may be returned to the client 120 within another advantageously short period of time.

In preferred embodiments, the campaign management tool 125 and/or the business intelligence tool 126 may provide a variety of reporting services to the client 120. For example, the campaign management tool 125 may also provide the client 120 with data about consumer responses received in connection with one or more executed direct marketing campaigns. In other embodiments, the client 120 may receive consumer response reports from another source. In one embodiment, a response analysis report may provide an analysis of responses received from a direct marketing campaign executed through the system 100. The response analysis report may summarize results over periods of time with shorter comparison periods in the immediate weeks after a campaign is executed to longer time frames after the campaign has completed. The response analysis report may provide flexibility to perform analysis of various levels and/or categories of summarization, which may include, but are not limited to: customer segments, product line, product campaign, promotion, offer, collateral, media, and/or vendor.

In some embodiments, a client data maintenance service 165 provides the client 120 with an ability to store campaign-related data related to client campaigns. For example, the client data maintenance service 165 may make campaign data accessible for further campaign development purposes, for analysis purposes, and/or in order to update/delete/archive campaign data for client campaigns. The client data maintenance service 165 may provide the ability to receive and store campaign-related data for direct marketing campaigns that may be common to most or all of a client's campaigns and thus may be useful for future campaigns. The client data maintenance service 165 may collect data of individual promotions in order to derive a "times contacted" calculation for use in future campaign development.

In some embodiments, the client data maintenance service 165 may further record updates to identifying information, such as name, address, and/or telephone information received during a direct marketing campaign. The client data maintenance service 165 may record mail disposition updates for individual consumer records, such as whether a direct mailing advertisement was mailed or not mailed, along with associated explanatory reason codes. The client data maintenance service 165 may record telephone contact disposition updates for individual consumer records, such as whether a direct mailing advertisement call was made or not made, along with associated explanatory reason codes. In other embodiments, other types of data may additionally or alternatively be maintained on behalf of the client 120, by the client data maintenance service 165 and/or as part of the campaign management 125 or business intelligence tool 126 services.

In some embodiments the system 100 may be used for planning a variety of types of campaigns, including, for example, both firm offers of credit and ITA offers. In some embodiments, the system 100 may provide access for clients 120 to two or more sample databases 140, including at least one sample database that includes only non-credit related data. This type of non-credit related sample database may be used, for example, for planning campaigns where the use of consumer credit data is not permitted. In other embodiments, the sample database 140 may be configured to include a mix of credit and non-credit information, such that the system 100 may provide clients 120 with access to both the credit and the non-credit information or to only the non-credit information in the sample database 140.

The methods and processes described above and throughout the present disclosure may be embodied in, and fully automated via, software code modules executed by one or more general purpose computers/processors. The code modules may be stored in any type of computer-readable medium or other computer storage device. Some or all of the methods may alternatively be embodied in specialized computer hardware.

FIG. 2 depicts one embodiment of a partitioning solution that allows a plurality of individual clients 120', 120", 120'ƒ, 120"" to access the same sample database 140, without corrupting or having access to one another's proprietary data. As was depicted in FIGS. $1B_1$, $1B_2$, and $1B_3$, the sample database 140 includes a repository of core consumer data 141, available to all clients, which includes data associated with a randomly selected portion, such as 10%, of the records in the full consumer data warehouse 110. In a preferred embodiment, once a week, a new 10% sample of the full consumer data warehouse 110 is randomly selected, extracted from the consumer data warehouse 110, cleansed of undesirable or unnecessary attributes, such as name, address, other contact information, and the like, and is loaded into the repository of core consumer data 141. In addition, pre-calculated attributes associated with the generic attribute view 111 for the selected portion of the consumer records can be calculated and loaded in to the repository of core consumer data 141 that is commonly available to clients using the sample database 140.

Furthermore, the system 100 may provide each client 120 accessing the sample database 140 with additional proprietary data owned by the client. The proprietary data may include custom attributes, as defined in the client view 112 of the consumer data warehouse 110 and/or may be custom attributes defined for the current campaign. The custom attributes can be calculated for the randomly selected portion of the consumer records and are loaded in the repository of client pre-calculated data 142 in the sample database 140. In addition, other client data 143, proprietary to each client, may be made available use for by the associated client. For example, client-specific campaign history data and/or client-specific response history data may be provided to clients 120 using the sample database 140. This test environment which persists for one week, or for another desired span of time, provides a stable environment that is very helpful to campaign developers.

As depicted in FIG. 2, the generic data available to all clients and the proprietary data exclusive to individual clients 120', 120", 120'", 120"" are depicted as Schema 1, Schema 2, Schema 3, and Schema 4. Each schema may, in various embodiments, include the client pre-calculated data 142 for the 10% or other sized sample and/or the other client data 143 that were described with reference to FIGS. $1B_1$, $1B_2$, and $1B_3$ and may be used with the data in the repository of core customer data 141.

FIG. 2 shows that each schema is accessible only to its respective client 120, and is shielded from access or use by other clients by a system of partition. The partition plan depicted in FIG. 2 allows a plurality of clients 120 to access the sample database 140 simultaneously or nearly simultaneously for testing and refining their respective campaign strategies. In one embodiment, the campaign testing and executing system 100 allows for from one up to one hundred clients 120 to access the same sample database 140, including the shared core consumer data 141 and each client's 120 proprietary data, simultaneously. Clients may pose up to one hundred queries per month and may extract from less than one up to over thirty million names per month. In other embodiments, the system 100 may accommodate more than one hundred clients 120 and/or may allow the clients 120 to pose up to another advantageous number of queries and/or extracted names per given time period. In still further embodiments, the system 100 may provide multiple sample databases 140 for use by one or more clients 120.

Starting at the bottom of FIG. 2, a plurality of clients 120', 120", 120'", 120"" access the business intelligence 126 and/or campaign management 125 tools for testing and refining their respective campaign strategies. A firewall 210 allows access to the system for clients 120 with approved campaign credentials and protects computers used by the individual clients from improper access by others.

The clients 120', 120", 120'", 120"" access the campaign web application server 220 and are given access to their respective partitions. In some embodiments, the clients 120', 120", 120'", 120"" can connect using a Virtual Private Network (VPN) and/or can use vendor specific user credentials. In one embodiment, access to the campaign server 240 is controlled by an Access Control List (ACL) 230, such as an ACL that makes use of a password or other identifier to correctly authenticate a client 20 wishing to access the system 100, as will be understood by one of ordinary skill in the art in light of the present disclosure. The campaign server 240 accesses the data stored in the sample database server 140 in order to carry out the queries, tests, report generation, and the like that may be requested by the individual clients 120. Once again, communications between the sample database server 140 and the campaign server 240 is controlled by means of an ACL 250. In some embodiments, the sample database server 140 can be implemented using a relational database, such as IBM DB2, Sybase, Oracle, CodeBase and Microsoft® SQL Server as well as other types of databases such as, for example, a flat file database, an entity-relationship database, and object-oriented database, and/or a record-based database.

Thus, clients gain the benefits typically associated with a custom test and execution database system that includes their own data as well as very up-to-date generic consumer data without a substantial delay for database build time and without the very costly up-front financial investment that are typically associated with proprietary databases.

Furthermore, as was described with reference to FIGS. $1B_1$, $1B_2$, and $1B_3$ above, in some embodiments, in addition to having access to different proprietary data 142, 143, different clients may also be provided with access to different portions of the core consumer data 141 in the sample database 140. For example, one or more clients 120 planning a first type of campaign may be allowed access to all of the data in the core consumer data 141, while clients 120 planning a second type of campaign may be allowed access to a portion of the data in the core consumer data 141. Furthermore, in some embodiments, a given client 120 may be allowed access to all of the data in the core consumer data 141 for a first type of campaign, while the same client 120 may, at the same time, be allowed access to only a portion of the data in the core consumer data 141 for use in planning a second type of campaign. In one embodiment, access control to the data in the core consumer data 141 of the sample database 140 is implemented, at least in part, using the various schemas for the various clients 120, as depicted in FIG. 2.

FIG. 3 is a diagram that depicts one embodiment of a selection of data from the credit database to be included in the "snapshot" sample database 140. In the embodiment shown, the following types of data are included: consumer credit information 310, consumer non-credit information 320, client custom data 330, client contact history data 340, and client response data 350. In some embodiments, the client 20 uses the campaign management software tool 125 for campaign development and/or the business intelligence tool 126 for analysis and reporting. The consumer credit information 310 and the consumer non-credit information 320 both come as part of the 10% sample data load from the generic attributes 111 in the consumer data warehouse 110. Together, they make up the consumer core data 141 depicted in FIGS. 1B$_1$, 1B$_2$, 1B$_3$ and FIG. 2. In this embodiment, each record in the consumer credit information 310 and the consumer non-credit information 320 includes a household identifier (HSN), a personal identifier (PIN), and a selection of consumer attributes. The client custom data 330 is stored in the repository of proprietary attributes 142 depicted in FIGS. 1B$_1$, 1B$_2$, and 1B$_3$. In this embodiment, each record in the client custom data 330 includes a household identifier (HSN), a personal identifier (PIN), and a selection of proprietary consumer attributes. In various embodiments, client custom information may not include consumer name, street address or encrypted PIN information, and does include, for each consumer, an element, such as zip code, that can be matched to data within the sample database 141 and the consumer data warehouse 110. The client contact history data 340 and the client response data 350 may both come from the copy of the other client data 143 in the sample database 140, which includes data about the full population of consumers. These data sources are used, for example, to filter campaign results based on past contact history and client response information. The past contact history and client response information may indicate that if a given consumer appears in the list of campaign results, the consumer should be removed from list, for any of a variety of reasons. In some embodiments, some of the data from the client provided data 330, 340, 350 records may not be used for campaign development, in order to comply with federal and other regulations that control the use of credit-related data for advertising purposes.

In one embodiment, a sample test environment is built that represents data from a random 10% of a consumer credit database. The 10% test environment may be used for analysis, campaign development, campaign set-up, and for executing, auditing and reporting on logic proposed for the campaign. The client 120 may review results of the above and may approve or decline to approve execution of the proposed campaign strategy on the full and most recently updated version of the consumer credit database. If the client 120 declines approval, the client may choose to modify and re-test the campaign strategy one or more times until a desired campaign strategy is achieved. Thus, the full campaign executes the desired campaign strategy in the 100% environment of the full consumer data warehouse 110.

Although the foregoing systems and methods have been described in terms of certain preferred embodiments, other embodiments will be apparent to those of ordinary skill in the art from the disclosure herein. For example, in some embodiments, it may be desirable to add one or more demographic tables to allow for development of Invitation to Apply (ITA) lists (non-credit data lists) for direct marketing campaigns by clients. In some embodiments, credit data from more than one credit bureau may be available for use in connection with the systems and methods described herein.

Furthermore, although the systems and methods disclosed herein have been described by way of embodiments in which the clients 120 are typically credit providers or marketers working to plan direct marketing campaigns on their behalf, other embodiments, in which clients 120 are other types of business entities who wish to make use information from the consumer data warehouse 110, especially for planning direct marketing campaigns, are also envisioned.

IV. Operation

FIG. 4 is a flowchart depicting one embodiment of a process 400 for generating and maintaining a sample database environment 140. In block 410, the system 100 performs a sampling of the records in the credit-related database 102. In preferred embodiments, the sampling includes data about a portion of the records in the credit-related database 102. The data may include some or all of the attributes and other data stored for the sampled records. In some preferred embodiments, the sampling includes data about a percentage or fraction of the records, such as 10% of the records, or another percentage of the records in the range of 5%-25% of the records. In some embodiments, the sampling is a randomly selected portion of the records in the credit-related database 102. In other embodiments, the sampling may be selected partially randomly, such as by segmenting the records in the credit-related database 102 and by randomly selecting a portion of the records from one or more of the segments.

In block 420, the system 100 calculates one or more generic attributes associated with the sampled records. The generic attributes may be calculated from attribute definitions stored in one or more generic attribute views 111 and commonly available to clients 120 of the system 100.

In block 430, the data load module 150 of the system 100 cleanses and loads data from the sampled records and the associated attributes. For example, undesirable or unnecessary attributes, such as name, address, other contact information, and the like may be removed from the sample being used for the sample database 140 in order to comply with rules and regulations that govern the use of credit-related data. Attributes may also be removed from the sample data in order to decrease the size of the sample database 140, so that building and running tests on the sample database 140 may be carried out efficiently and expeditiously.

The processes in blocks 440 and 450 are carried out individually for each client 120 using the sample database 140. In block 440, the data load module 150 of the system 100 cleanses and loads client-proprietary attributes, such as those stored in the client's client view 112, deleting undesirable or unnecessary attributes. The data load module 150 may also load other attributes defined by the client for use in the current campaign strategy and/or may load other client data 143 provided by the client 120.

In block 450, the system 100 provides the client 120 with access to the sample database 140, including the generic 141 and the proprietary 142, 143 data. As was described with reference to FIG. 2, the sample database 140 is advantageously configured, using a system of one or more partitions, firewalls, Access Control Lists (ACLs), and/or other security measures to provide access to the same generic data 141 to a plurality of clients 120, simultaneously or near-simultaneously. Additionally, each client 120 may access and use their own client-proprietary data in conjunction with the generic data, without danger that there client-proprietary data will unintentionally become available to other clients 120. This configuration provides for a shared database 140 that economically and efficiently provides a shared environment for campaign testing, while also providing the benefits of a usually much costlier custom testing environment that also for the secure inclusion of proprietary attributes and other information in the campaign strategy testing.

In block 460 the system 100 determines if a lifespan associated with the current version of the sample database 140 is complete. As one example, in embodiments in which the sample database 120 is updated weekly, the lifespan is one week. If the lifespan associated with the current version of the sample database 140 is not yet complete, the system 100 continues to provide the clients 120', 120'', 120''' with access to the sample database 140. If the lifespan associated with the current version of the sample database 140 is complete, the process 400 returns to block 410 where the system 100 creates a new version of the sample database 140 to replace the previous version.

FIG. 5 is a flowchart that depicts one embodiment of a process 500 for using the direct marketing campaign planning environment to assist a client 120 to test, analyze, refine, and execute a marketing campaign, in accordance with some embodiments disclosed herein.

In block 505, the system 100 generates a sample database 140 test environment, as has been described with reference to FIG. 4 and elsewhere throughout the present disclosure.

In block 510, the system 100 accepts from the client 120 a proposed set of campaign selection rules to be tested for implementing a campaign strategy. The goal of the campaign strategy may be to identify good prospects for a direct marketing campaign. The goal of the testing may be to identify selection rules, also known as prospect selection criteria, that can successfully identify from the sample database 140 a desired set of prospects for the campaign and that can thus be predicted to identify from the full database of consumer data 110 a desired set of prospects for the campaign being planned. The selection rules may, in some embodiments, be formatted as a database query based on attributes associated with records in the sample database 140 test environment. In some embodiments, the campaign management tool 125 and the business intelligence tool 126 can be configured to provide the client 120 with a data dictionary that describes various categories of attributes available for segmenting the consumer populations, such as mortgage-related attributes, credit-related attributes, various proprietary attributes, and/or the like.

In block 520, the system 100 runs, on behalf of the client 120, a test campaign on the sample database 140 using the proposed campaign selection rules. In some embodiments, the campaign management tool 125 and the business intelligence tool 126 can be configured to access a sample client view 144 of the sample database 140. The sample client view 144 can be configured to include data from the repository of core consumer data 141, repository of client pre-calculated data 142, and repository of other client data 143. In some embodiments, the campaign management tool 125 and/or business intelligence tool 126 can be configured to provide the client 120 with a GUI that provides a query interface to run, name, construct, save, and/or reuse queries for the sample database 140. The queries can, in some embodiments, correspond to campaign selection rules. In some embodiments, the query interface can be configured to provide the client 120 with the ability to record and modify campaign selection rules for future.

In block 530, the system 100 provides results of the test campaign performed as described in block 520 to the client 120 for analysis. The campaign management tool 125 and/or business intelligence tool 126 can be configured to allow the client 120 to conduct high-level campaign development functions, such as segmentation of the consumer population, selection of one or more segments, and/or suppression of one or more segments or one or more individual consumers from the selection results, using individual, household, and/or other criteria. The campaign management tool 125 and/or business intelligence tool 126 can also be configured to generate reports based at least in part on information obtained from the sample database 140, and/or to perform other research and analysis functions associated with testing and refining the proposed direct marketing campaign. In some embodiments, the campaign management tool 125 and/or business intelligence tool 126 can be configured to generate reports predicting the response to the direct marketing campaign within a segment or group of segments of the targeted population.

In block 540, the system 100 receives from the client 120 an indication as to whether it is satisfied with the campaign strategy. If the client 120 is not satisfied, and if the lifespan of the sample database 140 is not yet expired, then the process 500 returns to block 510, and the testing and refining process can be repeated. The client 120 may modify and update the campaign selection rules and re-run the test campaign using new prospect selection criteria. In some embodiments, if the client 120 is not satisfied, and if the lifespan of the sample database 140 has expired, then the client 120 may continue testing the campaign selection rules once the sample database 140 has been rebuilt using a new randomly selected portion of the consumer data warehouse 110.

Alternatively, if, in block 540, the client 120 is satisfied with the results of the current set of prospect selection criteria, the process 500 moves to block 550 where the client 120 can provide a campaign flowchart 121. The campaign flowchart 121 can be configured to specify the desired campaign strategy.

In block 555, the campaign flowchart 121 is used as a specification for running a direct marketing campaign on the full consumer data warehouse 110 using the selection criteria identified during the testing on the sample database 140. In some embodiments, the project manager 130 accepts the campaign flowchart 121 from the client 120 and causes the campaign to be executed on the full consumer data warehouse 110. In some embodiments, the campaign with the tested selection criteria may be run on full consumer data warehouse 110 directly by the client 120 and/or may be run on another database of consumer information In block 560, the system 100 may optionally provide the client 120 with one or more consumer response reports associated with the direct marketing campaign. In some embodiments, the campaign management tool 125 and/or business intelligence tool 126 can be configured to provide the client 120 with consumer response reports received in connection with one or more direct marketing campaigns actually carried out. The consumer response reports may provide an analysis of consumer responses received from a direct marketing campaign. In some embodiments, the reports may summarize results over periods of time, including shorter comparison periods in the immediate weeks after a campaign is executed, and/or longer time frames, such as years after the campaign has completed.

The reports may provide flexibility to perform analysis of various levels and/or categories of summarization, which may include, but are not limited to: customer segments, product line, product campaign, promotion, offer, collateral, media, and/or vendor. In some embodiments, a client data maintenance service 165 can also be configured to store campaign-related data from executed campaigns that can, in some embodiments, be utilized for future campaigns. In some embodiments, the other client data 113 and/or repository of other client data 143 can be configured to store the campaign-related data for use in future campaigns.

IV. Various Embodiments of System and Method Implementations

In various embodiments, the systems and methods for providing a direct marketing campaign planning and execution environment may be embodied in part or in whole in software that is running on one or more computing devices. The functionality provided for in the components and modules of the computing device(s), including computing devices included in the system 100, may comprise one or more components and/or modules. For example, the computing device(s) may comprise multiple central processing units (CPUs) and a mass storage device(s), such as may be implemented in an array of servers. In one embodiment, the computing device comprises a server, a laptop computer, a cell phone, a personal digital assistant, a smartphone or other handheld device, a kiosk, or an audio player, for example.

In general, the word "module," "application", or "engine," as used herein, refers to logic embodied in hardware and/or firmware, and/or to a collection of software instructions, possibly having entry and exit points, written in a programming language, such as, for example, Java, Ruby, Ruby on Rails, Lua, C and/or C++. These may be compiled and linked into an executable program, installed in a dynamic link library, or may be written in an interpreted programming language such as, for example, BASIC, Perl, or Python. It will be appreciated that modules, applications, and engines may be callable from others and/or from themselves, and/or may be invoked in response to detected events or interrupts. Instructions may be embedded in firmware, such as an EPROM.

It will be further appreciated that hardware may be comprised of connected logic units, such as gates and flip-flops, and/or may be comprised of programmable units, such as programmable gate arrays or processors. The modules, applications, and engines described herein are in certain applications preferably implemented as software modules, but may be represented in hardware or firmware in other implementations. Generally, the modules, applications, and engines described herein refer to logical modules that may be combined with other modules and/or divided into sub-modules despite their physical organization or storage.

In some embodiments, the computing device(s) communicates with one or more databases that store information, including credit data and/or non-credit data. This database or databases may be implemented using a relational database, such as Sybase, Oracle, CodeBase and Microsoft® SQL Server as well as other types of databases such as, for example, a flat file database, an entity-relationship database, and object-oriented database, and/or a record-based database.

In one embodiment, the computing device is IBM, Macintosh, and/or Linux/Unix compatible. In another embodiment, the computing device comprises a server, a laptop computer, a cell phone, a Blackberry, a personal digital assistant, a kiosk, or an audio player, for example. In one embodiment, the computing device includes one or more CPUs, which may each include microprocessors. The computing device may further include one or more memory devices, such as random access memory (RAM) for temporary storage of information and read only memory (ROM) for permanent storage of information, and one or more mass storage devices, such as hard drives, diskettes, or optical media storage devices. In one embodiment, the modules of the computing are in communication via a standards based bus system, such as bus systems using Peripheral Component Interconnect (PCI), Microchannel, SCSI, Industrial Standard Architecture (ISA) and Extended ISA (EISA) architectures, for example. In certain embodiments, components of the computing device communicate via a network, such as a local area network that may be secured.

The computing is generally controlled and coordinated by operating system software, such as the Windows 95, Windows 98, Windows NT, Windows 2000, Windows XP, Windows Vista, Linux, SunOS, Solaris, PalmOS, Blackberry OS, or other compatible operating systems. In Macintosh systems, the operating system may be any available operating system, such as MAC OS X. In other embodiments, the computing device may be controlled by a proprietary operating system. Conventional operating systems control and schedule computer processes for execution, perform memory management, provide file system, networking, and I/O services, and provide a user interface, such as a graphical user interface (GUI), among other things.

The computing device may include one or more commonly available input/output (I/O) devices and interfaces, such as a keyboard, mouse, touchpad, microphone, and printer. Thus, in one embodiment the computing device may be controlled using the keyboard and mouse input devices, while in another embodiment the user may provide voice commands to the computing device via a microphone. In one embodiment, the I/O devices and interfaces include one or more display device, such as a monitor, that allows the visual presentation of data to a user. More particularly, a display device provides for the presentation of GUIs, application software data, and multimedia presentations, for example. The computing device may also include one or more multimedia devices, such as speakers, video cards, graphics accelerators, and microphones, for example.

In one embodiment, the I/O devices and interfaces provide a communication interface to various external devices. For example, the computing device may be configured to communicate with one or more networks, such as any combination of one or more LANs, WANs, or the Internet, for example, via a wired, wireless, or combination of wired and wireless, communication links. The network communicates with various computing devices and/or other electronic devices via wired or wireless communication links.

Although the foregoing invention has been described in terms of certain embodiments, other embodiments will be apparent to those of ordinary skill in the art from the disclosure herein. Moreover, the described embodiments have been presented by way of example only, and are not intended to limit the scope of the invention. Indeed, the novel methods and systems described herein may be embodied in a variety of other forms without departing from the spirit thereof. Accordingly, other combinations, omissions, substitutions and modifications will be apparent to the skilled artisan in view of the disclosure herein. For purposes of discussing the invention, certain aspects, advantages and novel features of the invention have been described herein. Of course, it is to be understood that not necessarily all such aspects, advantages or features will be embodied in any particular embodiment of the invention.

What is claimed is:

1. A computer system comprising:
   at least one of (a) a firewall separating a first user device associated with a first client and a second user device associated with a second client from a testing server, or (b) an access control list configured to authenticate user devices requesting access to the testing server; and
   the testing server, wherein the testing server is partitioned into at least a first virtual electronic partition associated with the first client and a second virtual electronic partition associated with the second client, wherein the testing server comprises one or more hardware processors configured by computer-executable instructions to at least:
  receive, from the first user device associated with the first client, a first request to access the testing server;
  authenticate the first user device requesting access to the testing server;
  access a first data set associated with the first client and the first virtual electronic partition, wherein the first data set comprises a subset of a plurality of data records corresponding to millions of consumers, wherein the subset of the plurality of data records are determined based on a random sampling of data records; and
  allow the first client to test for a first campaign using the first data set, while restricting access by the first client to the second virtual electronic partition.

2. The computer system of claim 1, wherein the plurality of data records comprises credit data.

3. The computer system of claim 1, wherein the plurality of data records are depersonalized by removing identification information associated with the consumers and including anonymous identifier numbers.

4. The computer system of claim 1, wherein the computer system comprises the firewall.

5. The computer system of claim 1, wherein the computer system comprises the access control list.

6. The computer system of claim 1, wherein the one or more hardware processors are further configured to:
  receive, from the second user device associated with the second client, a second request to access the testing server;
  authenticate the second user device requesting access to the testing server;
  access a second data set associated with the second client and the second virtual electronic partition; and
  allow the second client to test for a second campaign using the second data set, while restricting access by the second client to the first virtual electronic partition and the first data set.

7. The computer system of claim 1, wherein criteria for the random sampling is not based on user input.

8. A computer-implemented method comprising:
  as implemented by a computing system, wherein the computing system is partitioned into at least a first virtual electronic partition associated with a first client and a second virtual electronic partition associated with a second client:
    receiving, from a first user device associated with the first client, a first request to access the computing system;
    authenticating the first user device requesting access to the computing system;
    accessing a first data set associated with the first client and the first virtual electronic partition, wherein the first data set comprises a subset of a plurality of data records corresponding to millions of consumers, wherein the subset of the plurality of data records are determined based at least in part on a random sampling of the plurality of data records; and
    allowing the first client to test for a first campaign using the first data set, while restricting access by the first client to the second virtual electronic partition,
  wherein at least one of (a) a firewall separates the first user device associated with the first client and a second user associated with a second client from the computing system, or (b) an access control list is configured to authenticate user devices requesting access to the computing system.

9. The computer-implemented method of claim 8 further comprising:
  receiving a first campaign strategy associated with the first client;
  receiving a second campaign strategy associated with the second client;
  providing a first user interface configured to allow the first client to test for a first marketing campaign test via the first virtual electronic partition using the first campaign strategy; and
  providing a second user interface configured to allow the second client to test for a second marketing campaign test via the second virtual electronic partition using the second campaign strategy.

10. The computer-implemented method of claim 8, wherein the subset of the plurality of data records accessed by the computing system is between 5% and 25% of the plurality of data records.

11. The computer-implemented method of claim 8, wherein the plurality of data record includes identifying information regarding the one or more consumers.

12. The computer-implemented method of claim 11, wherein the identifying information for each of the one or more consumers comprises a name and an address of the consumer.

13. The computer-implemented method of claim 8 further comprising:
  obtaining first contact history data and client response data for the one or more consumers from the first client, wherein the plurality of data records are depersonalized by removing identification information associated with the consumers and including anonymous identifier numbers, and the depersonalized data records are generated based at least in further part on the first contact history data and client response data from the first client.

14. The computer-implemented method of claim 13 further comprising:
  obtaining second contact history data and client response data for the one or more consumers from the second client, wherein the depersonalized data records are generated based at least in further part on the second contact history data and client response data from the second client.

15. The computer-implemented method of claim 8, wherein the firewall separates the first user device associated with the first client and the second user associated with the second client from the second computing system.

16. A non-transitory computer storage medium storing computer-executable instructions that, when executed by a computing system, cause the computing system to perform operations comprising:
  receiving, from a first user device associated with a first client, a first request to access the computing system;
  authenticating the first user device requesting access to the computing system;
  accessing a first data set associated with the first client and a first virtual electronic partition, wherein the computing system is partitioned into at least the first virtual electronic partition associated with the first client and a second virtual electronic partition associated with a second client, wherein the first data set comprises a subset of a plurality of data records corresponding to millions of consumers, wherein the subset of the plurality of data records are determined by the computing system and parameters of the determining of the subset are not controllable by the first client; and allowing the first client to test for a first campaign using the first data set, while restricting access by the first client to the second virtual electronic partition, wherein at least one of (a) a firewall separates the first user device associated with the first client and a second user associated with the second client from the computing system, or (b) an access control list is configured to authenticate user devices requesting access to the computing system.

17. The non-transitory computer storage medium of claim 16 further comprising:

receiving a first campaign strategy associated with the first client;

receiving a second campaign strategy associated with the second client;

providing a first user interface configured to allow the first client to test for a first marketing campaign test via the first virtual electronic partition using the first campaign strategy; and providing a second user interface configured to allow the second client to test for a second marketing campaign test via the second virtual electronic partition using the second campaign strategy.

18. The non-transitory computer storage medium of claim 16, wherein the subset of the plurality of data records accessed by the computing system is between 5% and 25% of the plurality of data records.

19. The non-transitory computer storage medium of claim 16, wherein the plurality of data record includes identifying information regarding the one or more consumers.

20. The non-transitory computer storage medium of claim 19, wherein the identifying information for each of the one or more consumers comprises a name and an address of the consumer.

* * * * *